US006962245B2

(12) United States Patent
Ray et al.

(10) Patent No.: US 6,962,245 B2
(45) Date of Patent: Nov. 8, 2005

(54) VARIABLE FORCE ENERGY DISSIPATER AND DECELERATOR

(75) Inventors: Malcolm H. Ray, Canton, ME (US); Chuck A. Plaxico, Westerville, OH (US)

(73) Assignee: Worcester Polytechnic Institute, Worcester, MA (US)

( * ) Notice: Subject to any disclaimer, the term of this patent is extended or adjusted under 35 U.S.C. 154(b) by 0 days.

(21) Appl. No.: 10/443,660

(22) Filed: May 22, 2003

(65) Prior Publication Data

US 2004/0011615 A1 Jan. 22, 2004

Related U.S. Application Data

(60) Provisional application No. 60/384,903, filed on Jun. 1, 2002.

(51) Int. Cl.[7] .................................................. E01F 9/018
(52) U.S. Cl. ....................... 188/377; 188/372; 188/374; 404/10
(58) Field of Search ........... 404/10, 6, 9; 188/371–372, 188/374, 377

(56) References Cited

U.S. PATENT DOCUMENTS

| | | | |
|---|---|---|---|
| 1,511,264 A | * 10/1924 | Carter | ......................... 188/129 |
| 2,391,275 A | 12/1945 | Shaw | |
| 2,483,655 A | * 10/1949 | Schultz | ................... 244/110 A |
| 2,578,903 A | 12/1951 | Smith | |
| 2,870,871 A | 1/1959 | Stevinson | |
| 2,979,163 A | 4/1961 | Van Zelm et al. | |
| 2,980,213 A | 4/1961 | Van Zelm et al. | |
| 3,017,163 A | 1/1962 | Van Zelm et al. | |
| 3,087,584 A | 4/1963 | Jackson et al. | |
| 3,143,321 A | 8/1964 | McGehee et al. | |

(Continued)

OTHER PUBLICATIONS

M.H. Ray et al., "Side Impact Crash Testing", Report FHWA–RD–92–052, Test No. 91S046, Mar. 1992, Federal Highway Admin., McLean, VA, p1–34.

M.H. Ray et al., "Side Impact Test and Evaluation Procedures for Roadside Structure Crash Test", Report FHWA–RD–92–062, May 1993, Fed.Hwy.Admin.,McLean, VA, p1–27.

M.H. Ray et al., "Side Impact Crash Testing of Roadside Structures", Report FHWA–RD–92–079, May 1993, Fed.Hwy. Admin., McLean, VA, p1–77.

(Continued)

*Primary Examiner*—Thomas B. Will
*Assistant Examiner*—Raymond W. Addie
(74) *Attorney, Agent, or Firm*—R. Dennis Creehan, Esq.

(57) ABSTRACT

Tunable pull-through energy attenuator and decelerator devices is disclosed which provide for variable force-time profiles, deceleration and kinetic energy attenuation of moving objects so as to prevent damage or injury to impacting objects, vehicles or persons. The device employs either consumable inelastic or reusable, viscoelastic deforming elements, such as tubes, rods, plates or strips, which absorb substantial amounts of energy through repeated inelastic or viscoelastic deformation when the deforming element is pulled-through a tunable array of rigid pins having a variety of configurations and settings. The disclosed devices provide for variable force-time profiles which control the cumulative deformation and thereby the amount of energy absorbed and rate of deceleration of impacting objects. The device may be readily adapted and deployed as highway vehicle guardrails, road barriers or crash cushions for frontal and side impacts and as load attenuators for crash-resistant aircraft seats, spacecraft landing pods, crash-resistant aircraft landing gear, aircraft and vehicle passenger restraint harnesses, cargo tie-downs, vehicle bumpers and collapsible vehicle steering columns.

28 Claims, 28 Drawing Sheets

U.S. PATENT DOCUMENTS

| | | | |
|---|---|---|---|
| 3,146,014 A | | 8/1964 | Kroell |
| 3,181,821 A | | 5/1965 | Webb |
| 3,195,685 A | | 7/1965 | Blackstone |
| 3,211,260 A | | 10/1965 | Jackson |
| 3,236,333 A | | 2/1966 | Mitchell |
| 3,308,908 A | | 3/1967 | Bunn |
| 3,337,004 A | | 8/1967 | Hoffman et al. |
| 3,372,773 A | | 3/1968 | Russo et al. |
| 3,486,791 A | | 12/1969 | Stoffel et al. |
| 3,547,468 A | | 12/1970 | Giuffrida |
| 3,561,690 A | | 2/1971 | Muskat |
| 3,604,285 A | | 9/1971 | Olsson |
| 3,719,255 A | | 3/1973 | Daniels et al. |
| 3,730,586 A | | 5/1973 | Eggert |
| 3,768,781 A | * | 10/1973 | Walker et al. .................. 256/1 |
| 3,820,634 A | | 6/1974 | Poe |
| 3,968,863 A | | 7/1976 | Reilly |
| 4,027,905 A | | 6/1977 | Shimogawa et al. |
| 4,150,805 A | * | 4/1979 | Mazelsky ............... 244/122 R |
| 4,200,310 A | | 4/1980 | Carney |
| 4,223,763 A | | 9/1980 | Duclos et al. |
| 4,289,419 A | | 9/1981 | Young et al. |
| 4,358,136 A | | 11/1982 | Tsuge et al. |
| 4,583,716 A | * | 4/1986 | Stephens et al. ........... 256/13.1 |
| 4,630,716 A | | 12/1986 | Faust |
| 4,784,515 A | * | 11/1988 | Krage et al. .................... 404/6 |
| 4,815,565 A | * | 3/1989 | Sicking et al. ................. 404/6 |
| 4,844,213 A | | 7/1989 | Travis |
| 4,928,928 A | | 5/1990 | Buth et al. |
| 5,022,782 A | * | 6/1991 | Gertz et al. .................... 404/6 |
| 5,074,391 A | | 12/1991 | Rosenzweig |
| 5,078,366 A | | 1/1992 | Sicking et al. |
| 5,391,016 A | | 2/1995 | Ivey et al. |
| 5,487,562 A | * | 1/1996 | Hedderly et al. ........... 280/777 |
| 5,634,738 A | | 6/1997 | Jackson et al. |
| 5,791,812 A | | 8/1998 | Ivey |
| 5,797,591 A | * | 8/1998 | Krage ...................... 256/13.1 |
| 6,024,383 A | | 2/2000 | Fohl |
| 6,082,926 A | | 7/2000 | Zimmer |
| 6,179,516 B1 | | 1/2001 | Ivey et al. |
| 6,308,809 B1 | | 10/2001 | Reid et al. |
| 6,719,483 B1 | | 4/2004 | Welandsson |

OTHER PUBLICATIONS

M.H. Ray et al., "Severity Measures in Side–Impacts with Narrow Roadside Structures", J. Transportation Eng., 120(2):322–338, Mar.–Apr. 1994.

M.H. Ray et al., "Test and Evaluation Criteria for Side–Impact Roadside Appurtenance Collisions", J.Transportation Eng., 120(4):633–651, Jul.–Aug. 1994.

M.H. Ray et al., "Side Impact Crash Test and Evaluation Criteria for Roadside Safety Hardware", in "General Design and Roadside Safety Features".

Transportation Research Record No. 1647, Transportation Research Board, Washington, DC, 1999, p1–17.

M.H. Ray et al., "Evaluating Human Risk in Side Impact Collisions with Roadside Objects", Paper No. 00–0250, Transportation Research Board 79th Annual Meeting, Washington, DC, Jan. 9–13, 2000, p1–16.

\* cited by examiner

2 PINS/SET

4 PINS/SET

8 PINS/SET

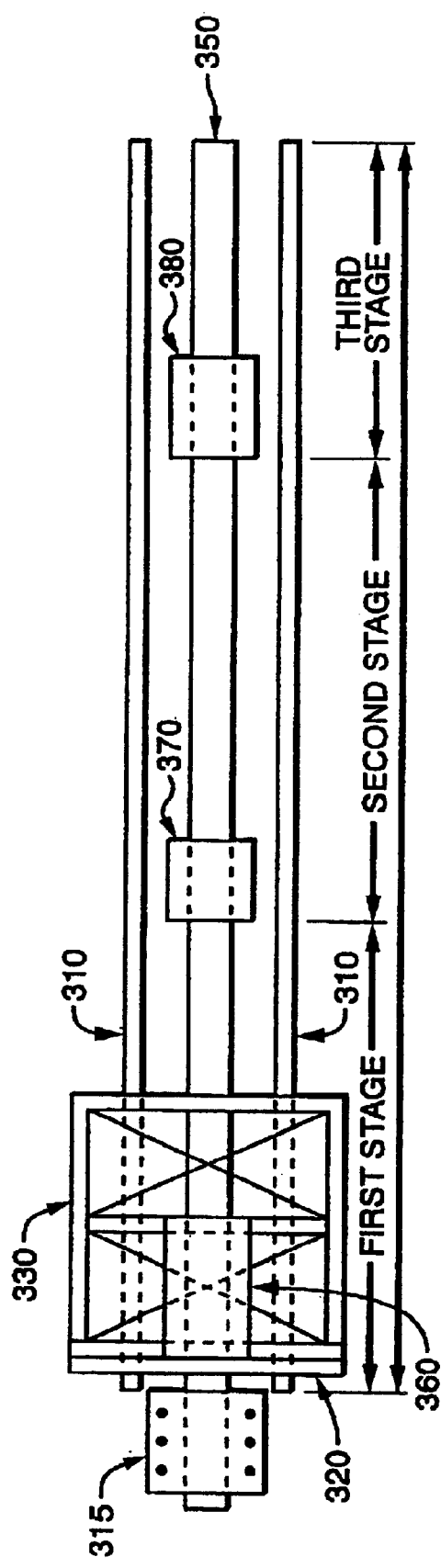
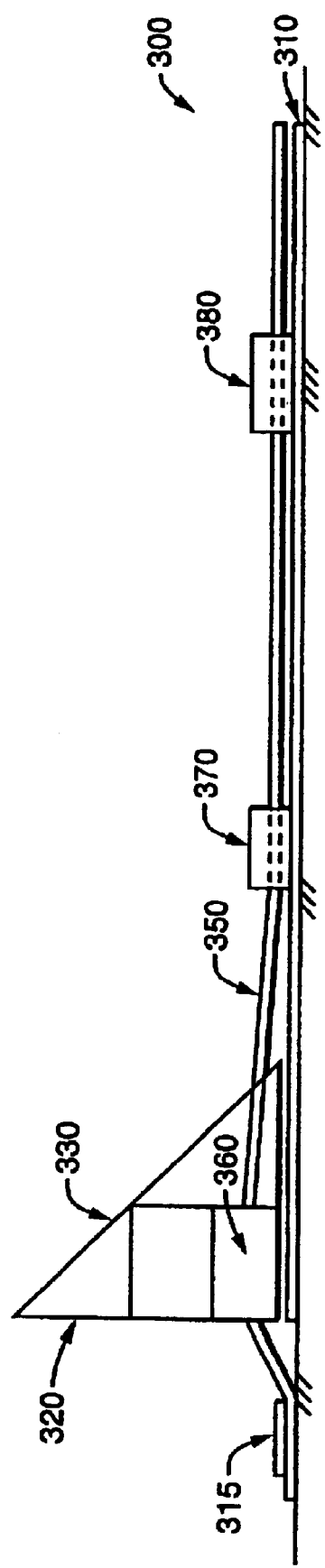
FIG. 27A
FIG. 27B

VARIABLE FORCE ENERGY DISSIPATER AND DECELERATOR

CROSS-REFERENCES

This application claims the benefit under 35 U.S.C. 119(e) of U.S. provisional patent application U.S. Ser. No. 60/384,903 filed on Jun. 1, 2002 which is incorporated herein by this reference.

FIELD OF THE INVENTION

This invention relates generally to energy attenuator devices and methods for deceleration of moving objects. More particularly, this invention relates to tunable, variable force, pull-through energy attenuators and decelerators which provide for controlled deceleration so as to prevent damage or injury to moving objects, vehicles or persons.

BACKGROUND OF THE INVENTION

Numerous applications of kinetic energy absorbers are known in the art. Examples include, but are not limited to, load attenuators for crash-resistant aircraft seats, spacecraft landing pods, crash-resistant aircraft landing gear, aircraft and vehicle passenger restraint harnesses, cargo tie-downs, automotive bumpers, collapsible vehicle steering columns and highway vehicle crash barriers and crash cushions. The common problem addressed in each of these applications is in the management and dissipation of excessive kinetic energy produced by high velocity moving bodies, during rapid deceleration of such bodies, in a safe and controlled manner so as to minimize injury to occupants or excessive damage to equipment and vehicles.

Energy attenuator devices typically rely on dissipating kinetic energy by plastic deformation of a solid object during impact loading. For example, devices which rely on energy absorption mechanisms such as bending wires or rods over bearing surfaces [see U.S. Pat. No. 3,087,584 to Jackson, et al.; U.S. Pat. No. 3,195,685 to Blackstone; U.S. Pat. No. 3,968,863 to Reilly], axial compression and buckling of metal tubes [see U.S. Pat. No. 2,870,871 to Stevinson; U.S. Pat. No. 3,146,014 to Kroell], axial compression and rupturing of tubes [See U.S. Pat. No. 3,143,321 to McGehee, et al.; U.S. Pat. No. 3,236,333 to Mitchell; U.S. Pat. No. 5,074,391 to Rosenzweig; U.S. Pat. No. 6,308,809 to Reid et al.], lateral compression of tubes [see U.S. Pat. No. 3,719,255 to Daniels, et al.; U.S. Pat. No. 4,200,310 to Carney; U.S. Pat. No. 4,289,419 to Young, et al.; U.S. Pat. No. 6,082,926 to Zimmer], diametric crimping of tubes [see U.S. Pat. No. 3,820,634 to Poe; U.S. Pat. No. 4,223,763 to Duclos, et al.], and bending metal strips or straps over rollers or shaped surfaces [see U.S. Pat. No. 2,578,903 to Smith; U.S. Pat. No. 2,979,163 to Van Zelm, et al.; U.S. Pat. No. 2,980,213 to Van Zelm, et al.; U.S. Pat. No. 3,017,163 to Van Zelm, et al.; U.S. Pat. No. 3,211,260 to Jackson; U.S. Pat. No. 3,337,004 to Hoffman, et al.; U.S. Pat. No. 3,547,468 to Giuffrida; U.S. Pat. No. 3,561,690 to Muskat; U.S. Pat. No. 3,730,586 to Eggert; U.S. Pat. No. 4,027,905 to Shimogawa, et al.; U.S. Pat. No. 4,358,136 to Tsuge, et al.; U.S. Pat. No. 4,630,716 to Faust] are known in the art.

Irrespective of the deformation method employed, these prior art energy dissipation devices are generally designed to operate at a constant force and to dissipate a fixed amount of energy. As such, due to designed limitations in energy absorption capacity and deceleration force, these prior art devices are typically unsuitable for handling a wide range of impact masses, velocities or kinetic energies. Furthermore, while these prior art devices may effectively dissipate the kinetic energies for which they are designed, due to their typical constant force limitations, they generally do not provide for effective management and control of harmful deceleration forces produced by varying force-time profiles. Additionally, since these prior art devices typically rely on kinetic energy dissipation through the irreversible plastic deformation of deforming members at stresses well above their proportional limit and yield point, such devices are inherently inefficient in extracting deformation energy from materials since, following initial deformation of the members, subsequent deformation and energy dissipation is minimal since the initial deformation is typically irreversible. Furthermore, these devices have associated high maintenance costs since, deforming members must be replaced after use due to irreversible deformation.

A particularly beneficial example application of energy dissipater devices is in highway crash barriers designed to protect vehicles and occupants from collision damage or injury from high velocity impact with fixed roadside objects. U.S. Pat. No. 4,844,213 to Travis discloses a progressively collapsing barrier where frictional sliding of a securing member along a track permits the collapsing components to move together. U.S. Pat. No. 5,634,738 to Jackson, et al. discloses a restraining vehicle barrier for railroad crossings which employs an energy absorbing metal cable or strip spool payout mechanism wherein energy is absorbed by bending and deformation of the strip in multiple steps. The metal strip spools are replaced after use. The disclosed device permits vehicles to be stopped within about 30 yards. U.S. Pat. No. 5,391,016 to Ivey, et al. discloses a collapsible telescoping highway guardrail terminal for attenuating head-on vehicle impacts. U.S. Pat. No. 5,791,812 to Ivey discloses a collapsible guardrail end treatment for preventing penetration of vehicles by guardrail ends during head-on or side-impact collisions. U.S. Pat. No. 6,179,516 to Ivey, et al. discloses a collapsible highway divider end treatment comprising a sliding frame and crushable barrels for absorbing vehicle impact energy and redirecting impacting vehicles. The disclosed device provides a relatively constant crush resistance.

In addition to the above examples, numerous other energy absorbing highway crash barriers are known in the art including, but not limited to break away cable terminals or BCTs [see FHWA Technical Advisory T 5040.25], eccentric loader breakaway cable guardrail terminals or ELTs [see FHWA Technical Advisory T 5040.25], modified eccentric loader breakaway cable terminals or MELTs [see Federal Motor Vehicle Safety Standards, Technical Report 208, National Highway Traffic Safety Administration, Washington, D.C. 1971], enhanced MELTs for side-impact or MELT-SIs [see M. H. Ray, et al., "Side Impact Crash Testing", Federal Highway Administration Report No. FHWA-RD-92-052, March 1992] guardrail extruder terminals such as the ET-2000 [see U.S. Pat. No. 4,928,928 to Buth et al. and U.S. Pat. No. 5,078,366 to Sicking et al.], slotted rail terminals (SRTs} and vehicle attenuating terminals or VATs.

One particularly promising application for a variable force energy dissipater is as a highway crash cushion to protect vehicle occupants during side impacts with a fixed roadside object. In a series of three reports which reviewed the 1983 Fatal Accident Reporting System (FARS) and the 1985 National Accident Sampling System (NASS) databases maintained by the National Highway Traffic Safety Administration (NHTSA), Ray, et al., investigated the causes and severity of side impact collisions with fixed roadside objects such as trees, utility poles and guardrails and reported that 25% of major accidents can be attributed to side impact collisions of a single vehicle with a fixed roadside object. Observed impact velocities were typically 50 km/hr and impact angles were typically around 90° [see M. H. Ray, et al., Federal High Administration Report No. FHWA-RD-91-122, FHWA-RD-92-062 and FHWA-RD-92-079]. Based on their data analysis Ray, et al., identified typical vehicle speed, impact location and vehicle orientation characteristics for reported side impact collisions [see M. H. Ray, et. al., "Characteristics of Side Impact Accidents involving Fixed Roadside Objects", ASCE Journal of Transportation, Vol. 117, No. 3, May/June 1991; L. A. Troxel, et al., "Side Impact Collisions with Roadside Objects", Roadside Safety Features, Transportation Research Record No. 1302, Transportation Research Board, 1991].

From their analysis of FARS and NASS accident data, Ray, et al. provided recommendations for performing and evaluating side impact crash test performance of roadside structures and associated occupant risks by evaluating side impact crashes of small 820 kg vehicles, at impact angles of 90° and impact velocities of 50 km/hr [see M. H. Ray, et al., Federal High Administration Report No. FHWA-RD-92-062]. In subsequent testing, Ray, et al., evaluated the performance of conventional highway crash guardrail terminals in side impact collisions and found that existing devices failed to protect vehicle occupants from significant intrusion of guardrail terminals into passenger compartments which is a major source of fatal injuries in side impact collisions [see M. H. Ray, et al., Report Nos. FHWA-RD-92-047, FHWA-RD-92-048, FHWA-RD-92-051 and FHWA-RD-92-052, Federal Highway Administration, Washington, D.C., March 1992].

In a subsequent report, Ray, et al., conducted side impact testing of conventional roadside structures and developed preliminary statistical models to evaluate the risk of occupants [see M. H. Ray, et al., Federal High Administration Report No. FHWA-RD-92-079; Ray, et al., "Severity Measure in Side-Impacts with Narrow Roadside Structures", J. Trans. Eng. 120(2):322–338 (March/April 1994)]. Based on an analysis of reported side-impact accidents involving fixed roadside objects, Ray, et al. proposed road test criteria and crash evaluation methods for evaluating highway guardrail and crash cushion performance [see Ray, et al., "Test and Evaluation Criteria for Side-Impact Roadside Appurtenance Collisions", J. Trans. Eng. 120(4):633–651 (July/August 1994); Ray, et al., "Side Impact Crash Test and Evaluation Criteria for Roadside Safety Hardware", in *General Design and Roadside Safety Features,* Transportation Research Record No. 1647, Transportation Research Board (Washington, D.C. 1999); Ray, et al., "Impact Conditions in Side Impact Collisions with Fixed Roadside Objects", in *Accident Analysis and Prevention,* vol. 31, no. 1 (Pergamon Press 1999)].

For the purpose of assessing guardrail and crash cushion performance and predicting occupant injury risks for roadside barriers in side-impact collisions, a refined analysis for evaluation of occupant injury risks and a Side-Impact Occupant Impact Velocity (SI-OIV) evaluation criterion was provided by Ray, et al. for side impact collisions based on the difference in impact velocities of vehicles and occupants upon initial impact with fixed roadside objects. In a series of full-scale side impact tests, Ray, et al. examined conventional experimental measurements made with Anthropomorphic Test Devices (ATD) or "crash dummies" and refined the SI-OIV method for predicting severity of occupant head, thoracic and pelvic injuries [see Ray, et al., "Evaluating Human Risk in Side Impact Collisions with Roadside Objects", Transportation Research Record No. 1720, Transportation Research Board (Washington, D.C. 2000); M. H. Ray, "Side Impact Test and Evaluation Procedures", Federal High Administration Report No. FHWA-RD-00-XXX, Contract No. DFH61-96-R-00068, Final Report Fall 2001].

Based on a review of recent studies of side impact collisions and resultant occupant injuries, Ray, et al. concluded that conventional crash cushions and guardrails are primarily designed for dissipating vehicle kinetic energy in head-on collisions and are not adequately designed to minimize occupant injury during side-impact collisions with their associated acceleration profiles [see M. H. Ray, "Side Impact Test and Evaluation Procedures", Federal High Administration Report No. FHWA-RD-00-XXX, Contract No. DFH61-96-R-00068, Final Report Fall 2001]. While conventional roadside crash cushions and guardrails are typically designed to produce a constant deceleration force for absorbing vehicle kinetic energy, Ray, et al. demonstrated that variable force crash cushions are required to minimize injuries to occupants caused by impact with vehicle interiors during side-impact collisions. In addition, Ray, et al. demonstrated that decelerations produced by current generation crash cushions are suitable for either small 820 kg passenger cars or large 2000 kg pickup trucks but are not appropriate for the majority of 1450 kg mid-sized vehicles.

For all of the above reasons, a variable force energy dissipater would be particularly desirable for use in highway crash cushions during both frontal and side impacts so as to minimize the deceleration forces that vehicle occupants are exposed to, provide for a wide variety of vehicle weights and speeds, and provide for force adjustments to match anticipated impact conditions so as to avoid severe injuries to vehicle occupants caused by excessive deceleration forces.

Additionally, in light of the limitations of existing energy dissipater devices, it would be particularly advantageous to provide an energy attenuating which provides for varying the resistance force during impact and which dissipates a broad range of kinetic energy in anticipation of a variety of load impact scenarios involving wide ranges in mass, velocity or kinetic energy. Such a device would permit effective management and control over harmful deceleration forces produced by different force-time impact profiles, for example different sized vehicles. Furthermore, by relying on kinetic energy dissipation through reversible deformation of deforming members below their failure point, such a device would be inherently efficient in extracting maximum deformation energy from viscoelastic materials where successive deformation of the members may be continually repeated due to the reversible nature and subsequent recovery of initial viscoelastic deformation.

SUMMARY OF THE INVENTION

The energy attenuator and decelerator of the present invention relies on the principle that a broad range of kinetic energies produced by moving objects can be safely absorbed on impact by employing variable deceleration forces through the repeated, successive, transient deformation of inelastic or viscoelastic deformable members at stresses up to and beyond their elastic limit but typically below their failure point.

The energy attenuator and decelerator of the present invention comprises an impact surface for receiving contact with a moving object and for transferring an impact for from said object to a dissipater module comprising a rigid array of immovable pins through which a deformable inelastic, or preferably viscoelastic, strip or tube deforming member are fed and deformed by repeated bending and compression of the member as it passes through successive pins in the array. The deforming member may either be pushed or pulled through the array but preferably is pulled to avoid premature deformation of the member prior to passing through the pins.

In a typical embodiment, the pull-through dissipater of the present invention comprises a rigid frame member on which are mounted an array of fixed or rotating pins which deflect and bend an elongated deformation member, which is threaded through gaps between the pins, when the deformation member is forced to pass through the pin array during impact with a moving object. The rigid frame member may either comprise a separate, stand-alone frame or be incorporated into other structures, for example highway crash cushions, aircraft seats or landing gear, spacecraft landing pods, passenger restraint harnesses, cargo pallets and tie downs, vehicle steering columns and vehicle bumpers. In preferred embodiments, the dissipater pins are typically positioned along a longitudinal axis of the dissipater frame member and aligned transversely to the longitudinal axis of the frame. The cross-section of the deformation member may possess virtually any shape although it is generally preferable to employ a simple geometric shape such as a square, rectangular, round or tubular shape. In preferred embodiments, either a tubular or rectangular shape deforming member elements are employed.

The energy attenuator and decelerator of the present invention may employ a variety of alternative shapes as deformable members. In one preferred embodiment, where rectangular shaped deformation members are employed, the dissipater pins are co-planar and aligned parallel to each other along the longitudinal frame axis. In this embodiment, the rectangular member is threaded around above and below successive pins in a serpentine configuration and is repeatedly bent around each successive pin as it is pulled through the dissipater frame. In an alternative preferred embodiment, where tubular shaped deformation members are employed, the dissipater pins are arranged longitudinally along the frame axis in vertically aligned, opposing top and bottom pin pairs, where the top and bottom pins of each successive pin pair are co-plainer with the corresponding top and bottom pins of adjacent pin pairs. In this embodiment, the tubular member is threaded between the gap formed between opposing top and bottom pin pairs and is repeatedly collapsed by successive opposing pin pairs as it is pulled through the dissipater frame.

Where tubular shaped deformation members are used, alternative preferred embodiments may employ additional pin pairs with alternative pin orientations for collapsing the entire circumference of the tube member. In one preferred embodiment, the alignment of adjacent successive top and bottom pin pairs may be have an orthogonal configuration such that a tube cross-section is repeatedly and successively collapsed in alternating horizontal and vertical directions. In another preferred embodiment, two pin pairs may be aligned perpendicularly to each other in the same vertical plane to form a series of orthogonally-aligned four pin sets along the longitudinal frame axis. In an alternative preferred embodiment, four pin pairs may be aligned at 45 degree angles to each other in the same vertical plane to form a series of eight pin sets along the longitudinal frame axis. In alternative preferred embodiment, a greater number of pin pairs, for example five, six, seven, eight, nine or ten pin pairs may be employed for producing pin sets ranging in size from ten to twenty pins. As the number of pin pairs distributed around tubular member increases, the shape of the deformed tubular member cross-section approaches a circle and the stresses are more uniformly distributed around the tube, producing optimum energy dissipation efficiency. One limiting factor in this approach is the practical difficulty in placement of an increasingly large number of pins in close proximity to one another around the tubular deformation member circumference.

The energy attenuator and decelerator of the present invention may employ a variety of inelastic or viscoelastic materials as deformable members. Virtually any metal, alloy or plastic material may be used as a deformable member as long as their elastic modulus and tensile strength meets or exceeds the requirements for dissipating the deceleration force anticipated with a given impact scenario. In preferred embodiments, viscoelastic materials having high yield strength are preferred since, due to their viscoelastic behavior, they can be plastically deformed beyond their yield point. Since such materials recover their shape after deformation, they can be repeatedly deformed when passing through a sequence of pins in a pin array so as to provide maximum energy absorption per unit length of deforming element. Furthermore, since deformation is reversible, these materials can be repeatedly recycled and reused without significant loss of their energy attenuation properties.

Following the teachings herein, the energy dissipater and decelerator of the present invention may be uniquely configured for safely decelerating a variety of moving objects having a broad range of kinetic energies, masses and velocities by varying the force-time profile of an impacting object to minimize damage or injury. In contrast to conventional constant force energy known in the art, the dissipater of the present invention provides for a variable force-time profile which gradually decelerates a moving object while bringing it to rest.

The variable force-time profiles of the devices of the present invention are uniquely provided by pull-through dissipaters comprising a series of discrete dissipater modules designed with varying pull-through force which engage a deforming member element successively during impact of moving mass with the dissipater. For example, during an initial vehicle impact, the dissipater of the present invention provides for gradual application of deceleration forces so that any occupants or contents traveling at the same velocity as a vehicle are decelerated at a controlled rate to minimize injury or damage caused by internal impact of the occupants or contents with the vehicle interior. This approach would also apply to protecting equipment where damage is minimized by controlling deceleration to reduce the impact force of equipment striking a packing crate. Following the initial impact period, where impact injury to the occupants or impact damage to contents is minimized, the dissipater of the present invention further provides for increasing the deceleration force to dissipate vehicle kinetic energy and decelerate the vehicle. At this stage, the dissipation force is again limited for controlling ride-down acceleration so as to minimize internal injuries of occupants or internal damage of equipment due to excessive deceleration forces experienced during vehicle deceleration. For example, as noted in a subsequent section the occupant ride-down acceleration (ORA) is preferably maintained below 15 g's to minimize occupant injury. Depending on vehicle mass and velocity, following the second deceleration stage, a third stage may be required for dissipating larger vehicles or vehicles traveling at higher velocities. Thus, the dissipater of the present invention further provides a third dissipation stage for increasing the deceleration force so as to dissipate any residual vehicle kinetic energy and bring the vehicle to rest.

One object of the present invention is to provide a tunable pull-through energy dissipater which can be adjusted to specific impact conditions so as to produce a desirable deceleration response and minimize harm to property and persons.

Another object of the present invention is to provide a pull-through energy dissipater which employs a reusable viscoelastic deformation member.

Another object of the present invention is to provide a multi-stage energy dissipater that can provide controlled deceleration of moving objects by providing for variable deformation resistance and dissipation force along its length.

Another object of the present invention is to provide a pull-through energy dissipater which can maximize the deformation energy extracted from a deforming member by repeated and successive deformation of a resilient viscoelastic material which recovers most of its original shape between repeated deformation cycles.

Another object of the present invention is to provide a variable force, pull-through dissipater which comprises a series of dissipater modules which engage a deforming member sequentially so as to produce a variable force-time response to minimize deceleration forces when stopping moving objects having a broad range of kinetic energies, masses and velocities.

The energy attenuator and decelerator of the present invention provides for efficient and cost-effective management and dissipation of excessive kinetic energy produced by high velocity moving bodies during rapid deceleration of such bodies in a safe and controlled manner so as to minimize injury to occupants or excessive damage to equipment and vehicles. The energy attenuator and decelerator devices of the present invention are readily adaptable for a variety of applications which require the management and dissipation of kinetic energy and rapid deceleration of moving objects in a safe and controlled manner. Example applications where the present invention has particular utility include, but are not limited to, load attenuators for crash-resistant aircraft seats, spacecraft landing pods, crash-resistant aircraft landing gear, aircraft and vehicle passenger restraint harnesses, cargo tie-downs, automotive bumpers, collapsible vehicle steering columns and highway vehicle crash barriers and crash cushions.

BRIEF DESCRIPTION OF THE DRAWINGS

This invention is pointed out with particularity in the appended claims. Other features and benefits of the invention can be more clearly understood with reference to the specification and the accompanying drawings in which:

FIGS. 27A–27B is a schematic diagram of a variable force, multi-stage dissipater module of the present invention in top view (FIG. 27A) and side view (FIG. 28A)

DESCRIPTION OF THE PREFERRED EMBODIMENTS

An review of dissipater energy dissipation physics and mechanics, analytical and finite element modeling, design configurations, requirements for highway crash cushion applications, experimental testing, and performance validation for the pull-through strap and pull-through tube dissipaters of the present invention are provided below.

A. Pull-Through Energy Dissipater Design Considerations

Figure 1:
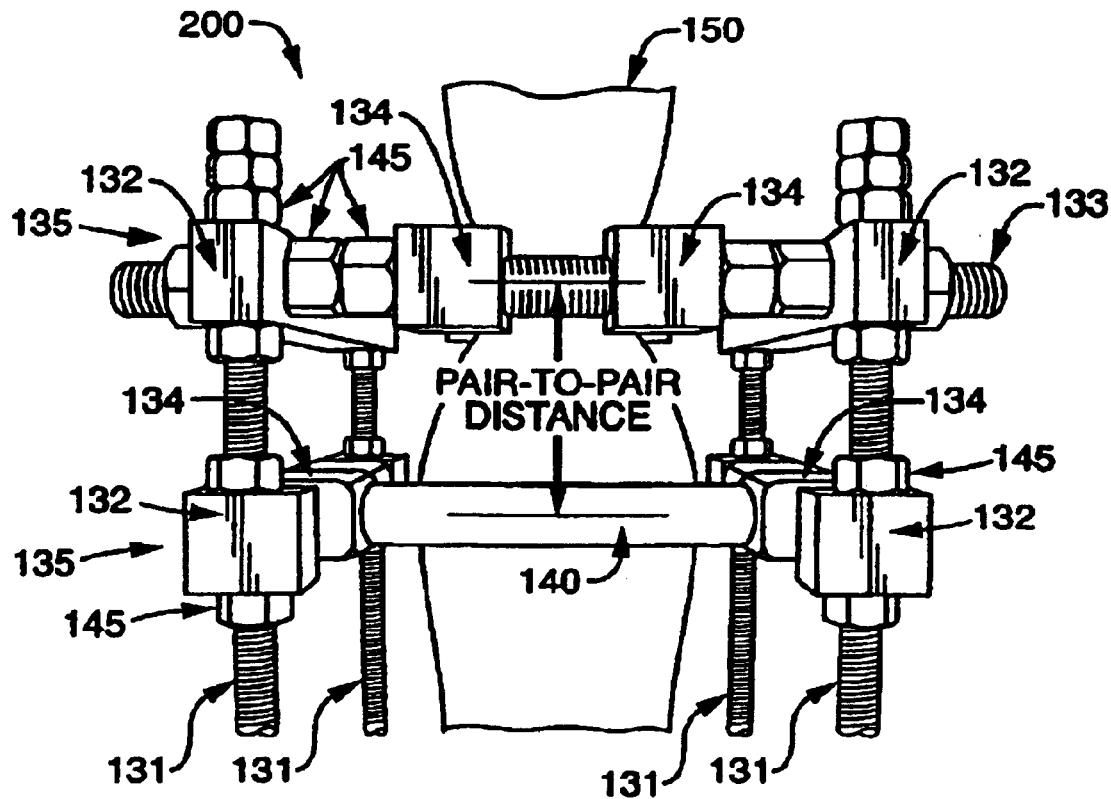
FIG. 1 show a two pin-set tube pull-through energy dissipater.
Figure 2:
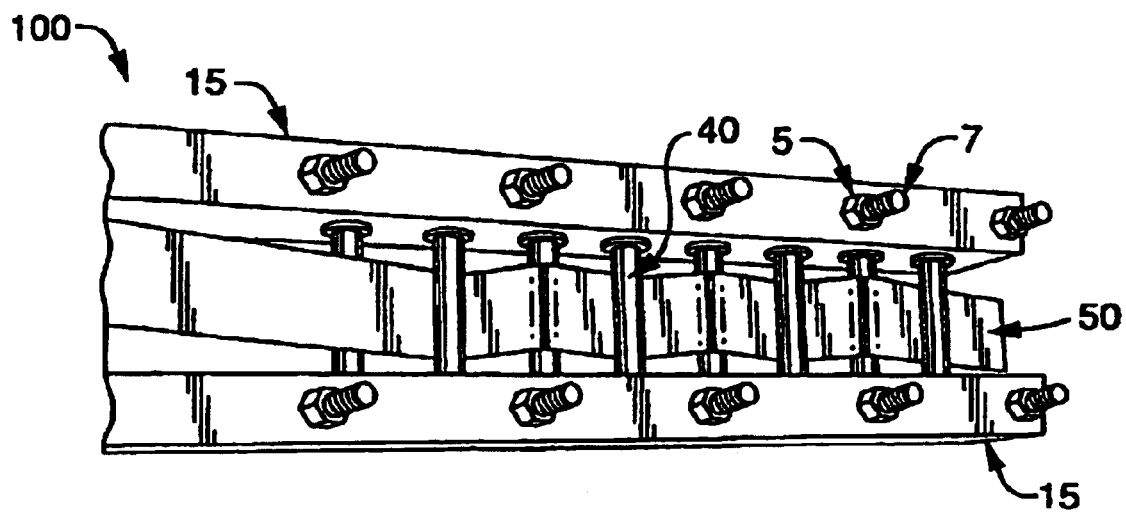
FIG. 2 shows an eight-pin strap pull-through energy dissipater.

The pull-through energy dissipaters of the present invention are a class of devices that manage energy by progressively deforming a replaceable material cross section by pulling it through a series of stationary or rolling rigid pins. FIG. 1 shows one example embodiment of a two pin-set two pin per set pull-through pipe or tube energy dissipater of the present invention which employs a tubular deforming member and orthogonally oriented pin pairs. FIG. 2 shows one example embodiment of an eight pin, pull-through strap energy dissipater of the present invention which employs a rectangular-shaped, strip deforming member with parallel oriented pins. The energy dissipation characteristics of both of these energy dissipater devices rely on the attenuation of the kinetic energy of impacting objects through the successive deformation of a cross section of a deforming member element as it is progressively pulled through a series of openings formed between an array of either individual pins or pin sets comprising two or more pins.

While the embodiments shown in FIG. 1 and FIG. 2 provide for use of either a circular or rectangular cross section deforming member, the present invention is not limited to these shapes as a variety of solid or hollow cross sectional shapes may be employed by appropriate modification of the present device following the teachings herein. The common feature shared by the embodiments of the present invention is that of a pull-through energy dissipater which dissipates the kinetic energy of a moving mass by progressive, repeated, inelastic deformation of an inelastic or viscoelastic deforming material by pulling the deforming member through a series of pins whose horizontal and vertical spacing, pairing, orientation and overall configuration is designed to decelerate and impacting mass by providing a tailored force-time profile for a specified range of kinetic energies, velocities and deceleration profiles so as to minimize damage or injury to an object or person when the mass is brought to rest.

Obtaining a specific force-time response from the pull-through dissipaters of the present invention involves manipulating several design parameters that characterize the interaction and performance of the dissipater upon impact from a moving mass. These parameters include: a) the deforming material mechanical properties; b) deforming material shape, length, cross section, cross sectional area, diameter or width and thickness; c) pin mechanical properties and configuration, including, but not limited to, rolling or stationary pins, pin diameter, pin spacing and orientation, pin gap or clamping distance; d) pin arrangement including, but not limited to, individual, grouped or paired pins, number of pins in each pin set and the number of pin sets. Varying the above parameters in a systematic, rational manner results in a specific force-time response which may be engineered to match a particular kinetic energy, deceleration profile and damage tolerance for the impacting mass.

An understanding of how these above dissipater parameters and variables modify device performance and response characteristics enables the design of a specific dissipater to achieve a particular design objective. Due to the large number of parameters and wide range of variables which dictate dissipater design and influence performance, a trial-and-error design approach is both inefficiency and costly. To assist design efforts and ensure intelligent dissipater designs which satisfy specified performance objectives, the development of a semi-analytical models or finite element models of pull-through energy dissipaters of the present invention and their experimental verification and validation is preferred for predicting the response characteristics of a particular dissipater configuration. In the following sections a review individual design parameters and modeling of their effect on the overall force-time response of specific dissipater designs enables identification of preferred embodiments for specific impact scenarios, for example the impact of a light truck or passenger car with a highway crash barrier. Examples 1 through 5 provide specific examples of dissipater embodiments which follow the teachings of the present invention to accomplish specific force-time and deceleration performance objectives.

B. Analytical Model

The pull-through tube dissipaters of the present invention are designed to convert the kinetic energy of a moving mass into deformation energy and providing an acceptable deceleration profile for minimizing damage or injury in bring the mass to rest. Analytical models may provide some insight into device design and performance by considering the underlying physics of dissipater interaction with a decelerating mass.

Assume that a moving mass M is traveling at an initial velocity of V when it contacts a pull-through energy dissipater. According to Newton's second law, the force required to kinetic energy of the moving mass must be absorbed by the deforming member of the dissipater to bring the mass to rest. Thus, the force necessary to decelerate the impacting mass and dissipate its kinetic energy can be described in terms of a dissipater pull-through force $F_{TP}$ and clamping force $P_C$ acting on the deforming member. The pull-through force comprises both a frictional component and a deformation component. Assuming coulomb friction, the frictional component may be given as a clamping force $P_C$ multiplied by a coefficient of friction $\mu_F$. The deformation component due to the progressive deformation of the deforming member may be defined as a clamping force $P_C$ multiplied by frictionless pull-through coefficient $\mu_{PT}$. The pull-through force $F_{TP}$ may be thus described in terms of a ratio with the clamping force and may be expressed as follows $$F_{PT} = P_c(\mu_F + \mu_{PT}) = M\frac{d^2x}{dt^2}.$$

Figure 3:
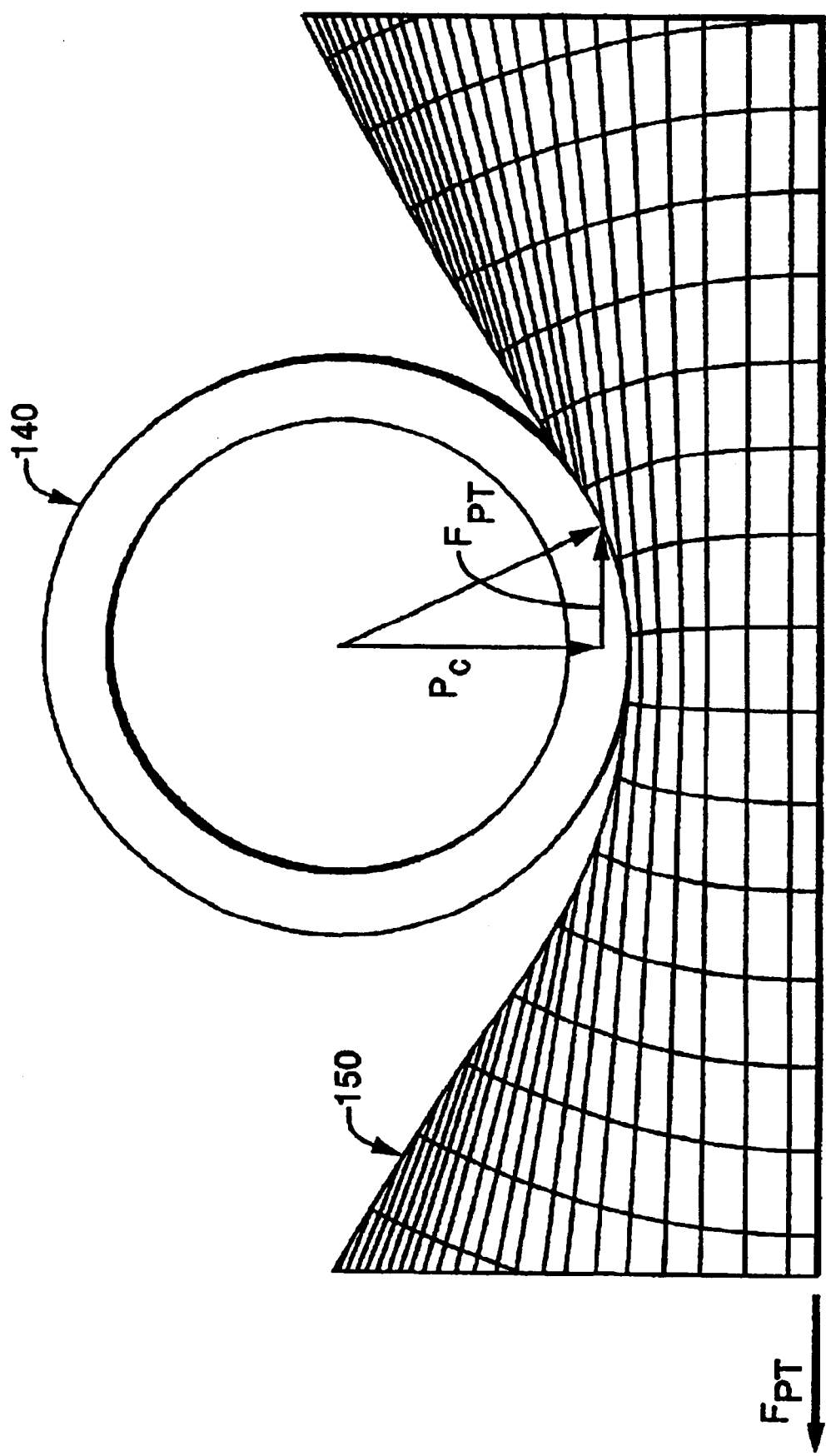
FIG. 3 shows a schematic diagram of the relationship between the pull-through force and the clamping force.

In FIG. 3, a schematic representation of this relationship between the pull-through force and clamping force is provided. While the frictional component may be readily determined from the clamping force $P_c$ and coefficient of friction $\mu_F$, the value of the deformation component requires knowledge of the frictionless pull-through coefficient $\mu_{PT}$. This value is much more difficult to determine analytically since it depends on the material type, shape, size of the deforming cross-section and the diameter and spacing of the pins (n.b. only circular pins are considered here and it can generally be assumed that the pins are rigid in comparison to the deformations in the deformable section). The frictionless pull-through coefficient $\mu_{PT}$ may be expressed as a function of a single pin set frictionless pull-through coefficient $\zeta$, which is the ratio of the pull-through force to clamping force for a single arrangement of arrangement of rolling pins, the spacing coefficient $\lambda$, which is the ratio of the pull-through force for multiple pin sets and the pull-through force for a single pin set, and the number of pin sets n where $$\mu_{PT} = \zeta(1+\lambda(n-1)).$$

Given the above equations and definitions, the deceleration of the striking mass M can be written as $$\frac{d^2 x}{dt^2} = \frac{P_c(\mu_F + \zeta(1+\lambda(n-1)))}{M}.$$

Integrating once yields the change in velocity between times $t_1$ and $t_2$ and integrating twice yields the distance traveled between times $t_1$ and $t_2$. If it is assumed for illustration purposes that $\mu_F$, n, $\zeta$ and $\lambda$ are constant over the time interval t=0 to t=T, which need not in general be the case, the change in velocity and displacement are:

$$\Delta V = \int_0^T \frac{P_c(\mu_F + \zeta(1+\lambda(n-1)))}{M} dt = \frac{P_c T(\mu_F + \zeta(1+\lambda(n-1)))}{M}$$

$$L = \int_0^T \frac{P_c t(\mu_F + (1+\zeta\lambda(n-1)))}{M} dt = \frac{P_c T^2(\mu_F + \zeta(1+\lambda(n-1)))}{2M}$$

The expressions given above provide a basic model of pull-through energy dissipater performance. Expressions for the clamping force $P_c$ and the components of the frictionless pull-through coefficient $\mu_{PT}$ will depend on the geometry of the cross-section and the constitutive properties of the material. In cases where either or both the shape and the constitutive law are complicated it may be impossible to develop a closed-form analytical solution for $P_c$ and $\mu_{PT}$ but these values can always be obtained either through experimental test measurements or finite element analysis simulations.

C. Finite Element Models

As noted above, it is often difficult to develop a closed-form analytical solution to the problem of predicting the pull-through force. In many cases, finite element simulations may be employed as an alternative to analytical models. Finite element approaches enable complex, three-dimensional geometry where good results may be obtained as long as an adequate constitutive material model is available. For model validation, simulation output may be readily compared to experimental measurements.

In order to further the development of pull-through dissipater devices and materials in the present work, a three-dimensional, non-linear, finite element program LS-DYNA (Livermore Software Technology Corp., Livermore, Calif.) with a TrueGrid (XYZ Scientific Applications Inc., Livermore, Calif.) pre-processor/mess generator and eta/PostGL (Engineering Technology Associates, Troy, Mich.) was employed for analyzing large deformation dynamic responses of inelastic solids and structures in model devices.

1. Pull-Through Strap Dissipater Model

Figure 6:
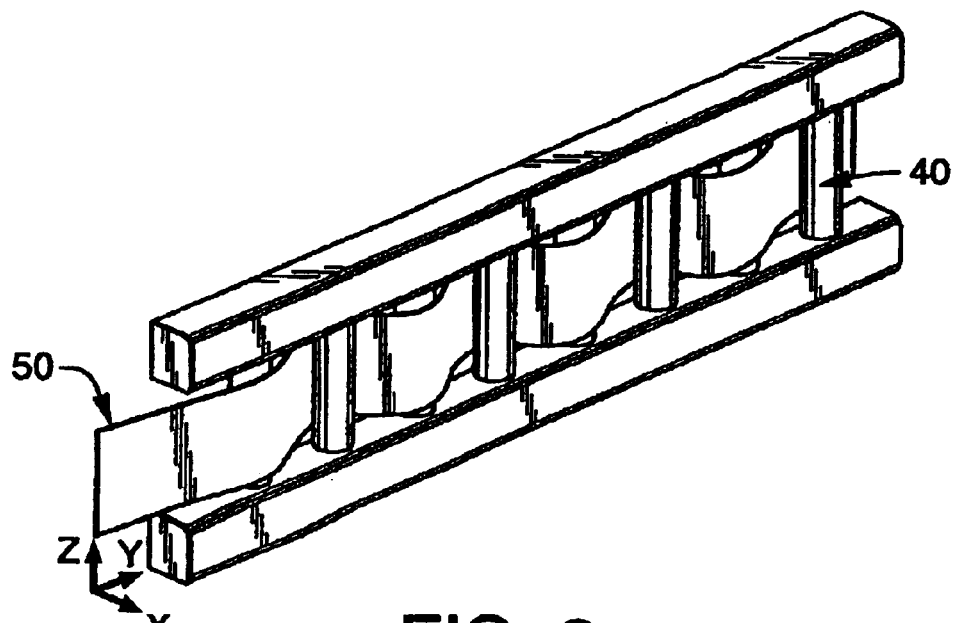
FIG. 6 shows a LS-DYNA finite element model of an eight pin strap pull-through energy dissipate.

A finite element model of a pull-through strap energy dissipater comprising a steel strip, fixed and rotating pins and side brackets was evaluated to determine the impact of various design parameters on dissipater performance. In this model, dissipater pins were employed to successively bend and unbend the steel strip and absorb energy by inelastic deformation of the steel. To constrain the pins, side brackets were modeled to hold the pins and steel strip and prevent the strip from leaving its path between the pins. The steel strip was modeled as an elastic-plastic material with strain hardening (LS-DYNA material type 24) using a dense plate mesh and solid brick elements with five integration points to allow the plate to conform to the radius of the pins as it is pulled over them. The pulling force was applied to a section at one end of the strip which was modeled by a rigid, non-deformable material with a lower density mesh. A contact interface was placed between the rigid end material and inelastic strip material to allow measurement of the force. The properties of the strip material used in the model corresponded to A36 steel with a density of 7.86 g/cm$^3$, an elastic modulus of 2×10$^5$ MPa, 415 MPa yield stress and 0.66 strain at failure. The pins a side brackets were modeled as rigid, non-deformable materials since their deformation was considered negligible. FIG. 6 shows a schematic diagram of one example of an eight pin pull-through strap dissipater finite element model.

In initial pull-through strap dissipater modeling, a model system with rigid, non-rotating pins was evaluated. In typical runs, a 3.2 mm thick, 50.8 mm wide, A36 steel plate was modeled with 19.1 mm diameter pins with a center-to-center spacing of either 38.1 mm or 50.8 mm. With one four pin model run employing 19.1 mm diameter pins, the maximum effective stress observed in the steel strip while being pulled through the four pins was 485 MPa at a steady-state pull-through force of 11.5 kN, approximately 12% of the strip tensile strength. In four pin model runs where pin diameter was varied, a steady-state pull force of 19.5 kN was observed with 25.4 mm diameter pins and a force of 24.0 kN was observed with 31.8 mm diameter pins. With one six pin model run employing 19.1 mm diameter pins, the maximum effective stress observed in the steel strip while being pulled through the six pins was 501 MPa at a steady-state pull-through force of 20.5 kN, approximately 27% of the strip tensile strength. In six pin model runs where pin diameter was varied, a steady-state pull force of 46.0 kN was observed with 25.4 mm diameter pins and a force of 51.5 kN was observed with 31.8 mm diameter pins With an eight pin model run, the maximum effective stress observed in the steel strip while being pulled through the six pins was 503 MPa at a steady-state pull-through force of 40.0 kN, approximately 43% of the strip tensile strength.

In subsequent pull-through strap dissipater runs, a model system comprising rigid, rotating pins was evaluated. In typical runs, a 3.2 mm thick, 50.8 mm wide, A36 steel plate was modeled with 19.1 mm diameter pins with a center-to-center spacing of 50.8 mm. With one four pin model run, a pull-though forces of 11 kN was observed. With one five pin model run, a pull-though forces of 16 kN was observed. With one six pin model run, a pull-though forces of 22 kN was observed. With one eight pin model run, a pull-though forces of 36 kN was observed.

2. Pull-Through Tube Dissipater Model

Figure 4:
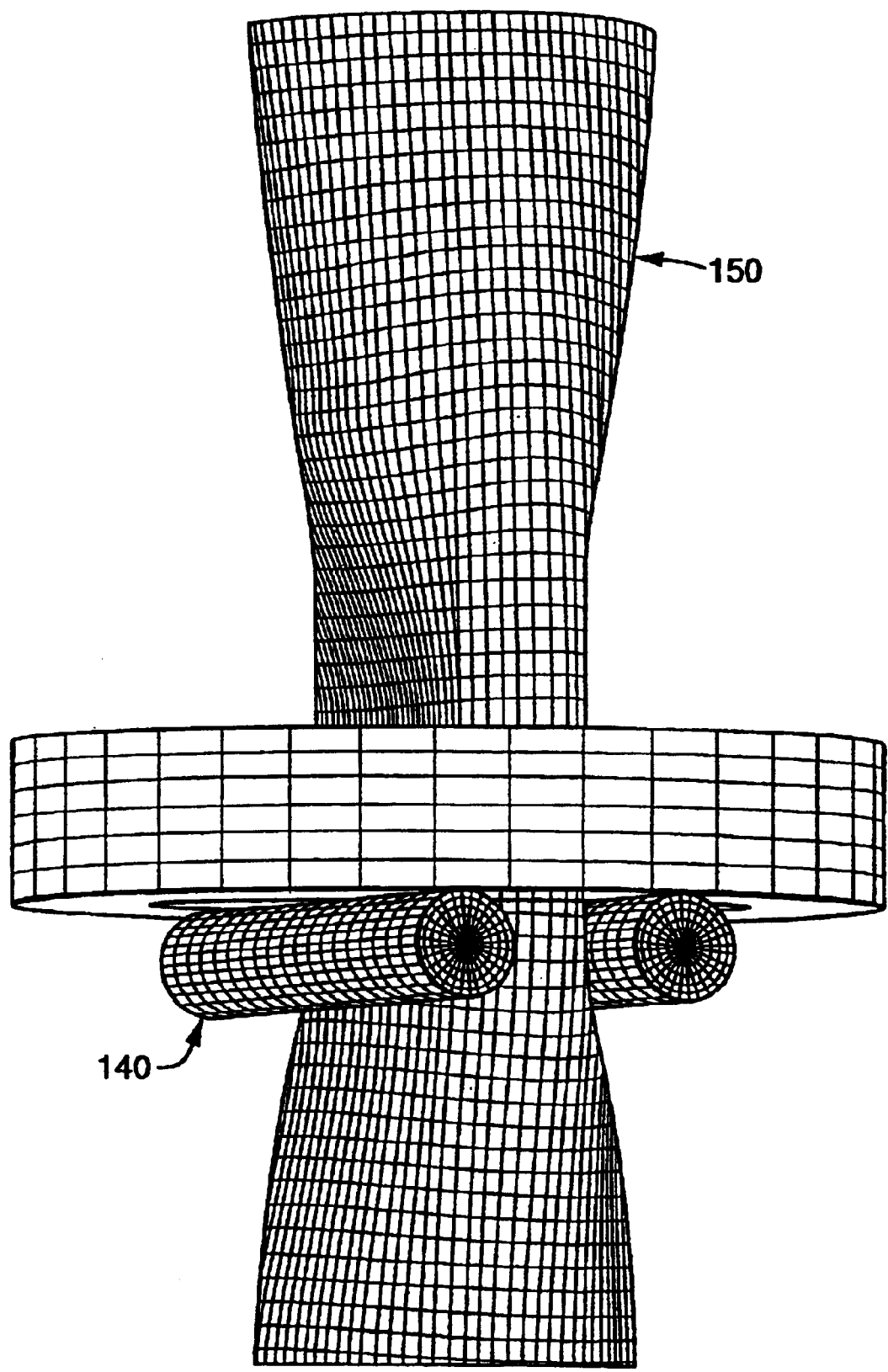
FIG. 4 shows a schematic of a finite element model of a single-pin pair tube pull-through energy dissipater.
Figure 5:
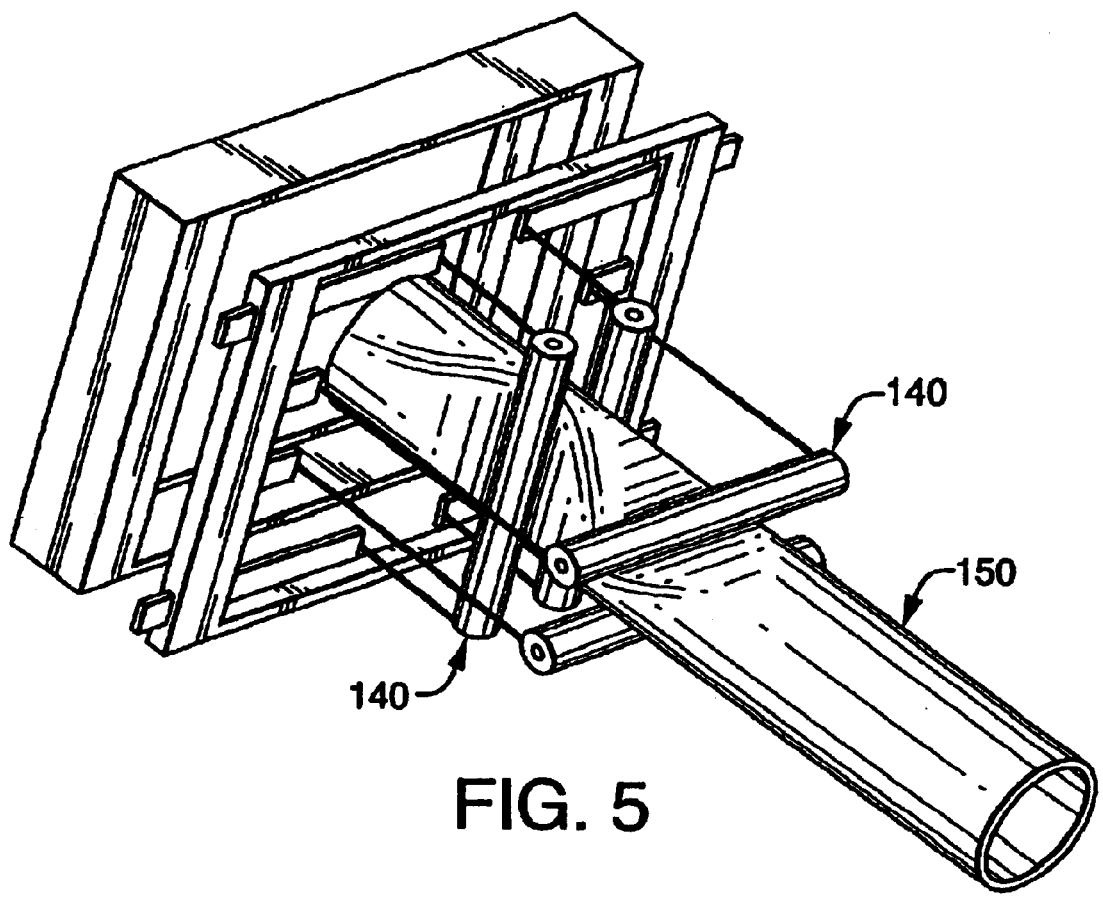
FIG. 5 shows a LS-DYNA finite element model of a two pin pair tube pull-through energy dissipater.

Following initial modeling efforts with pull-through strap dissipaters, finite element models for pull-through tube dissipaters which employ viscoelastic tube materials were evaluated. FIG. 4 shows a single pin pair pull-through tube dissipater model and FIG. 5 shows a two pin pair pull-through tube dissipater model with the pin pairs aligned orthogonally to one another.

Initially, pull-through tube dissipater modeling focused on simulation of the deformation behavior of HDPE tubes under dynamic loads and estimating the force required to pull an HDPE tube through as series of opposing pin pairs having different pin pair-to-pin pair spacing, varying pin-to-pin gaps and parallel or orthogonal pin pair orientations. The initial pull-through tube energy dissipater model comprised a tube or pipe, one or more pin pairs, a rigid ring attached to one end of the tube and a striker mass for introducing impact force to the dissipater system. The dissipater pin pairs are employed to successively crush or deform the diameter of the tubes and absorb energy by inelastic and viscoelastic deformation of the HDPE tube. For single pin pair modeling, no pin support members are employed since translation of the pin pair is restricted to certain allowed direction along the axis of the tube member in the direction of the impact force. The HDPE tube was modeled as a viscoelastic material (LS-DYNA material type 24) using thick shell elements and providing for strain rate sensitivity to represent HDPE viscoelastic behavior. The assumed properties of the tube material which corresponded to HDPE had a density of 0.955 g/cm$^3$, an elastic modulus of 850 MPa, 21.4 MPa yield stress and stress-dependent plastic strain values. The number of elements used along the tube axis was dependent on the pipe length which depended on impact mass velocity and pin gap or clamping distance. A constant ratio between pipe length and number of thick shell elements of 68 was employed for all simulations.

For simulation of deformation forces and determination of dissipation energy from tube deformation, a striker mass provides an impact force which is applied to a pin pair and sets the pins in motion along the axis of the tube. As the pin pairs travel along the tube, the tube is held at one end by the rigid, non-deformable ring section which is modeled with linear brick elements using LS-DYNA material type 20, a rigid material. The ring typically contains 192 brick elements and a total of 528 nodes. The rigid ring served to replicate the real dissipater system by constraining the tube and providing a interface for applying impact force to the dissipater system. The striker mass is also modeled as a material type 20 with 1,512 linear brick elements and 2,240 mesh nodes. The speed and mass of the striker mass can be varied to simulate different impact conditions. Since deflection of the pins during dissipater operation was considered negligible, each pin pair comprised two rigid pins modeled as LS-DYNA type 20 rigid material using linear brick elements and a high density to represent the high inertia properties of the pin pairs used to clamp the pipe. Each pin was modeled with 3,192 linear brick elements and 4,480 nodes. The model provides for constrained rotation of the pins around their main axis.

At the beginning of a simulation, the pins were initially clamped onto the tube at a specified pin gap spacing using a displacement time load curve and the gap spacing was fixed for the duration of the model run. Using the LS-DYNA program restart option, the pin constraints were then modified to allow free motion of the pins along a direction parallel to the tube axis in the direction of impact for the duration of the striker mass motion. When the striker mass hits the rigid pins, impact force was applied to the pin pair and set the pins in motion along the axis of the tube which was fixed at one end by the rigid ring member. The end of the simulation run was determined when the striker mass impact kinetic energy is dissipated by deformation of the tube by the pin pairs and the striker mass comes to rest. Using eta/PostGL, the total pin displacement, striker mass velocity and deceleration history were determined.

For two pin pair modeling, a modification of the single pin pair model was required to fix the inter pair spacing and orientation of the two sets of opposing pin pairs. In the two pin pair tube dissipater configuration, a common intermediate surface shared by both pin pairs was added. As shown in FIG. 5 a slotted intermediate surface was provided with eight small rigid plates for supporting eight beam elements connected to the ends of each of the four pins which comprise the two pin pairs. These additional elements provided for fixed spacing between the pin pairs as well as perpendicular orientation of the pairs. The combination of the pins, beams, small plates and intermediate surface for a unique rigid body where the same model displacement conditions applied to the pins are also applied to the beams, small plates and intermediate plate. The shape of the striker or impact mass was also modified to conform to the shape of the common intermediate plate. This approach guarantees perfect contact of the two bodies during impact, thereby avoiding force concentration inside the element used to mesh the geometry. The striker mass transfers impact force to the common intermediate plate to initiate movement of the pin pairs along the tube axis. Due to the rigidity of the assembly, the corresponding pin pairs maintain their relative spacing and orientation during tube deformation and kinetic energy dissipation.

D. Dissipater Design Parameters

The pull-through dissipaters of the present invention comprise a configured array of rigid pins, a deforming member which is fed through the pins and progressively deformed and a rigid frame which supports the pins and deforming member and provides for feeding the deforming member through the pin array under conditions of high mechanical loading. By varying the dissipater component parameters and setting noted below, the force-time profile of the pull-through tube and strap dissipaters of the present invention may be tuned, adjusted and tailored to match a desirable deceleration profile for a variety of impact scenarios and applications.

1. Pin Characteristics a. Pin Materials

Due to the high stresses encountered during deformation of the deforming member, the dissipater pins employed must be resistant to bending and failure at the high stresses encountered during deformation of the dissipater deforming element. Preferred pin materials include, but are not limited to stainless or carbon steels having an appropriate yield strength and hardness for the intended application. Typically, pull-through strap dissipater pins require a higher yield strength than those used for pull-through tube dissipaters. In preferred embodiments, pins are machined from A36 or 1018 steel. For exterior deployments, where environmental degradation may occur, galvanized structural steels such as galvanized 1018 steel are preferred. While stainless steels may be used for corrosive environments, the cost of stainless steel alloys is generally prohibitive for most applications. The selection of appropriate pin mechanical properties for a particular dissipater implementation may be readily accomplished by one skilled in the art using structural analysis methods known in the art.

b. Rolling Versus Stationary Pins

The pull-through energy dissipater of the present invention may employ either stationary or rolling pins. As noted above, since the pull-through force $F_{PT}$ has both a frictional component $P_C \cdot \mu_F$ and a non-frictional deformation component $P_C \cdot \mu_{PT}$, stationary pins tend will increase friction during pull-through of the deformation member, thereby increasing the pull-through force $F_{PT}$ and enhancing kinetic energy dissipation due to the additional frictional forces which are added to the deformation forces. However, frictional forces are difficult to control and subject to environmental factors such as humidity, rain, snow and ice, dust, rust and ambient temperature. Thus, for dissipaters which employ stationary pins, variations in frictional forces due to environmental factors lead to variation in pull-through force and energy attenuation characteristics which create problems with establishing design requirements.

For dissipaters which employ rolling pins, where lubricated pins are employed the frictional component is negligible ($\mu_F \approx 0$) and the pull-through force is dominated by the non-frictional deformation component $P_C \cdot \mu_{PT}$. For example, assuming that rolling pins are employed with a single pin pair HDPE energy dissipater having a frictionless pull-through coefficient $\mu_{PT}$ of 0.5, that there is essentially no sliding between the pin and pipe and that the pins rotate in lubricated pins seats, the friction term is negligible (i.e. $\mu_F = 0$) and the pull-through force $F_{PT}$ would be approximately 50% of the clamping force since $$F_{PT} = P_c(\mu_F + \mu_{PT}) = P_c(0 + 0.5) \approx 0.5 P_c$$

When stationary pins are employed, the frictional forces may provide a substantial contribution to the pull-through force. For example, assuming stationary pins, a dynamic coefficient of friction between steel and HDPE of approximately 0.10 and a single pin pair HDPE energy dissipater having a frictionless pull-through coefficient $\mu_{PT}$ of 0.5, the pull-through force $F_{PT}$ would be approximately 60% of the clamping force since $$F_{PT} = P_c(\mu_F + \mu_{PT}) = P_c(0.1 + 0.5) \approx 0.6 P_c$$

While the use of stationary pins will dissipate more energy and create larger pull-through forces, the pull-through force and energy dissipation characteristics of stationary pin dissipaters are less predictable than those of rolling pin dissipaters due to variations in frictional forces caused by environmental factions. Furthermore, stationary pins may also generate undesirable frictional heating which influences the performance of the dissipater. This factor must be taken into consideration with pull-through dissipaters when employing either thin cross-section straps, thin-walled tubes or heat sensitive materials such as HDPE. Thus, although stationary pin dissipaters may dissipate more kinetic energy, in preferred dissipater embodiments, rotating pins are generally preferred due to greater consistency in pull-through force and energy dissipation performance.

c. Pin Diameter

In both finite element modeling and experimental evaluation of various pull-through strap and tube dissipater embodiments of the present invention, a range of pin diameters were considered, ranging from 12.7 mm, 19.1 mm, 25.4 mm to 31.8 mm. For pull-through strap dissipater modeling, each of these diameters evaluated. For strap dissipater experimental testing, 19.1 mm diameter pins were typically employed although some 12.7 mm diameter pin testing was conducted. For pull-through tube dissipater modeling and experimental testing, only 25.4 mm pin diameters were evaluated. It is important to note that other pin diameters may be employed following the teachings herein, depending on the mechanical requirements anticipated for a particular deforming material properties, shape and cross sectional dimension, the force-time profile and resultant pull-through force. For example, when high load stresses are anticipated, large pin diameters may be employed to prevent pin bending. Where gentle deceleration profiles are desirable and low pull-through forces are anticipated, small pin diameters may be employed.

Depending on pin orientation, paring and spacing, the pin diameter has a noticeable influence on pull-through force and energy dissipation in dissipater systems of the present invention. Due to the pin array configuration, during operation the deforming element is repeatedly urged against successive pins and forced to bend and conform to the curvature of each pin as it is pulled through the dissipater pin array. For pull-through tube dissipaters with opposing pins in each pin set, large pin diameters result in relatively gentle curvatures which require more modest pull-through forces. In tube dissipaters where multiple pin pairs or pin sets are employed, smaller diameters, especially when combined with small spacing ratios, force the material to assume a high degree of curvature which will result in increased deformation and a larger pull-through force. In single pin-pair or pin set systems, the effect of diameter is somewhat reduced because the material is not constrained along its length and the strains are free to distribute themselves longitudinally.

d. Pin Clamping Ratio

The clamping ratio is the distance or gap between opposing pins in a pin pair or pin set as a percent of the original diameter. The clamping distance or pin gap is directly related to the amount of distortion in produced in a deforming member cross-section due to a reduction in the distance between the opposing pins through which the deforming member is pulled. As the pin-to-pin distance is reduced, the clamping force exerted on the section and therefore the pull-through force is increased. By way of example, if an undeformed tube diameter is 89 mm and the dissipater pins are tightened until the pin-to-pin distance is 35 mm, the clamping ratio for the pins is given as $$CR = \frac{(89 - 35)}{89} = 0.607 \text{ or } 60.7\%.$$

Figure 7:
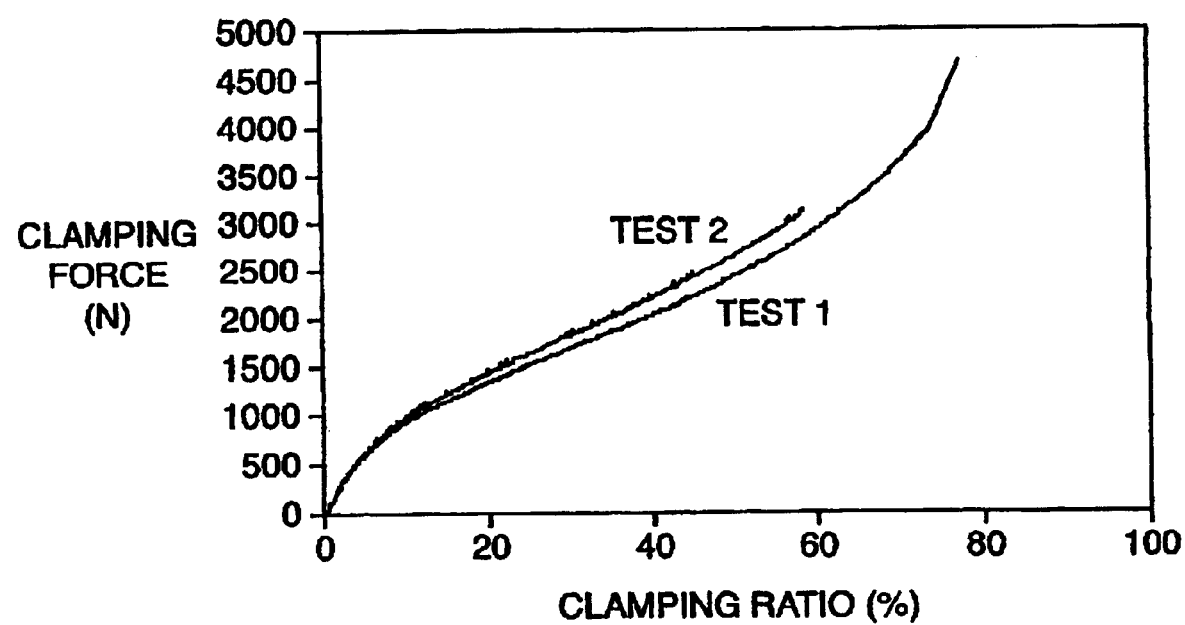
FIG. 7 shows a plot of clamping force as a function of clamping ratio for an 89-mm diameter 6-mm thick HDPE pull-through tube dissipater comprising a single pin pair.
Figure 8:
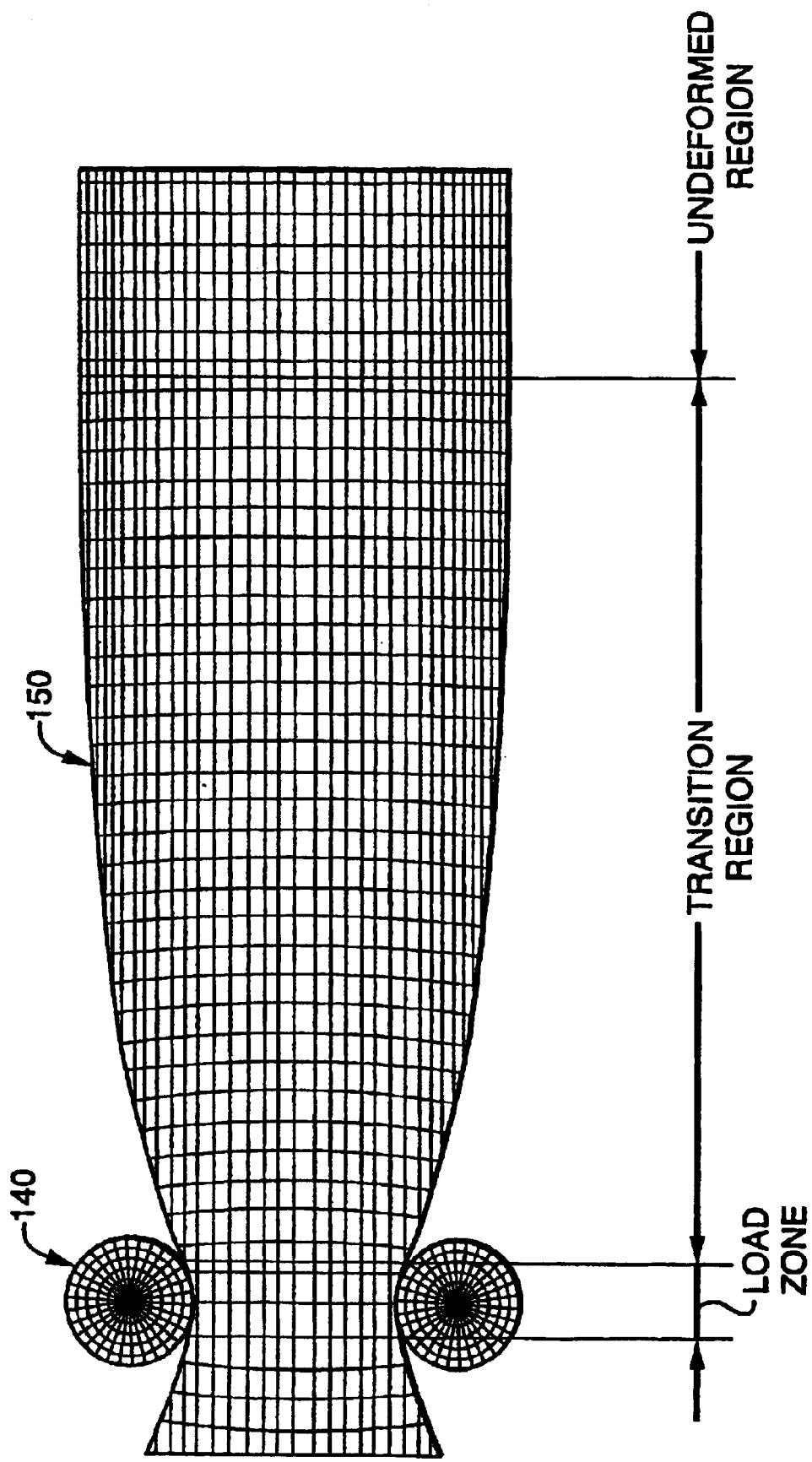
FIG. 8 shows a schematic of the tube deformation profile due to the pin clamping force along an HDPE tube.

To evaluate the effect of the clamping ration on pull-through tube dissipater performance, experiments on a 89-mm diameter, 6-mm thick HDPE pipe section clamped between two 12-mm diameter stationary pins were performed. Since the pins were stationary in this test, frictional forces contributed to the pull-through force and were calculated assuming an HDPE-steel dynamic coefficient of friction $\mu_F$ of 0.10. The results are summarized in Table 1 where the pull-through force $F_{PT}$, clamping force $P_C$ and frictionless pull-through coefficient $\zeta$ are shown as a function of the pin gap and clamping ratio. In FIG. 7 the variation in clamping force with clamping ratio is plotted. As shown in Table 1 and FIG. 7, as the clamping ratio increases, the clamping force, pull-through force and frictionless pull-through coefficient increase.

TABLE 1

Influence of Clamping Ratio on Pull-Through Tube Dissipater Performance.

| Face to Face Pin Pair Gap (mm) | Clamping Ratio (%) | Clamping Force, $P_C$ (N) | Pull-through Force, $F_{PT}$ (N) | Frictionless Pull-through Coef. ($\zeta$) |
|---|---|---|---|---|
| 20 | 77.5 | 4673 | 6542 | 1.4 |
| 30 | 66.3 | 3177 | 4088 | 1.8 |

TABLE 1-continued

Influence of Clamping Ratio on Pull-Through Tube Dissipater Performance.

| Face to Face Pin Pair Gap (mm) | Clamping Ratio (%) | Clamping Force, $P_C$ (N) | Pull-through Force, $F_{PT}$ (N) | Frictionless Pull-through Coef. ($\zeta$) |
|---|---|---|---|---|
| 35 | 60.7 | 2838 | 3363 | 1.1 |
| 40 | 55.1 | 2558 | 2642 | 0.9 | e. Pin Spacing

The center-to-center distance between adjacent pin pairs or pin sets along the length of a deforming element section is referred to as the pin pair spacing. The spacing ratio is the ratio between the pin pair spacing distance and the deforming section cross section dimension or diameter. As shown noted above, the frictionless pull-through coefficient may be expressed as $$\mu_{PT} = \zeta(1+\lambda(n-1))$$

where $\lambda$ is the spacing coefficient, $\zeta$ is the frictionless pull-through coefficient and n is the number of pin pairs or pin sets. Laboratory evaluations and modeling results have shown both experimentally and analytically that if the pin pair spacing ratio is greater than five for a two pin pair pull-through HDPE tube dissipater, the pull-through force is simply additive and $\lambda=1.0$. For example, if an 89-mm diameter HDPE tube is employed as the deforming element and the rigid pin pairs are spaced more than 445 mm apart, then two pin pairs (n=2) will result in twice the force as a single pin pair since $$(1+\lambda(n-1))=1.0+1.0(2-1)=2.0.$$

Similarly, a three pin pair (n=3) dissipater with a pin pair spacing greater than 445 mm apart will result in three times the force as a single pin pair:

$$(1+\lambda(n-1))=1.0+1.0(3-1)=3.0$$

The reason for this is that the distance between the pins is so great that the HDPE section has adequate time to resume its initial shape between the two pin pairs. For such large pin pair spacing the pin pairs act independently and therefore the affect on the pull-through force is cumulative. Table 2 shows the relationship between the spacing coefficient $\lambda$, spacing ratio and clamping ratio for a two pin pair configuration employing an 89 mm diameter, 6 mm wall thickness, HDPE tube dissipater.

As shown in Table 2, at spacing ratios below 5, the clamping ration has a greater influence on the spacing coefficient $\lambda$ and as the spacing ratio approaches 1.0, the spacing coefficient $\lambda$, resultant frictionless pull-through coefficient $\zeta$ and corresponding pull-through force increase at an increasing rate. The reason for this observed behavior is that the viscoelastic HDPE material does not have adequate time and space to recover its initial shape from passing through the first pin pair before it is distorted by the second pin pair. Thus, arranging adjacent pins pairs in an orthogonal orientation as shown in FIG. 1, can greatly increase the pull-through force required since the tube cross section must radically change its cross section shape when passing through the first pin pair and subsequent orthogonally-aligned second pair within a very short time frame and distance. For this reason, viscoelastic materials such as HDPE, which exhibit recoverable elastic-plastic deformation behavior, are preferred deforming materials for recovering maximum deformation energy from repeated deformations.

Table 2 shows results for four spacing ratios and four clamping ratios. As the spacing ratio decreases, the pin sets are closer together and the spacing coefficient increases. The increase is both a function of the spacing ratio and the clamping ratio since the strain-affected area in the deformed pipe is larger for larger clamping ratios. For a spacing ratio of 1.12, where the pin pair are spaced 1.12 times the diameter of the pipe, and a clamping ratio of

TABLE 2

Influence of Spacing Ratio and Clamping Ratio on Spacing Coefficient $\lambda$ for a Pull-Through Tube Dissipater.

| Spacing Ratio | Spacing Coefficient $\lambda$ Clamping Ratio | | | |
|---|---|---|---|---|
| | 0.7753 | 0.663 | 0.607 | 0.551 |
| 1.12 | 4.91 | 3.69 | 2.68 | 1.81 |
| 1.69 | 1.45 | 1.42 | 1.08 | 1.36 |
| 2.25 | 1.44 | 1.19 | 1.06 | 1.30 |
| >5 | 1.00 | 1.00 | 1.00 | 1.00 |

0.663, the spacing coefficient is equal to 4.91 and the pull-through force would be $(1+\lambda(n-1)=1.0+4.91(2-1)=$ 5.91 more than a single pin set. If three pin sets were used with the same clamping ratio and spacing ratio, the pull-through force required would be $(1+\lambda(n-1)=1.0+4.91(3-1)=$ 10.82 times greater than that of a single pin set.

Changing the spacing is one of the most effective ways of changing the pull-through force observed for a particular type of pull-through energy dissipater. The spacing ratio where the spacing coefficient becomes zero represents the distance where pin sets act independently. This critical ratio is a function of the number of pins in the pin set. For dissipaters with two pins per pin set the ratio is five whereas for four pins per pin set the ratio is one and for eight pins per pin set the ratio is 0.5. However, as shown below, adding additional pins to a pin set constrain the deformations to increasingly smaller regions.

f. Pin Grouping

In pull-through tube dissipaters of the present invention, as a tube is pulled through the pins the pull-through force will depend upon the clamping force between the pins and the tube. A key factor that influences the pull-through force is the number and arrangement of pins in a pin group or pin set since the pin positions around the tube control the deformed shape of the deforming element as it passes through the pin set. For example, FIG. 4 and FIG. 5 illustrate a circular tube that has been deformed into an oval shape by the compression produced by a single two pin set, or pin pair, with two opposing pins.

The radius of curvature of the deformed section on the downstream side of a pin set is a significant factor in determining the distribution of strains in the cross-section and hence the pull-through force. For a given tube diameter and thickness, the radius of curvature of the deformed section increases as the pins within a pin set are clamped closer together and the pin gap decreases. The radius of curvature of the deformed section also increases as the thickness of the tube increases. One alternative method for controlling the radius of curvature and distribution of strains in the deformed section is to introduce additional pins to a pin set that restrict the deformations caused by the initial pins in the set. For example, in order to restrict the deformation caused by the initial pins in a two pin set with opposing parallel aligned pins, the most effective orientation for the second pin pair would be to position it orthogonal to the first. As noted above, the pull-through force increases very rapidly as the spacing between the adjacent pin sets is reduced. This is primarily due to an increase in the radius of curvature of the deformed section on the downstream side of tube around one set of the pin pairs. This causes an increase in the longitudinal component of force on that set of pins as the dissipater moves along the tube. For example, consider the upper pin pair in the two-pin-pair tube dissipater shown in FIG. 1. The curvature of the tube on the downstream or lower side of the top pin pair is much greater due to the presence of the bottom pin pair, while the curvature of the tube on the downstream side of the second pin pair is only moderately changed. In this case the loading on the lower pin pair should be only moderately higher than would be the case for a single pin pair or pin set, while the upper pin pair experiences much greater loading. This suggests that the optimum spacing of the pin pairs should be zero, in which the deformation would be symmetrical and the loading would be equivalent on both pairs of pins.

Figure 9A:
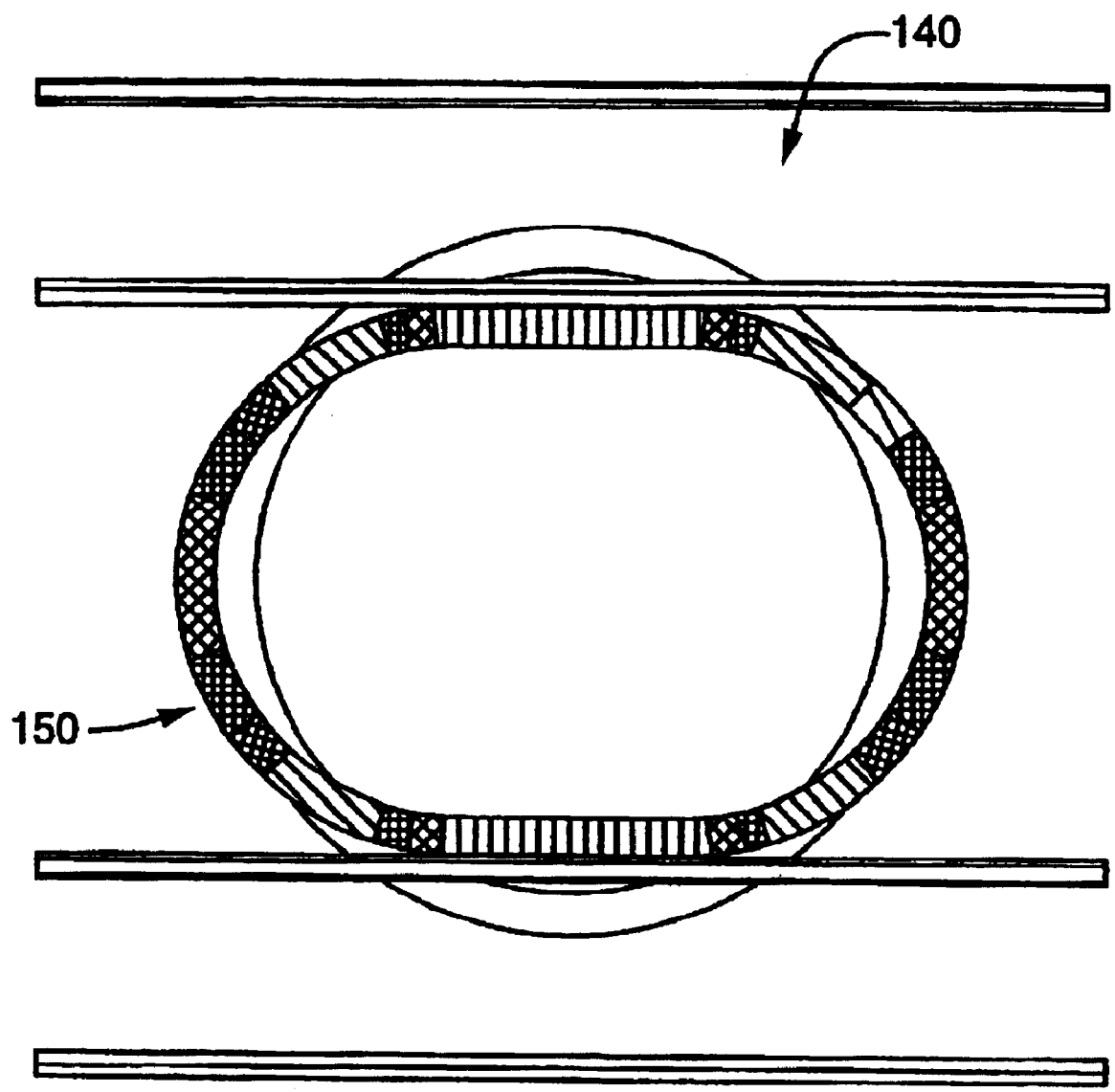
FIGS. 9A–9C show schematics of a deformed transverse tube cross-sections and associated stress distributions for two (FIG. 9A), four (FIG. 9B) and eight (FIG. 9C) pin set configurations.
Figure 9B:
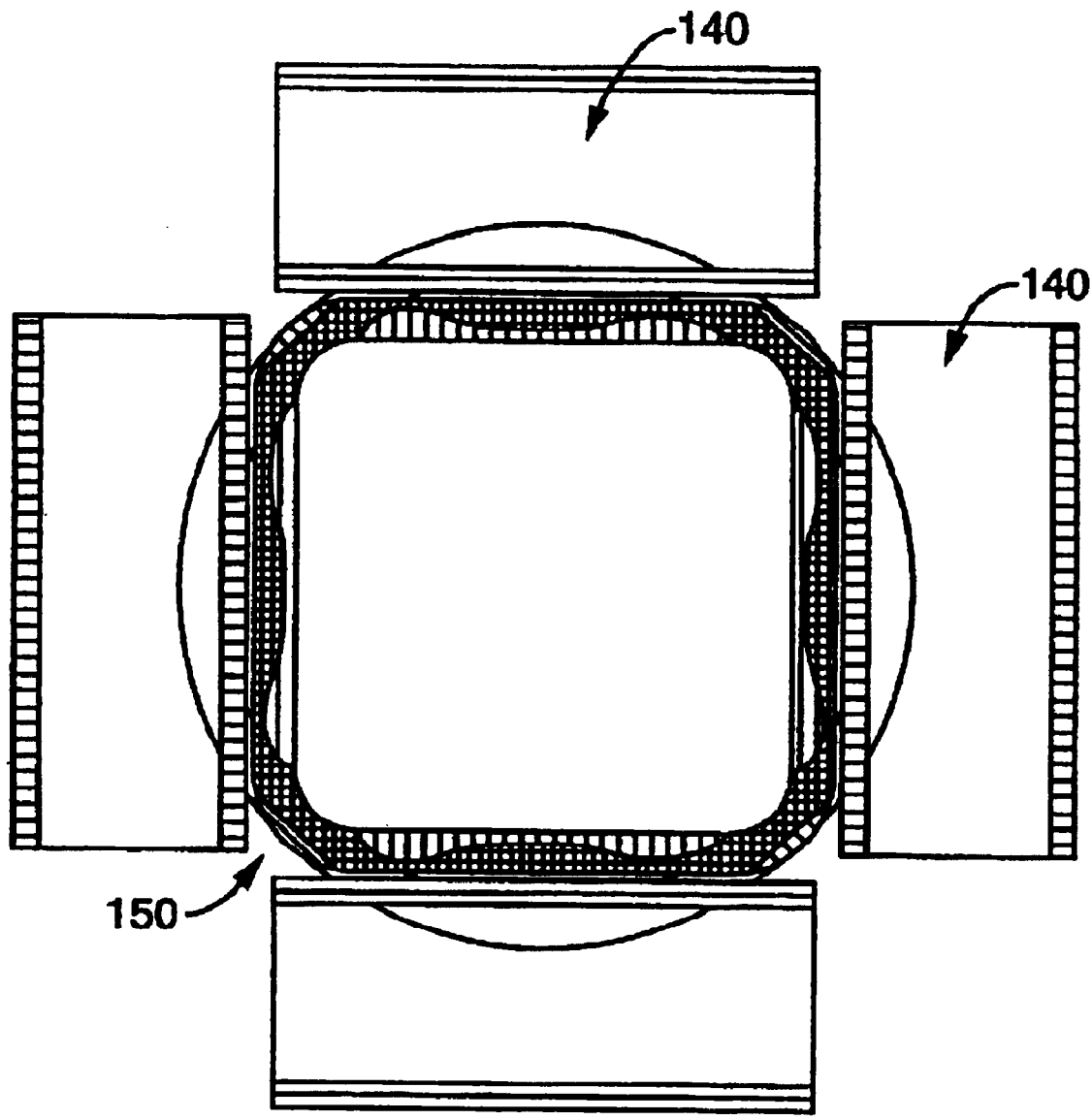
Figure 9C:
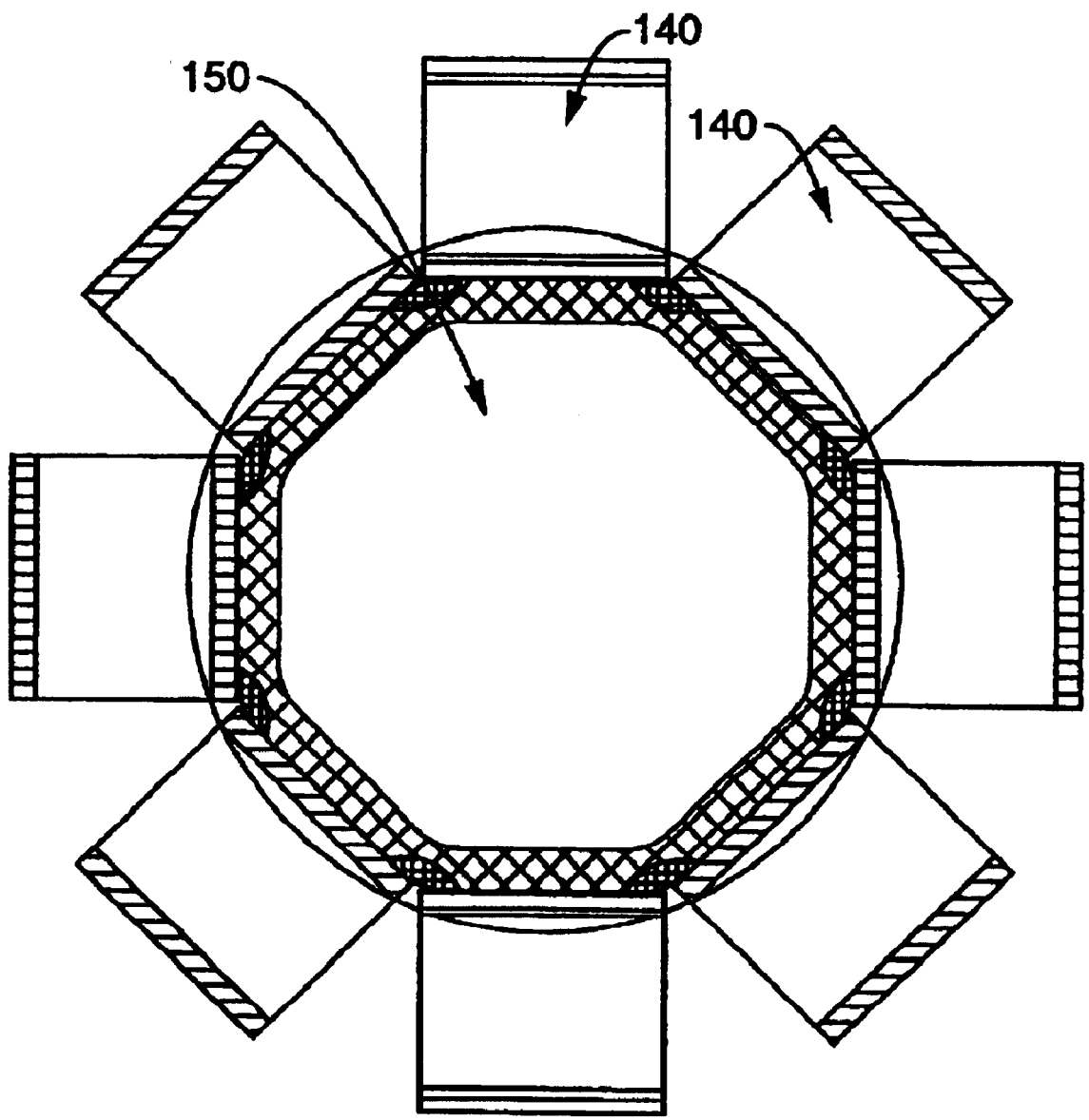
Figure 10A:
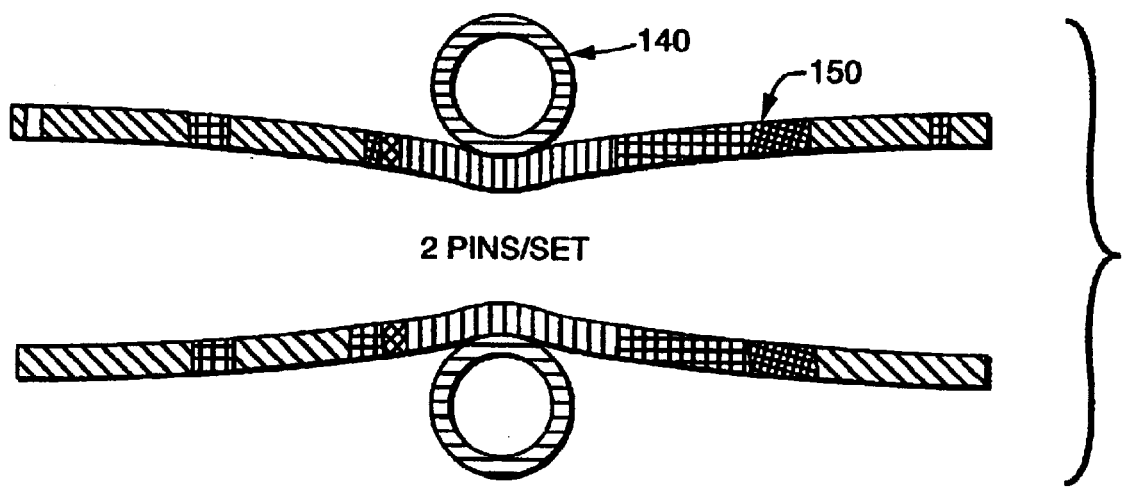
FIGS. 10A–10C show schematics of deformed longitudinal tube cross-sections and associated stress distributions for two (FIG. 10A), four (FIG. 10B), and eight (FIG. 10C) pin pair configuration.
Figure 10B:
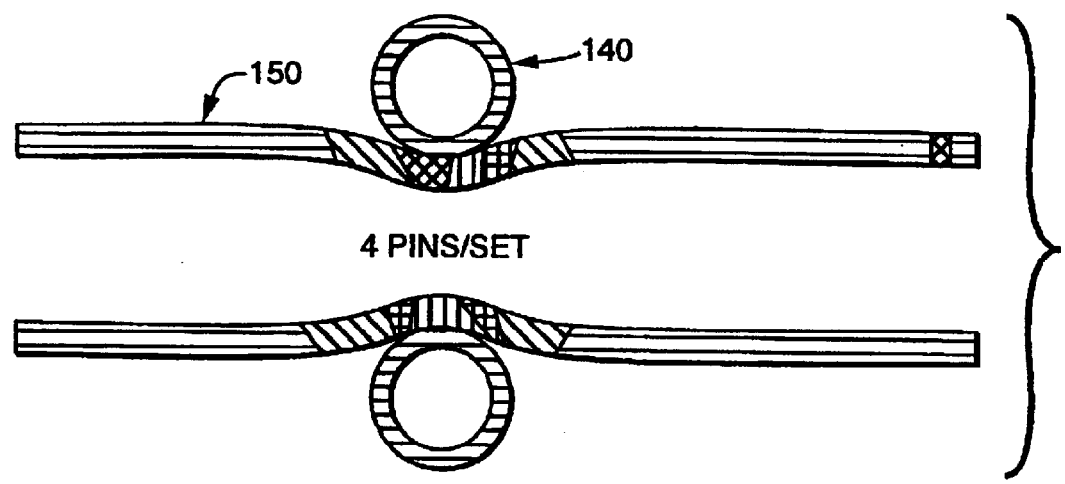
Figure 10C:
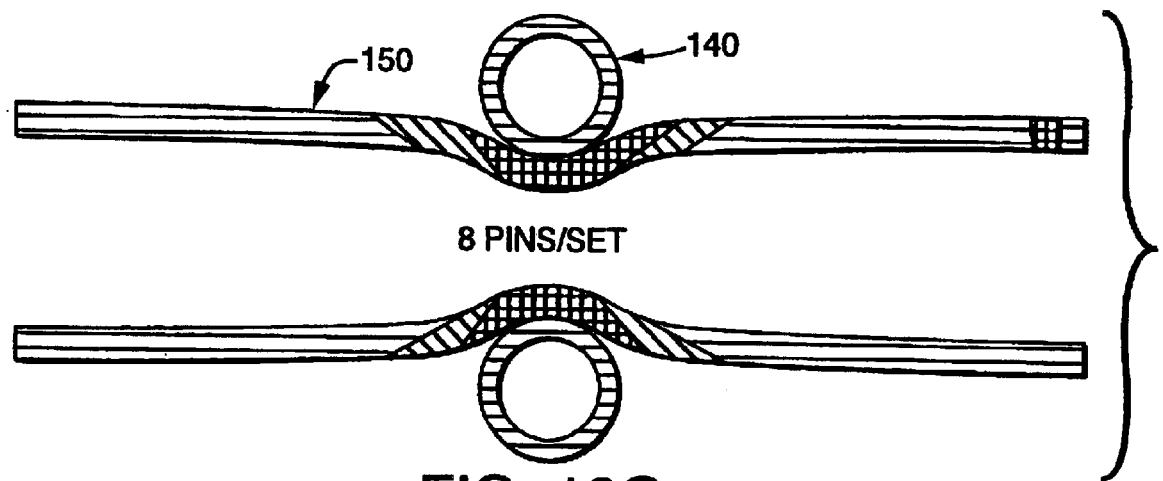
Figure 11:
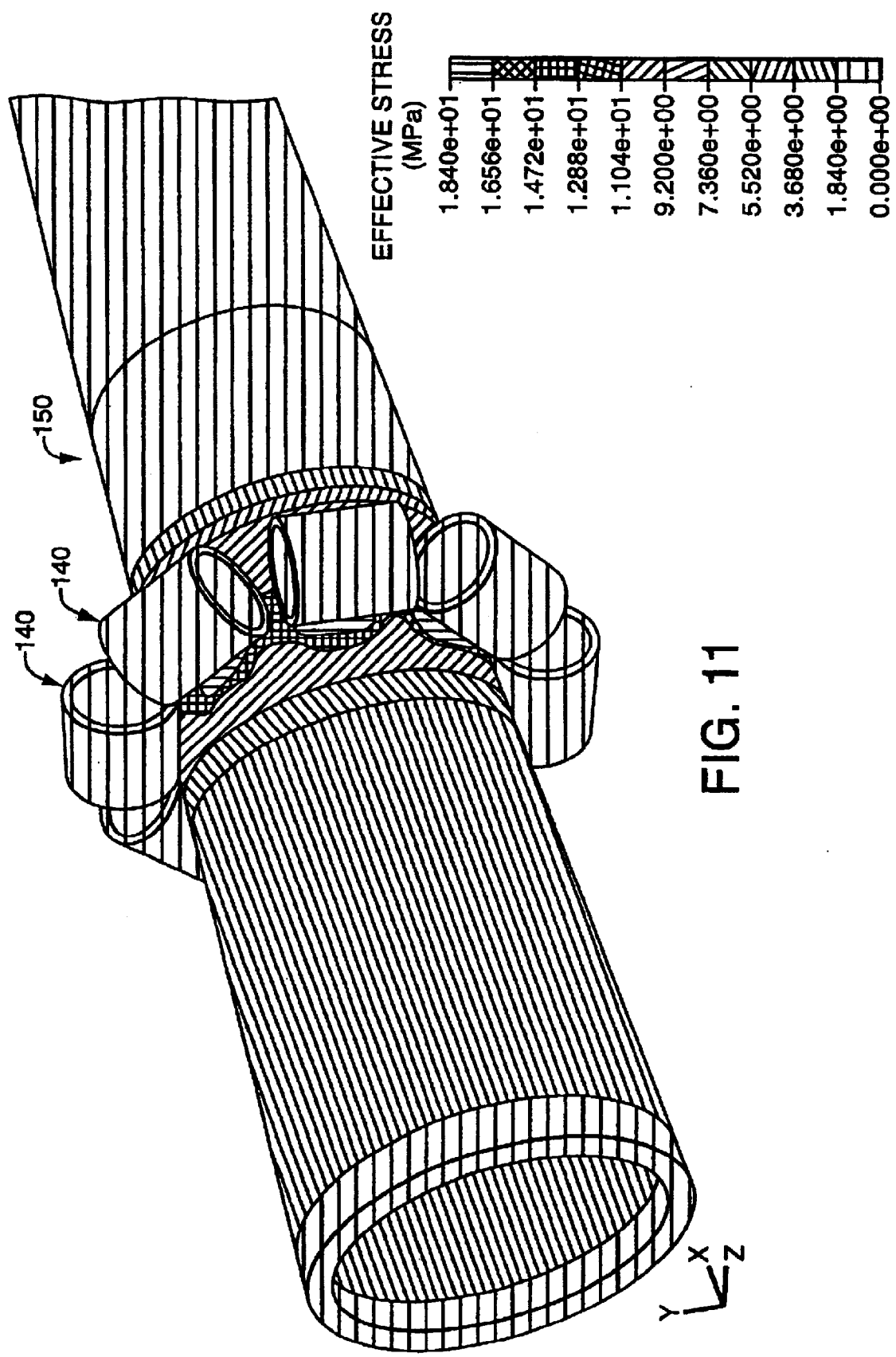
FIG. 11 is a schematic of calculated Von Mises stress contours in a eight pin pair HDPE tube pull-through dissipater.

A finite element analysis of the effect of the number and arrangement of pins in a pin set was made for a pull-through HDPE tube dissipater with three different pin set configurations: a) a pin set containing two pins, one pair of opposing pins; b) a pin set containing four pins, two pairs of opposing pins, arranged orthogonally in a rectangular shape; and c) a pin set containing eight pins, four pairs of opposing pins arranged at an angle of 45° to one other in an octagon shape. An HDPE pipe with an 89-mm diameter and 6-mm wall thickness was modeled. The gap between opposing pins within each pin set was 70 mm in all cases. FIGS. 9A–9C compare a model of the deformed tube cross sections and associated tube stress distributions for a two, four and eight pin set case. FIGS. 10A–10C illustrate the increase in the radius of curvature of deformed cross sections and associated stress distributions with four pin and eight pin sets compared to a two pin pair set. In FIGS. 9A–9C and 10A–10C, the stress distributions within cross sections are shown by differences in hatching. A key to stress level hatching for FIGS. 9A–9C, FIGS. 10A–10C and FIG. 11, is provided in the side bar of FIG. 11. The clamping load was the same for all pins and tube deformation was symmetrical. For the two pin per set case, the calculated pull-though force was 250 N. For the four and eight pin per set cases, the pull-through force was 3800 N and 11,560 N, respectively.

Figure 12:
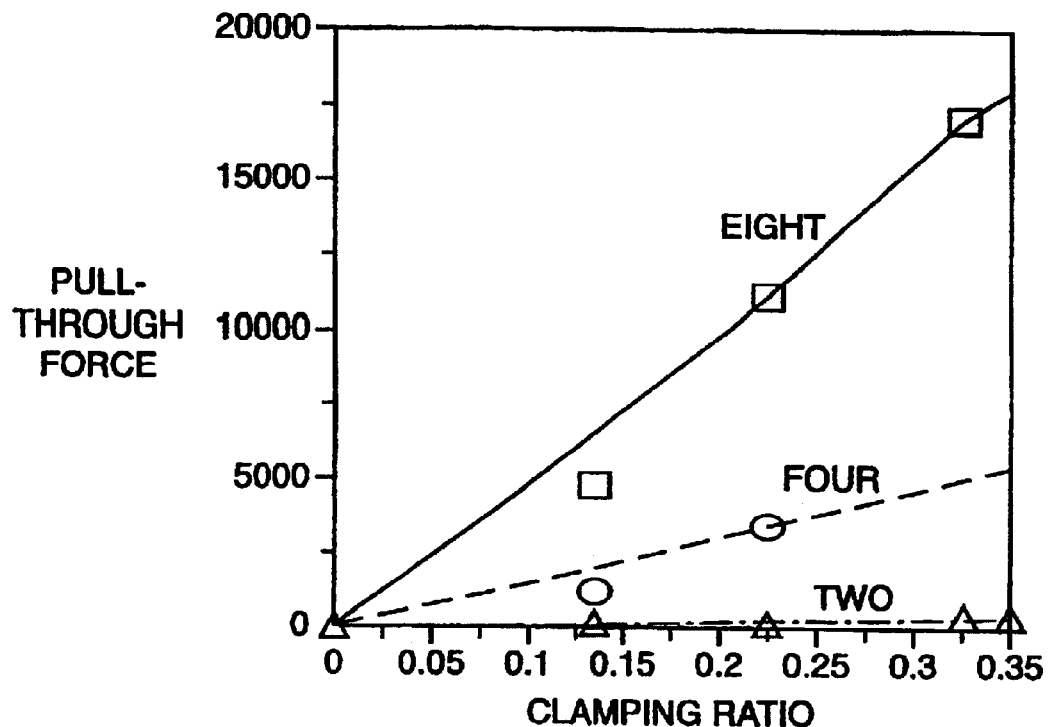
FIG. 12 shows a plot of pull-through force as a function of clamping ratio for two, four and eight pin pair HDPE pull-through tube dissipaters.

With the four pin per set configuration shown in FIG. 9, the stresses in the deformed tube are 135 percent higher than the two pin per set configuration. In the case of the two pin per set configuration the stresses are more uniformly distributed around the cross-section. As the shape of the deformed cross-section approaches that of a circle the stresses in the cross-section will increase and will approach uniformity in which case the efficiency of the device will be optimum. For example, in FIG. 11 note the uniformity of the computed stress contours and distribution in a modeled eight pin per set configuration comprising four pairs of opposing pins. The influence of the number of pins per pin set on a tube dissipater pull-through force is clearly demonstrated in the modeling results shown in Table 3 and plotted in FIG. 12, where the pull-through force is strongly dependent on the number of pins per pin set, the pin clamping ratio and the ratio of the tube diameter to tube wall thickness.

TABLE 3

Influence of Clamping Ratio and Pin Set Size on Pull-through Force for Tube Dissipater.

| | | Clamping Ratio | | |
|---|---|---|---|---|
| D/t | Pins/Set | 0.326 | 0.225 | 0.135 |
| 14.833 | 2 | | 250 | |
| 14.833 | 4 | | 3,460 | 1,200 |
| 14.833 | 8 | 17,056 | 11,056 | 4,800 |
| 11.125 | 8 | | 16,448 | 7,360 |

Unlike the tube dissipaters of the present invention, the pins in strap dissipaters are not grouped together in pin sets, however pin set configuration has an equally significant influence on pull-through force for these strip dissipaters. As shown in FIG. 2 and FIG. 6, with pull-through strip dissipaters the pins are not grouped together in opposing configurations but rather are typically placed within the same plane as the deforming member with the strip weaving through an array of co-planar pins. With strap dissipaters, the pull-through force will increase with the number of pins in the dissipater. In Table 4, the influence of the number of pins in a pull-through strip dissipater on both experimentally

TABLE 4

Variation in Pull-Through Force for Steel-Strap Dissipater.

| | Pull-through Force, $F_{PT}$ | |
|---|---|---|
| No. Pins | Experiment (kN) | Simulation (kN) |
| 4 | 11.2 | 11 |
| 5 | 18.1 | 16 |
| 6 | 25.4 | 22 |
| 8 | 42.4 | 36 | measured and finite element modeled calculated pull-through force is provided for one strap dissipater embodiment which employs a 50.8 mm wide, 3.2 mm thick steel strap with a 250 MPa strength. As shown by the data, the pull-through force increases linearly with the number of pins within the range shown.

2. Deforming Element Characteristics

The energy absorbing characteristics, force-time profile and deceleration performance of pull-through strap and tube dissipaters of the present invention are significantly influenced by the characteristic properties of the deforming element and the deforming cross-sectional shape and dimension. While a wide variety of inelastic and viscoelastic materials and material cross sections may be employed as deforming elements, the basic properties and characteristics which influence dissipater response to impacting masses having various kinetic energies are reviewed below.

a. Materials

A wide variety of ductile metallic and plastic materials may be used as the deformation element member in the pull-through energy dissipaters of the present invention provided they possess the requisite inelastic, elastic-plastic or viscoelastic behavior and sufficiently high strength. The primary requirement for any deformation element material is that the material exhibits inelastic, plastic or viscoelastic behavior and that the tensile strength exceeds the anticipated pull-through stress for a particular application. Virtually any plastically deformable material which meets these basic requirements may be employed as a deformation member. For high impact force applications, stainless or carbon steels are preferred due to their exceptionally high yield strengths and ductility in the unhardened state. For these applications, particularly where pull-through strip dissipaters are employed, hot-rolled A36 1030 steel is a preferred deformation element material.

For achieving high energy dissipation efficiency, viscoelastic materials are generally preferred since viscoelastic deformation elements may be repeatedly and successively deformed while recovering most of their original shape between deformation cycles. Due to repeated deformation of such materials as they travel through the pull-through dissipater, these materials are preferred for maximum energy absorption capacity per unit length. While any viscoelastic material which has a tensile or compressive strength in excess of the deforming load and which recovers its original shape on release of a deforming load may be employed, high-density polyethylene has been shown to be particularly useful as a deformation element and may used in either pull-through tube or strap dissipaters. Other plastic-elastic or viscoelastic materials possessing similar load deformation and shape recovery behavior may also be employed. For instance, such materials may include, but are not limited to, thermoplastics such as polypropylenes, polypropylene homopolymers, polypropylene copolymers and polyallomers of ethylene and propylene.

b. Cross-Sectional Shape

The deforming element cross-section can, in principle, take any shape. In the pull-through strap dissipater embodiment of Example 1, steel straps with a solid rectangular cross section were employed. In the pull-through tube dissipater of Examples 2–5, high density polyethylene HDPE tubes with a hollow tubular cross section were used. In alternative embodiments, solid or hollow cross section of virtually any shape may be employed including, but not limited to, conventional shapes such as triangles, circles, ellipses, squares, rectangles, trapezoids, parallelograms, pentagons, hexagons and other regular or irregular polygons. For hollow tubular cross-sections, useful shapes include, but are not limited to, triangular, square, rectangular, circular, ellipsoidal or any polygonal shape. For hollow cross sections, one or more tubular shapes may also be nested inside an outer tube so as to provide for a variable pull-through force and variable energy dissipation along the length of the deforming member. For example, a smaller pipe section inside another larger pipe section could provide a means to increase the pull-through force when the dissipater reaches a particular location. In alternative embodiments, with solid cross section deforming members, cross-sectional dimension or shape may also be varied along the length of the deforming element to provide for variable pull-through force and energy dissipation. For example, a deforming element with a solid rectangular cross section may have an increasing or decreasing thickness or width along its length to provide for a variable force-time profile during deformation.

The choice of a particular deforming member cross-section shape and dimension is generally influenced and governed by the determination of the clamping force. Different types of cross-sections display different types of collapse and clamping mechanisms. For example, polygon shapes with corners will tend to deform by concentrating strains at the corners and developing plastic hinges at those locations. In contrast, circular shapes may, depending on the material, spread the strains more evenly through the cross-section and deform more uniformly. The choice of cross section may also depend on the mechanical properties of the deforming member. For example, a thin-walled steel tube generally exhibits four plastic "hinge" regions when compressed between two flat plates whereas an HDPE tube generally exhibits a uniform variation in strain throughout its cross-section.

In some applications, an impacting object may be highly sensitive to deceleration forces and a more gradual decrease or increase in resistance force, rather than a stepwise force change, may be required. Under these conditions, a smooth variation in pull-through force and deceleration may be achieved by a gradual variation in the deforming member profile. Thus, a variation in cross-section dimensions along the deforming element length will produce a variation in the pull-through force and energy dissipation since the cross-section is getting larger or smaller as it is pulled through the dissipater. For example, a steel-strap dissipater that is 50-mm wide at one end and 100-mm wide at the other will double the pull-through force in pulling the steel deforming straps from one end of the device to the other. Similarly, a lengthwise gradation in strap thickness would have a similar effect. This approach would also have utility for pull-through tube dissipaters. For example, he use of a telescoping tube configuration, where tubes of varying diameter and length are placed either within one another or outside one another along the length of the deforming element, would a similar graded variation in pull-through force and energy dissipation for pull-through tube dissipaters. Alternatively, conical shaped tubes, convergent-divergent tube shapes and tubes having varying cross sectional diameter or wall thickness may be employed to produce similar gradients in pull-through force and energy dissipation along tube lengths. Alternative approaches for producing pull-through force and energy dissipation gradients in both pull-through tube and pull-through strap dissipaters, include modification of the stiffness of deforming member materials along their length by way of heat treatments, work hardening or material removal by machining.

c. Cross Section Dimensions: Diameter, Width and Thickness

Figure 13:
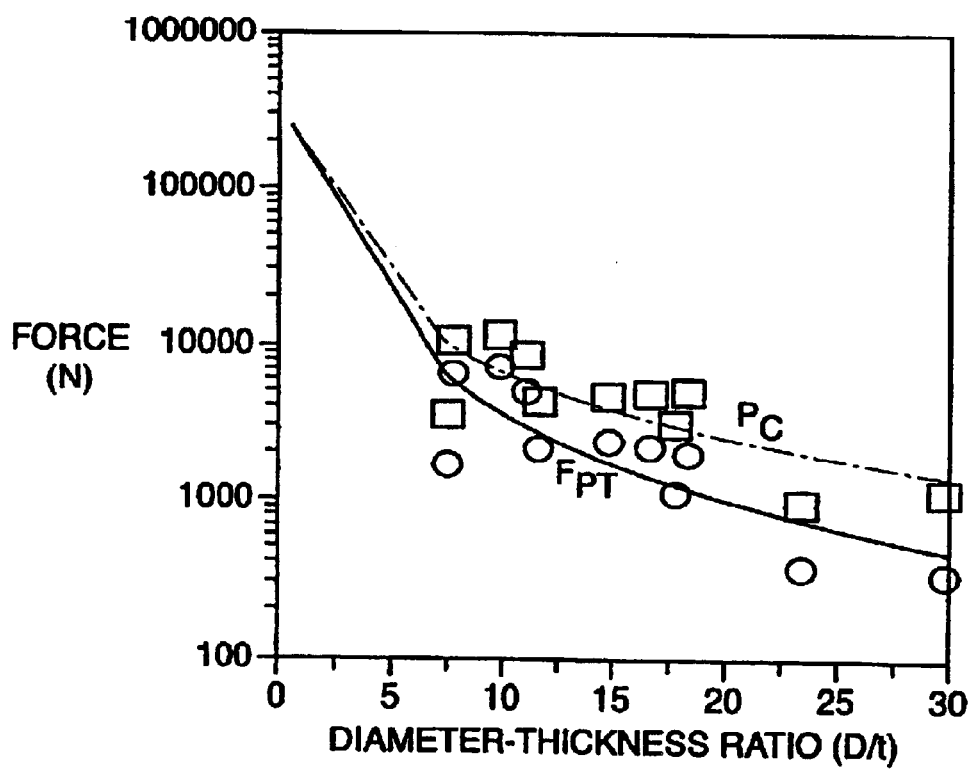
FIG. 13 shows a plot of clamping force and pull-through force as a function of tube diameter-thickness ratio for an HDPE pull-through tube dissipater having a single pin pair with a clamping ratio of 0.775.

One particularly useful embodiment of the deforming section of a pull-through energy dissipater is a circular tube. FIG. 13 shows the experimentally derived relationship between the pull-through force $F_{PT}$ and clamping force $P_C$ and tube diameter to thickness ratio for a single set two-pin per set HDPE pipe dissipater and the clamping and pull-through forces for a clamping ratio of 0.775. This plot was generated with the data of Example 2. In FIG. 13, the dashed line represents the clamping force and solid line represents the pull-through force. The ratio between the two lines is the single set frictionless pull-through coefficient for this configuration. For a given clamping ratio, the clamping force decreases as the diameter-thickness ratio increases since the pipe wall thickness decreases for a given diameter. While FIG. 13 shows the results for a single clamping ratio, it is also possible to plot similar families of curves for different clamping ratios. As shown in FIG. 13, the distance between the clamping force line and the pull-through force line increases with increasing diameter thickness ratio.

Figure 14:
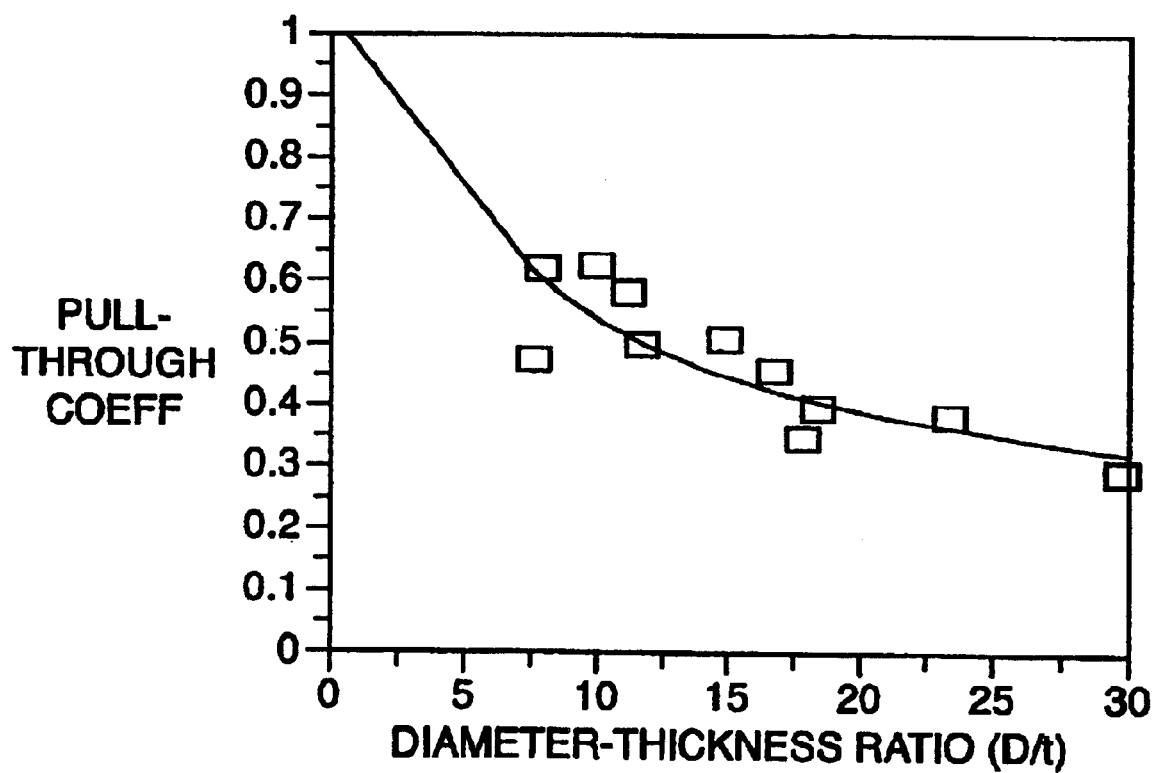
FIG. 14 shows a plot of the frictionless pull-through coefficient as a function of tube diameter-thickness ratio for single pin pair HDPE pull-through tube dissipater with a clamping ratio of 0.775.

The single-set frictionless pull-through coefficient for this dissipater configuration with a clamping ratio of 0.775 is shown in FIG. 14. For a diameter-thickness ratio of 0.5 (i.e., the tube thickness is half the diameter) is one because the surfaces are in contact. The pull-through coefficient decreases with increasing diameter thickness ratio as shown in FIG. 14. In the limit, the pull-through coefficient for an infinite diameter thickness ratio would be zero. Thus, for enhancing dissipater pull-through force and energy dissipation in tube dissipaters, small diameter, thick walled tubes are preferred to large diameter, thin walled tubes. For pull-through strap dissipaters, where rectangular shaped cross sections are utilized, variation in deforming element cross section width-thickness ratios would exhibit similar. Thus, pull-through force and energy dissipation for wide, thin straps would generally be lower than straps with thicker cross sections having reduced widths and more narrow, thick straps. However, as noted herein, the relatively higher forces encountered with deforming thick straps may lead to undesirable pin bending and dissipater damage.

d. Deformation Behavior

The deformation behavior of simple cross sectional shapes has been studied primarily for metals having cylindrical and rectangular cross sections. For example, bending mechanisms for rectangular metal cross section have been studied by Johnson and Mamalis [see W. Johnson and A. G. Mamalis, "Crashworthiness of Vehicles", Engineering Publications Ltd. (London 1978)]. In addition, the bending or collapsing behavior of hollow metal cylinders or tubes has been studied by DeRuntz and Hodges [see J. A. DeRuntz and P. G. Hodges, "Crushing of a tube between rigid plates," *Journal of Applied Mechanics,* American Society of Mechanical Engineers, Volume 30, 1963.]

Neglecting friction effects, Johnson and Mamalis found that the force required to pull a metal plate around a cylindrical roller is given by the equation:

$$T = \frac{Y \cdot w \cdot t^2}{2R + t}$$

where T is the pulling force, Y is the yield stress of the material, w is the width of the plate, t is the thickness of the plate, and R is the bending radius. For a series of n pins, the total pull-through force for a pull-through strap dissipater may be estimated by summing the individual pull-through force for n−1 pins, since the initial pin merely guides the plate. This simple equation shows the general trend that higher pull-through force is required with smaller diameter pins, high yield strength materials and plates having a larger cross-section Collapse mechanisms for hollow cylindrical metal cross sections have been studied extensively and determining the clamping force as a function of the clamping distance is often relatively easy. For example, DeRuntz and Hodges developed the following simple analytical model for the quasi-static lateral compression of a metal tubes between two flat plates. [see J. A. DeRuntz and P. G. Hodges, "Crushing of a tube between rigid plates," *Journal of Applied Mechanics,* American Society of Mechanical Engineers, Volume 30, 1963.]

$$P_c = \frac{2\sigma_y t^2 L}{D}$$

where $P_c$ is the collapse load or clamping force, $\sigma_y$ is the material yield stress, L is the length of the tube, t is the thickness of the tube and D is the tube diameter. The metal tube material was considered as rigid-perfectly plastic since, when subjected to a lateral load metal tubes generally collapse by forming four distinct plastic hinges connecting four rigid regions with energy dissipation being localized in these four plastic hinges.

Viscoelastic materials such as HDPE have particularly interesting and useful properties for pull-through energy dissipaters although their behavior is very different from metals. However, the deformation response and energy dissipation characteristics of viscoelastic materials is not as well characterized as that of metals. Carney has studied the quasi-static and impact load deformation, energy dissipation and shape restoration characteristics of HDPE tubes over a range of temperatures [see J. F. Carney, III, "Development of Maintenance-Free Highway Safety Appurtenances", Strategic Highway Research Program, National Research Council (Washington, D.C. 1993)]. In this work, Carney observed that HDPE can undergo large deformations and strains, dissipating large amounts of kinetic energy without fracture. In addition, he observed that HDPE retains its ductility upon repeated loading and, once the loading force is removed, it can restore itself to its original size, shape and energy dissipation potential with minimum hysteresis.

As shown herein, the relationship between the clamping force and the clamping ratio for HDPE is nearly linear for a broad range of clamping ratios from 20 to 60%. Although viscoelastic materials such as HDPE collapse under a static lateral load, the mode of collapse of HDPE tubing is significantly different from metal tubes and the DeRuntz-Hodges model is inappropriate since HDPE tubes do not form plastic hinges like metal tubing but behave more elastically with two extensive elastic-plastic regions where the material deforms and dissipates energy. Instead of forming distinct plastic hinges, a laterally loaded HDPE tube exhibits a continuous change in strain across its cross-section. In quasi-static testing of HDPE, Carney observed that upon initial deformation the load bifurcates as tubes collapse, resulting in increased energy dissipation.

HDPE exhibits the very interesting property that when it passes through a pair of pins, it will begin to restore itself to its original shape. This allows the viscoelastic strain energy to be extracted multiple times and provides for exceptional kinetic energy dissipation opportunities in the dissipaters of the present invention. Furthermore, the unloading response of HDPE material is a key property that enables a pull-through energy dissipation device to work efficiently. As the material is pulled through the device, the longitudinal component of force acting on the rigid pins is the determining factor in the amount of energy dissipation (e.g., E=F·d). If the material is purely elastic (i.e., unloading path is identical to loading path), then the unloading forces on the backside of the pins will tend to cancel out the loading forces on the front side of the pins. In this scenario, the resulting net longitudinal component of force will be zero and no energy will be dissipated. Thus, dissipater deformation materials employed in the dissipaters of the present invention are most preferably inelastic and exhibit either plastic, elastic-plastic, viscoelastic or visco-plastic deformation behavior in order to dissipate kinetic energy.

Figure 21A:
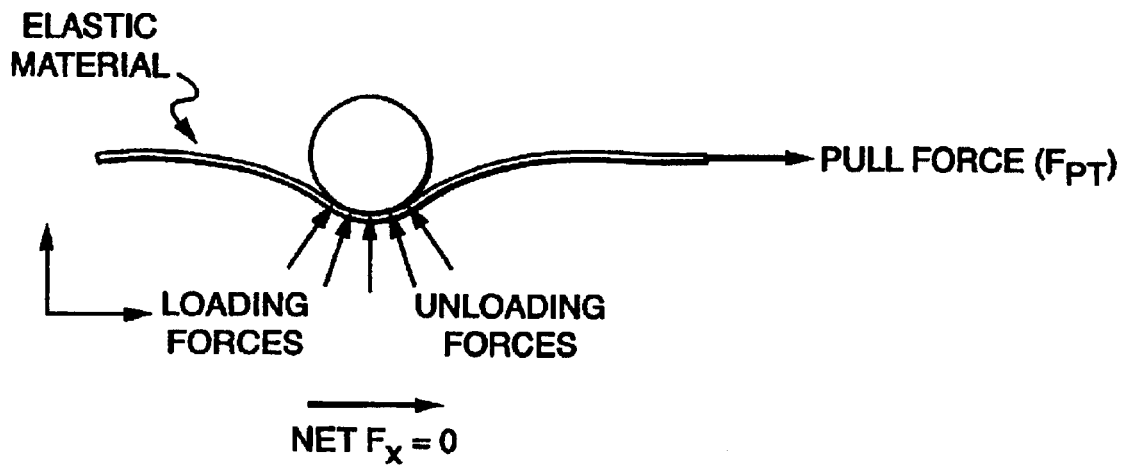
FIGS. 21A–21B show schematic diagrams of the loading and unloading behavior for an elastic material (FIG. 21A) and inelastic material (FIG. 21B) and resultant forces.
Figure 21B:
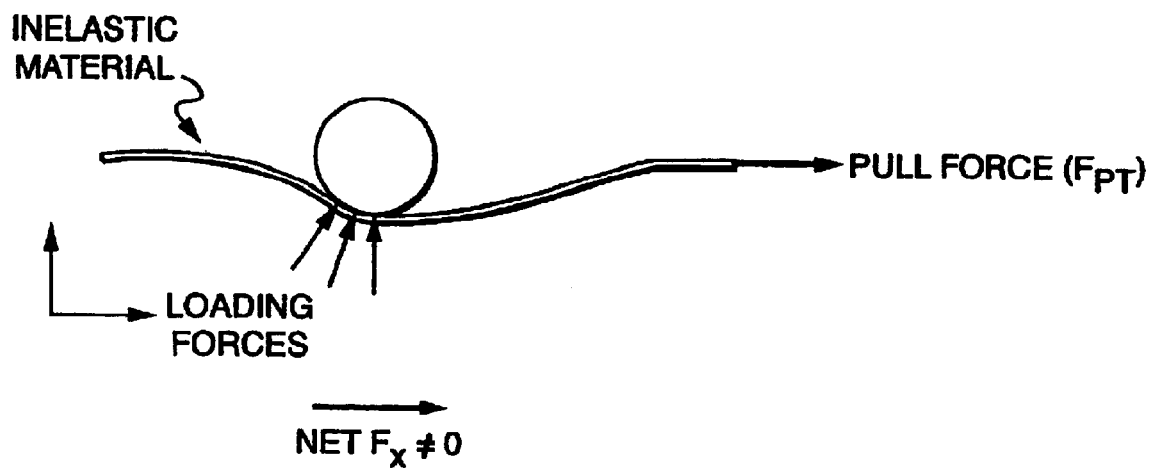

In addition to its characteristic stress-strain behavior, the unloading response of the deforming material is an important property that enables the pull-through energy dissipation device to work efficiently. As the material is pulled through the device, the longitudinal component of force acting on the rigid pins is the determining factor in the amount of energy dissipation where $E=F_x \cdot x$. For example, if the material is purely elastic, where the unloading path is identical to loading path, then the unloading forces on the backside of the pins will tend to cancel out the loading forces on the front side of the pins. This is shown schematically in FIG. 21A where the resulting net longitudinal component of force will be zero and no energy will be dissipated from deformation. In contrast, with inelastic materials which exhibit plastic, viscoelastic, visco-plastic or similar deformation behavior, the unloading forces on the backside of the pins is minimal due to inelastic deformation of the deforming element and finite relaxation time required for shape recovery. This is shown schematically in FIG. 21B where there is a net longitudinal component of force and energy is dissipated from the deformation. Thus, in the pull-through energy dissipaters of the present invention, deforming elements made from inelastic materials are required for energy dissipation, preferably viscoelastic materials, such as high density polyethylene.

For application of viscoelastic materials in pull through pipe and tube dissipaters of the present invention, an additional material design consideration is the relaxation time for shape recovery after deformation. Depending on the anticipated impact velocity and resultant travel velocity of the deforming member as it is pulled through a pin array, both minimum and maximum relaxation times may be important to material choice and pin set configurations which are selected. In certain impact scenarios, the relative time for shape recovery of the deformed cross section compared to the transit time for passing through one pin set may be a critical factor for maximizing pull-through force and energy dissipation. Additionally, depending on whether adjacent pin pairs are aligned parallel or orthogonally to one another, the maximum preferred relaxation time for recovery of the deformed cross section relative to the transit time between pin pairs may vary depending on whether shape recovery is undesirable or desirable.

The reason that the minimum shape recovery relaxation times is important is that if the relaxation time for shape recover is less than the time it takes for the material to pass through a single pin set then the unloading forces in tube shape recovery after passing through a pin set may cancel the loading forces for deformation while entering the pin set with no net energy dissipation produced. Regarding maximum relaxation time for shape recovery, there are two pin pair configurations which have opposing relaxation time limitations. Where adjacent pin pair sets are aligned parallel to one another, then maximum energy is extracted when the relaxation time for recovery is less than the transit time for the distance equivalent to the pin pair spacing. This would provide sufficient time for shape recovery after passing through a first pin pair so that maximum deformation and energy absorption can occur when passing through the second pin pair with a recovered shape rather than the residually deformed cross section. In contrast, were adjacent pin pair sets are aligned orthogonal to one another, then maximum energy is dissipated when the second pin pair deforms the deformed cross section, produced by the first pin pair, initially back to its original shape and then deforms it further in a direction perpendicular to the original deformation produced by the first pin pair. This intense deformation dissipates a greater amount of kinetic energy. With this configuration, the maximum relaxation time for shape recovery is preferably greater than the transit time for the distance equivalent to the pin pair spacing. This maximum relaxation time would provide insufficient time for shape recovery after passing through the first pin pair so that the second pin pair deforms the deformed cross section to its original shape and then in a direction perpendicular to the deformation produced by the first pin pair, thereby producing an intense deformation and maximum energy absorption.

It is worth noting, for high impact energy conditions such as highway crash cushion application, it is anticipated that the deforming member pull-through velocities as it travels through a pin array will be sufficiently high so that the relaxation time for shape recovery is less critical. Under these conditions, spring back of the deforming element shape is unlikely to occur on the backside of the pins and the associated unloading forces will be minimal. Furthermore, due to higher pull-through velocities there would be insufficient time for shape recovery to occur between pin sets so that the increased deformation energy extracted from the deforming member will provide enhanced energy dissipation.

3. Dissipater Module Characteristics

Each dissipater module comprises an impact surface for receiving contact with a moving object and for transferring the impact force from the object to a dissipater deforming member, a pin array comprising a series of individual pins, opposing pin pairs or opposing pin groups, a frame member for supporting the pin array and guiding the deforming member through the pin array during dissipater operation and a mounting platform for supporting the module. Due to the high tensile and shear stresses encountered in operation, the dissipater module frame and mount construction must be resistant to deflection, bending and failure upon exposure to the high stresses encountered during mechanical loading of the dissipater pins and deformation of the deforming element.

a. Pull-Through Strap Dissipater Modules

Figure 22A:
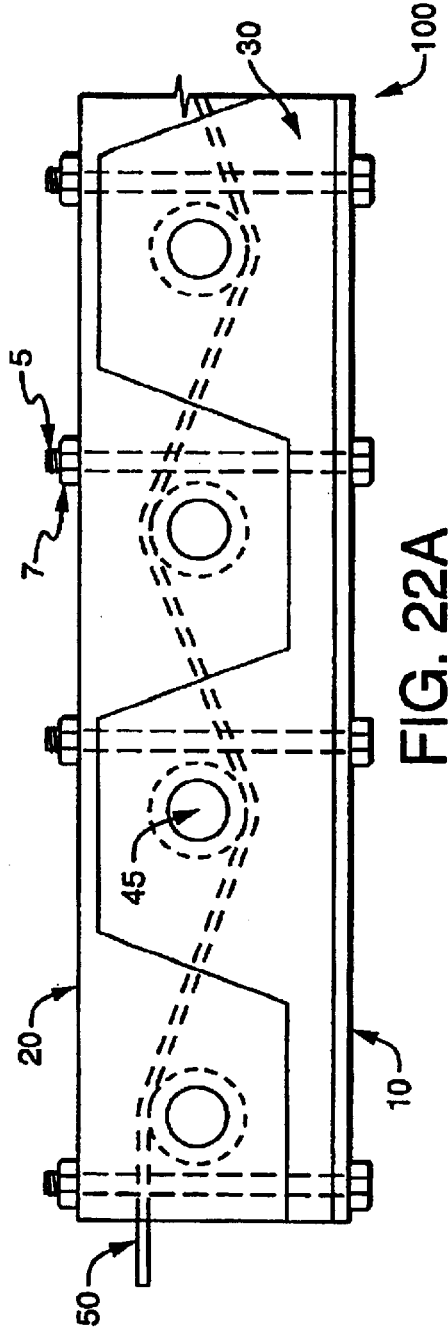
FIGS. 22A–22B show schematic diagrams of a side view (FIG. 22A) and top view (FIG. 22B) of a pull-through strap dissipater embodiment of the present invention.
Figure 22B:
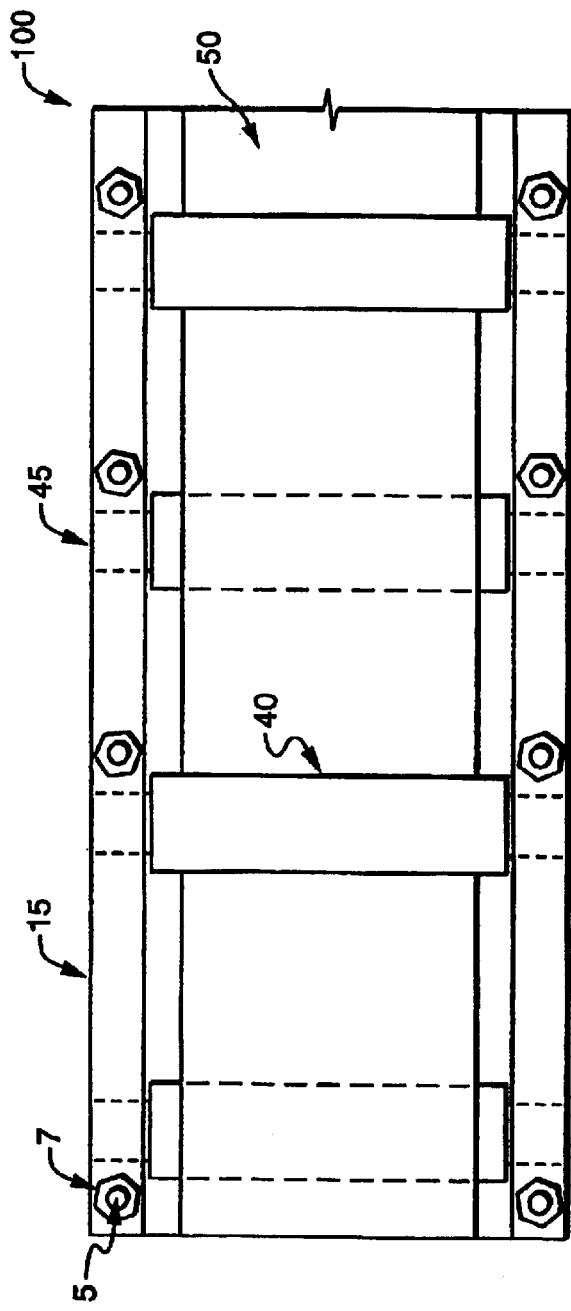

One embodiment of a pull-through strap dissipater module 100 is shown in FIG. 2 and a corresponding detailed schematic is provided in FIGS. 22A and 22B. For pull-through strap dissipaters, where arrays of single pins 40 are employed, the dissipater module 100 typically comprises two side mounting brackets 15 for supporting the pins 40 and guiding the deforming member 50 through the pin array 40 and a base plate 10 for mounting the side brackets 15. A side bracket end surface 3 may serve as an impact surface 4 for contacting a moving object and transferring the impact force to the dissipater module 100. Alternatively, a separate impact surface 4 may be attached to a side bracket 15 end surface 3. The pins 40 are supported by holes drilled in opposing side brackets 15 and pins 40 may be pushed into position from either side of the frame. Since, during assembly, the deforming member 50 is typically placed in the dissipater and initially bent to conform to the pin 40 configuration, curvature and spacing, in order to facilitate assembly of the dissipater and loading of the deforming member 50, each side bracket 15 is formed by assembly of a notched top jaw 20 and bottom jaw section 30 which are drilled to accommodate pin 40 placement and machined with a keyed mating surface so as assemble with the pin holes 45 of each section jaw 20, 30 aligned in the same plane such that the longitudinal axes of the pins line in the same plane. Dissipater module pin spacing may be adjusted by placement of pins 40 in alternating pin holes 45 in the top and bottom jaw sections 20, 30. The number, size and spacing of notches on the jaw sections may be readily modified to accommodate a wide range of fine and coarse pin spacing adjustments. The side brackets 15 are mounted to the frame base plate 10 with vertical mounting bolts 5 which pass through vertical bolt holes drilled through the top 20 and bottom 30 section of each side bracket 15.

For pre-bending the deforming member 50, the dissipater module is assembled and a hydraulic press is used to apply pressure to the top jaw sections 20 of the side brackets 15 which compress the assembly and bend the deforming member 50 to conform to the pin 40 shape and configuration. The dissipater module comprising the side brackets 15, pin array 40 assembly and pre-bent deforming member 50 are then secured to the base plate 10 by tightening the nuts 7 on the side bracket mounting bolts 5. Since some pin bending was observed during dissipater testing at high stress loadings, in one preferred embodiment, pin ends were lubricated with lithium grease prior to assembly to allow pin rotation and reduce friction between the deforming member strips 50 and pins 40 during dissipater operation.

In one embodiment, a guide rail may be optionally employed for maintaining the dissipater module 200 orientation relative to the deforming element while said module 200 slide along said element length. Prior to operating the dissipater, a proximal end of the deforming member is anchored to a stationary object so that the dissipater may be pulled or pushed toward a distal end by an impacting force.

Dissipater frame components may be fabricated from any material having sufficient yield strength and elastic modulus to withstand dissipater operational stresses without bending or deforming. In one embodiment, frame components were machined from structural grade A36 steel. In one preferred embodiment, A36 steel was employed for dissipater pins and both 1030 and A36 steel plate were used for deforming member straps.

b. Pull-Through Tube Dissipater Modules

One embodiment of a two pin pair, pull-through tube dissipater module 200 with orthogonally configured pin sets 130 is shown in FIG. 1. Another embodiment showing a single pin pair, pull-through tube dissipater module 200 is provided in FIG. 23.

The pull-through tube dissipater module 200 generally comprises a rigid module frame 115 for supporting one or more rigid pin set frames 120. A pin set frame 120 may serve as an impact surface 4 for contacting a moving object and transferring the impact force to the dissipater module 200. Alternatively, a separate impact surface 4 may be attached to a side pin set frame 120. Where multiple pin sets 1'30 and pin set frames 120 are employed, the module frame 115 may further provide for adjusting the spacing between pin sets 130 and pin set frames 120 by use of threaded side rails 116 which pass through corners of the frames 120 where the lock nuts secure the frames 120 at preferred locations and spacings along the side rails 116. Each pin set frame 120 supports one pin set 130 where each pin set 130 comprises at least two and as many as eight or more pins 140. Where a large number of pins 140 are employed in each pin set 130, the use of individual pins 140 may be cumbersome and the pin set 130 may comprise a roller bearing or ball bearing where individual bearings act as pins 140. When bearings are employed as pin sets 130, in one embodiment, two piece bearings are employed to facilitate positioning the bearings on the tubular deforming element.

The pin set frame 120 provides for support of the pin set 130 and individual pins 140 as well as adjustment of pin 140 gap spacing. The module frame 115 and pin set frame 120 assembly must be sufficiently rigid so as to maintain pin set 130 and pin 140 position and orientation as well as pin 140 gap spacing for each pin set 140 during dissipater operation when the pins 140 and frames 115, 120 are subjected to significant deformation forces when the deforming element 150 passes between each pin set 130.

Pull-through tube dissipater modules 200 may comprise either a single pin set 130 or a multiple pin sets 130 depending on the pull-through force and energy dissipation capacity required in a given application. Where multiple pin sets 130 are employed, in one embodiment pin 140 gap spacing for each pin set 130 and spacing between adjacent pin sets 130 may be configured to produce a variable force profile within the module 200 where pull-through force and energy dissipation varies along the module 200 length as a deforming member 150 is drawn through successive pin sets 130. In another embodiment, pin set 130 pin gap spacing and spacing between pin sets 130 are maintained constant within the module 200.

Figure 23A:
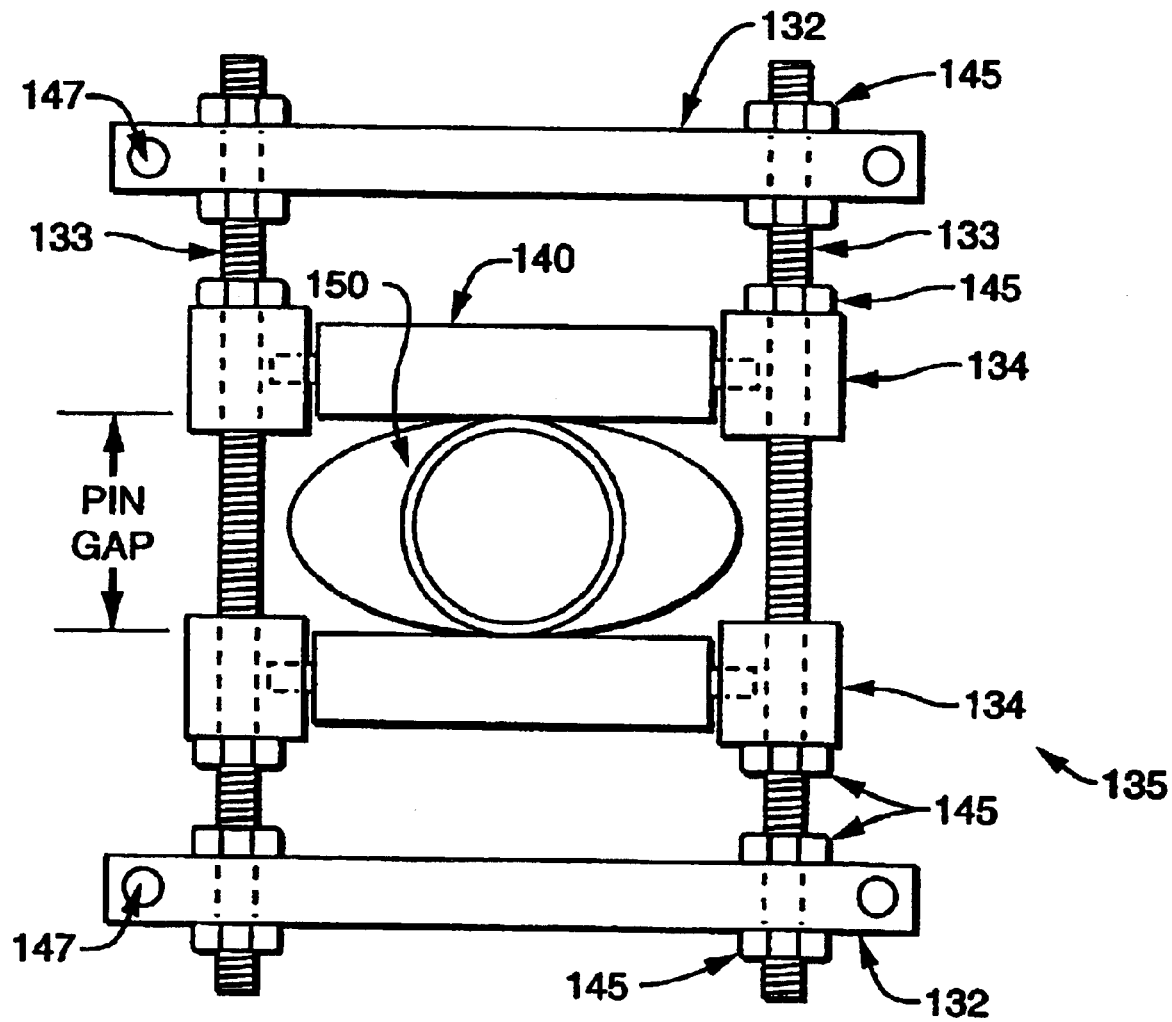
FIGS. 23A–23C are schematic diagrams of a an axial view (FIG. 23A), a top view (FIG. 23B) and a side view (FIG. 23C) of an example pin set frame assembly for a pull-through tube dissipater embodiment of the present invention.
Figure 23B:
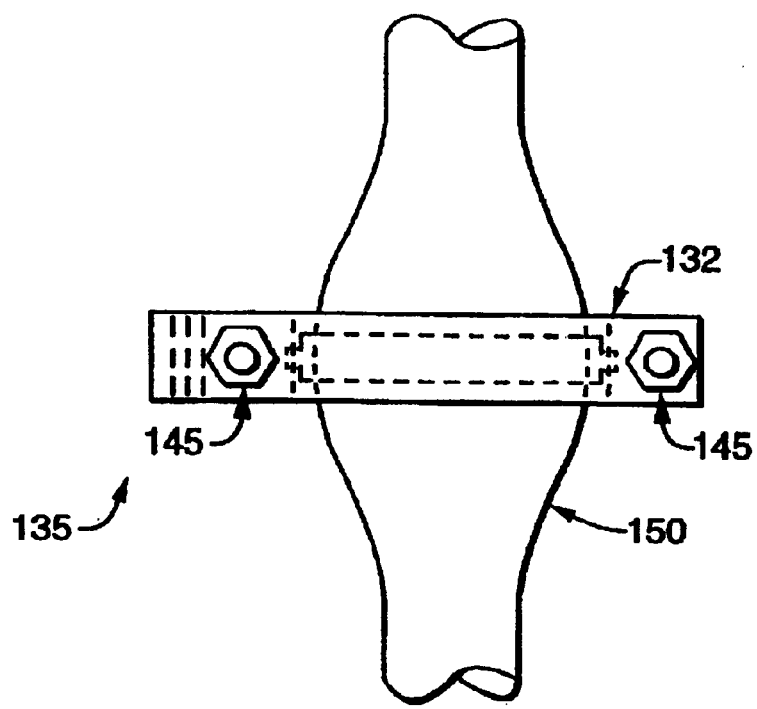
Figure 23C:
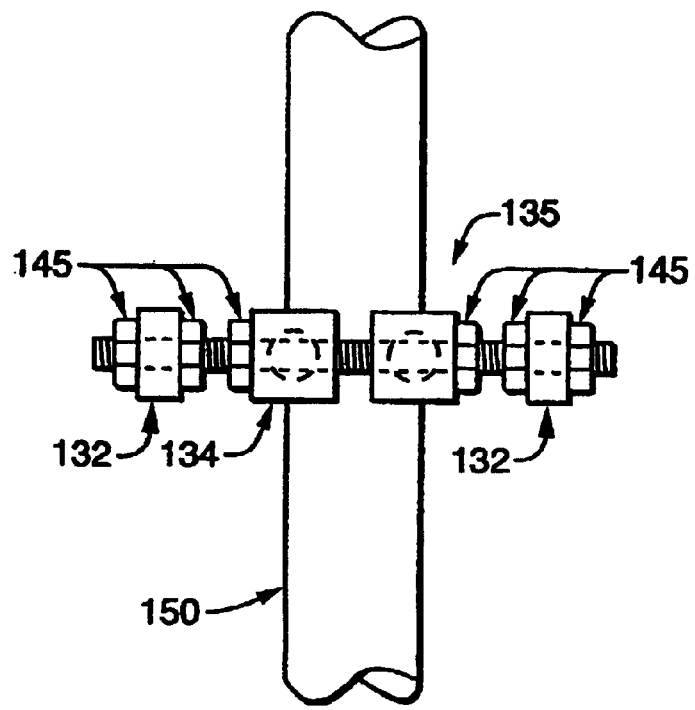
Figure 24:
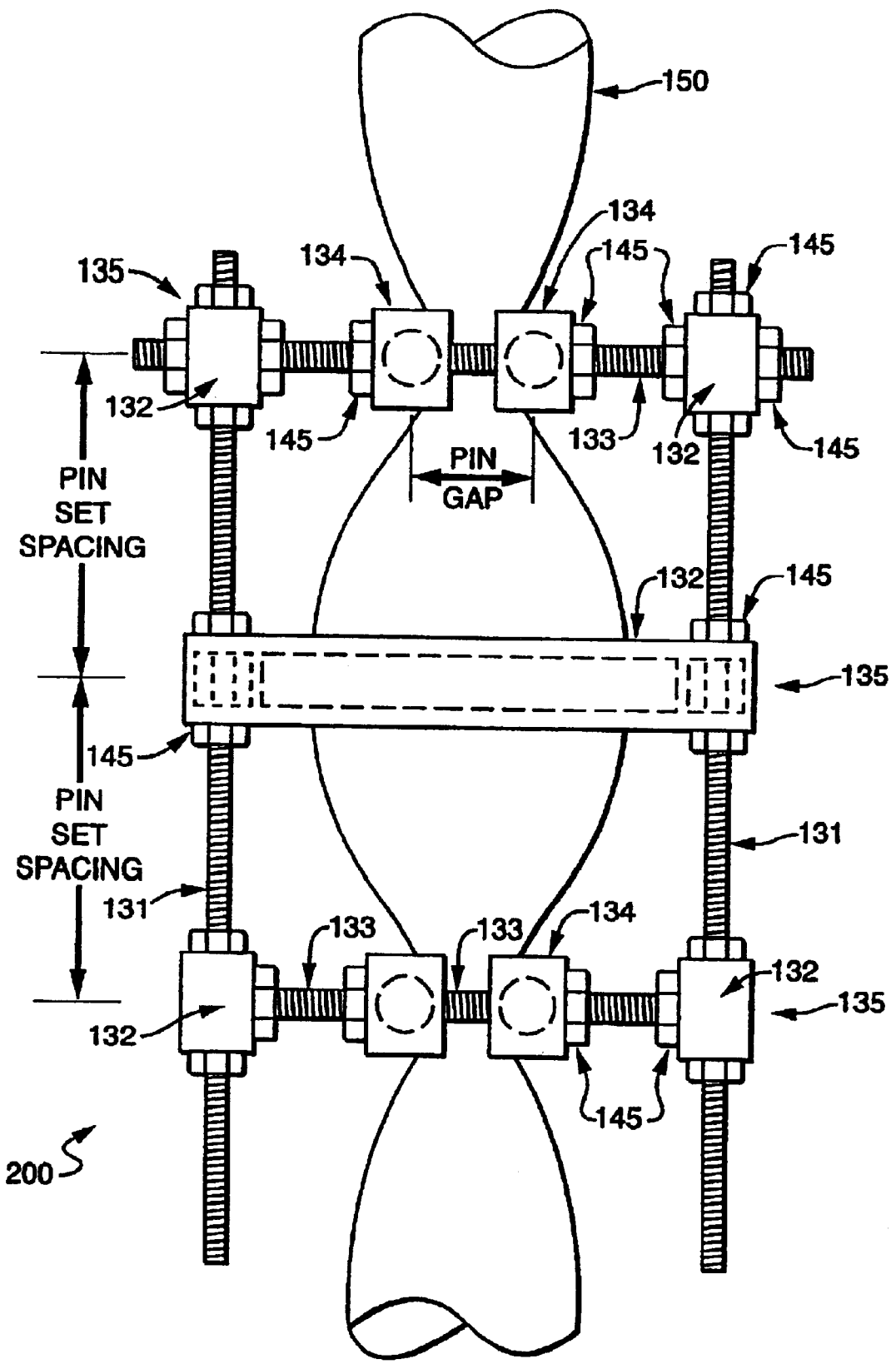
FIG. 24 is a schematic diagram showing a dissipater module with multiple pin set frame assemblies for a pull-through tube dissipater of the present invention.

In FIG. 23A, one embodiment of a pin set frame assembly 135 for a two pin, pin set 130 is shown. This pin set frame assembly 135 comprises a pin set frame 120 comprising top and bottom frame rails 132 secured by way of support rod holes 148 with two threaded support rods 133 with lock nuts 145. A pair of pin seat blocks 134, which are bored with a pin seat hole 144 to accommodate recessed ends 141 of the pins 140, are threaded on the support rods 133 and secured with lock nuts 145. The pins seat blocks 134 are drilled and tapped with a threaded hole 146 for mounting on the support rods 133 and adjustment of pin gap spacing.

Figure 28A:
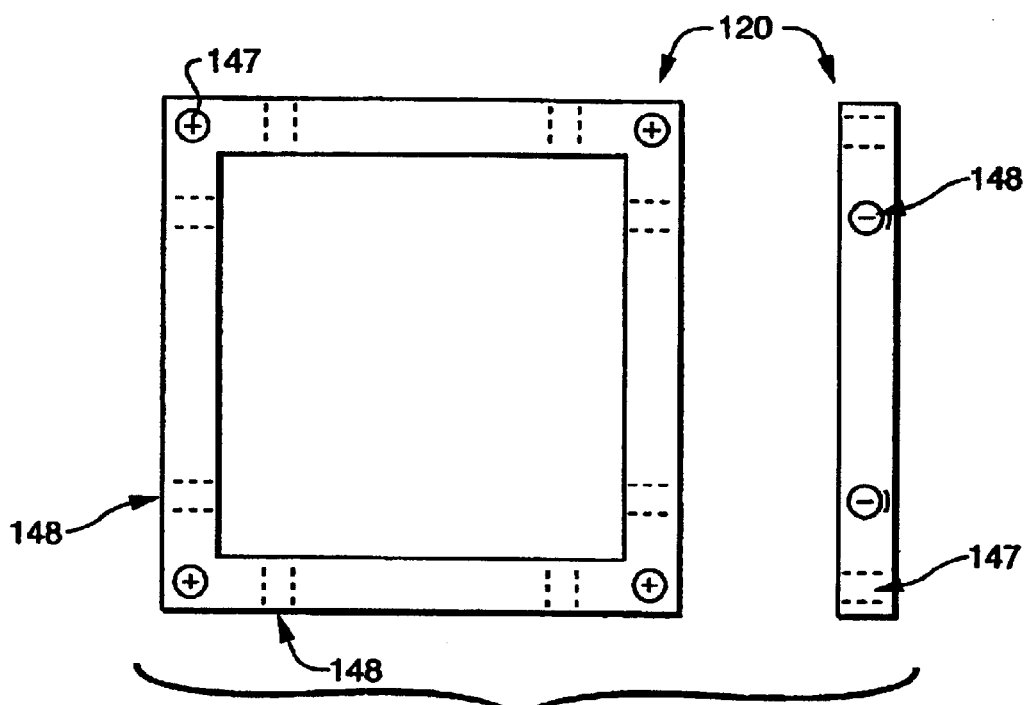
FIGS. 28A–28B show schematic diagrams of and alternative pin set frame embodiment (FIG. 28A) and pin set frame assembly (FIG. 28B) of a pull-through tube dissipater.
Figure 28B:
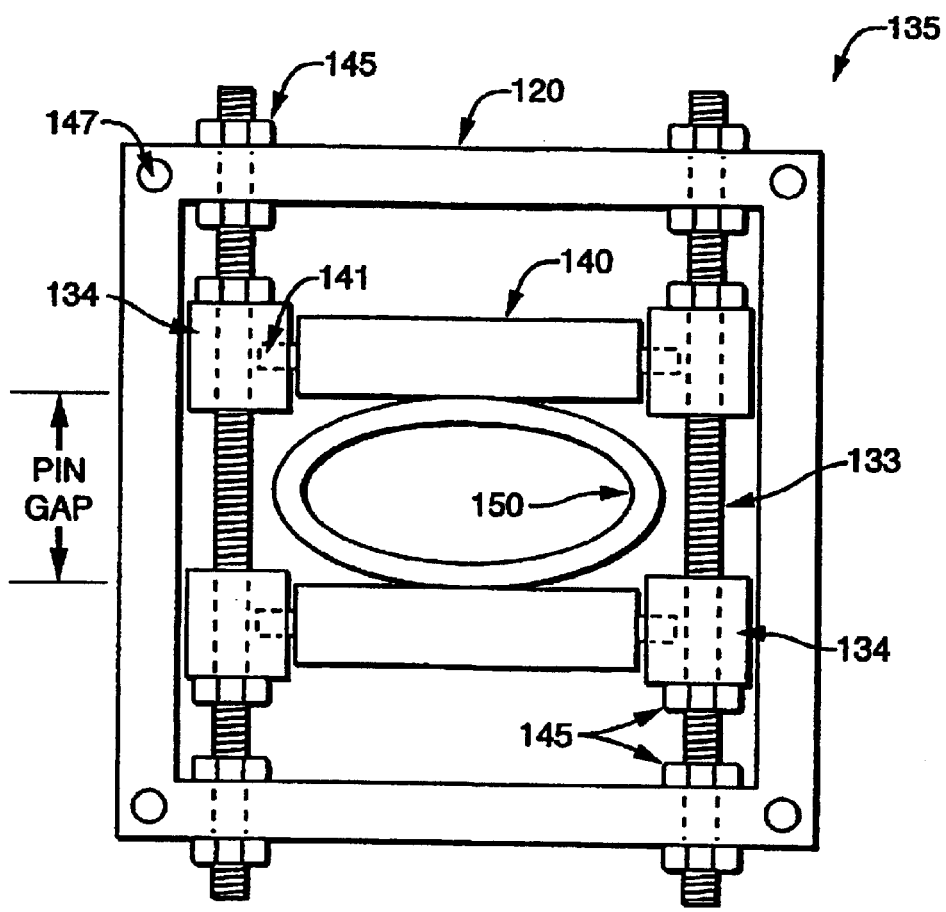

In FIG. 28A and FIG. 28B, an alternative embodiment of a pin set frame assembly 135 for a two pin, pin set is shown. In this embodiment, a square or rectilinear continuous pin set frame 120 is employed with support rod holes 148 provided one each side and support rod rail holes 147 provided in each corner. Support rods 133 and lock nuts 145 are used to position the pins 140 with pin gap adjustment provided by threaded pin seat blocks 134. One advantage of this embodiment is that this pin set frame 120 readily provides for either vertical or horizontal placement of the support rods 133 and pins 140 without requiring additional fixturing.

Figure 25B:
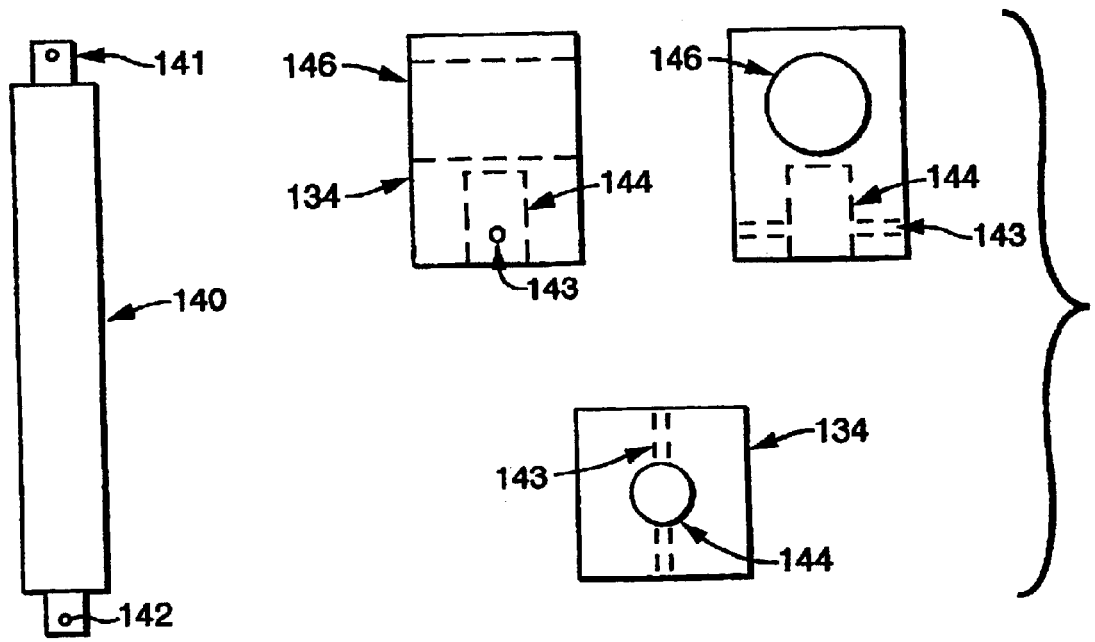
FIGS. 25A–25C are schematic diagrams showing details of the pin (FIG. 25A), pin seat block (FIG. 25B) and top and bottom frame rails (FIG. 25C) for one embodiment of the pull-through dissipater of the present invention.
Figure 25A:
Figure 25C:
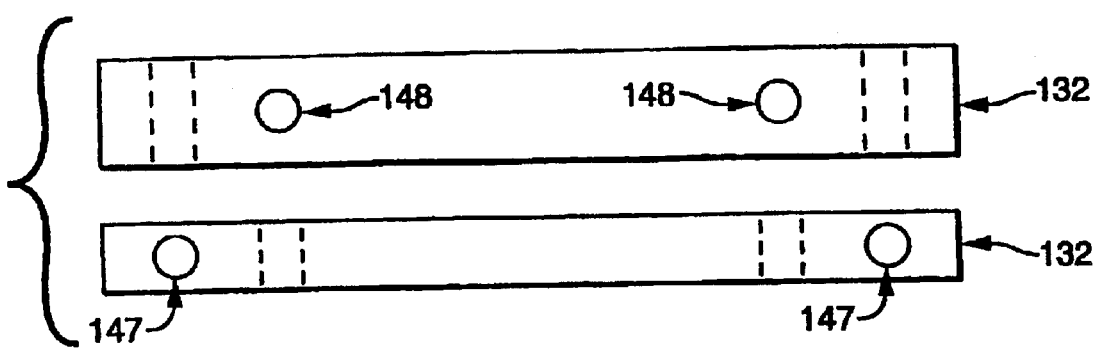

Typically, pin gap spacing is less than the external diameter of the tubular deformation element and greater than the combined wall thickness of a compressed tubular deformation element. In one embodiment where non-rotating pins are employed, a locking pin hole 142 may be formed in the pin ends 141 to accommodate a locking pin 149 (not shown) which is inserted through the pin ends 141 and a corresponding locking pin hole 143 in the pin blocks 134. Where rotating pins are employed, the pin ends 141 are lubricated with lithium grease prior to assembly.

Where dissipater modules 200 are assembled from two or more pin sets, the pin set frame assemblies 135 for each pin set 130 are secured to with four threaded side support rods 131 with lock nuts 145. For dissipater module 200 assembly, the support rod rails 131 are inserted through support rod rail holes 147 machined in the sides of the top and bottom frame rails 132 of each pin set frame assembly 135. The position and spacing of each frame assembly 135 is adjusted and secured to the support rods 131 with lock nuts 145 threaded on each side of the frame rail 132 support rod holes 147. Detailed views of a pin 140, pin seat block 134 and top and bottom frame rails 132 are shown in FIGS. 25A–25C. Prior to using the module, a proximal end of the deforming member is anchored to a stationary object so that the dissipater may be pulled or pushed toward a distal end by an impacting force. In one embodiment, a guide rail may be optionally employed for maintaining the dissipater module 200 orientation relative to the deforming element while said module 200 slide along said element length.

Module 200 components may be machined from any suitable structural steel. In one embodiment, frame components were machined from structural grade A36 steel. In preferred embodiments, high density polyethylene tubes are employed as deforming elements 150.

c. Module Combinations

Irrespective of whether pull-through strap dissipaters or pull-through tube dissipaters are employed, either tunable, single module variable force dissipaters or multi-stage variable force dissipaters comprising two, three or more modules and one or more deforming members may be employed to create a desirable deceleration and force profile for a specific application. Although appropriately designed, single dissipater modules 100, 200 may satisfy an anticipated force-time profile objective, in preferred embodiments two or more modules 100, 200 are combined to proved a variable deceleration force profile so as to minimize injury and damage. Where a variable force-time profile is desirable for controlled deceleration and energy dissipation, two or more modules 100, 200 may either be configured in series combinations along the length of a single deforming member 50, 150, in parallel combinations where two or more deforming members 50, 150 are aligned parallel to one another and each module 100, 200 is attached to its own deforming member 50, 150, or in a series-parallel combination where two or more modules 100, 200 are arranged in series along the length of each one of two or more parallel deforming members 50, 150.

One example of a variable force, multi-stage dissipater 300 is shown schematically in FIGS. 27A–27B. In this example embodiment, a three stage dissipater 300 employing a single deforming element 350 is shown. Three separate dissipaters 100, 200 are employed in this example. A first stage module 360, a second stage module 370 and a third stage module 380 are all attached to a single deforming member 350 which is anchored to the ground with an anchor bracket 315. The first stage module 360 is attached to an impact sled 330 which is stabilized and guided by guide rails 310 as it slides along the deforming element 350. An impact surface 320 is provided on the front exterior of the impact sled to receiving an impact and transferring the impact force, through the sled 330 structure to the first dissipater module 360. Upon impact, in the first stage, the impact force moves the sled 330 and first dissipater module 360 along the deforming element 350 to the second stage module 370, experiencing a steady-state force equivalent to the pull-through force of the first stage module 360. When the first stage module 360 strikes the second stage module 370, the pull-through forces of the two modules 360, 370 must be overcome and the sled 330 and two modules 360, 370 continue sliding along the deforming element 350, experiencing a steady-state force equivalent to the combined pull-through force of the first 360 and second 370 modules. When the second stage module 370 strikes the third stage module 380, the pull-though forces of the three modules 360, 370, 380 combine and the sled 330 and three modules 360, 370 and 380 continue sliding along the deforming element 350, experiencing a steady-state fore equivalent to the combined pull-through force of the first 360, second 370 and third 380 modules until all the kinetic energy of the impacting object is dissipated and the impacting object comes to rest.

It should be emphasized that the embodiment shown in FIGS. 27A and 27B represents only one example of the multi-stage dissipater devices 300 of the present invention. The number and configuration of dissipater modules 100, 200 and deforming members 50, 150 may be varied according to the teachings of the present invention to produce multi-stage devices with a wide variety of force-time profiles and deceleration behavior by employing various deforming elements and serial, parallel and mixed serial parallel dissipater module combinations. By employing various configurations of modules 100, 200 and deforming members 50, 150, a broad range of impacting masses, velocities and kinetic energies may be easily accommodated with a tailored force-time profile for controlled deceleration and energy attenuation so as to minimize impact injury and damage.

E. Dissipater Testing

1. Pull-Through Strap Dissipater Testing

A conventional Tinius Olsen 200 ton load tester was employed for testing various prototype pull-through strap dissipater modules. Due to the relative low strain rate range of the load tester which was limited to a maximum strain rate of 20"/min, sample pull-through strap dissipater modules were tested under quasi-static test conditions at pull rates of 20"/min.

Prior to testing, it was necessary to pre-bend the deformation member steel straps during assembly of dissipater modules. Typically, a hydraulic press was used to apply pressure to the top jaw sections of the strap dissipater module side brackets which pressed the module assembly together, urging the pins against the metal straps and effectively bending the straps to conform to the pin diameter and pin spacing configuration. After pre-bending the strap member, the module mounting bolts are tightened to secure the deforming member in the module assembly and the module was loaded into the load tester. One end of the exposed strap deforming element was secured with one set of load tester gripping jaws while the dissipater module was secured in an opposing set of load tester jaws. To initiate a test run, the load tester strain rate was set to a maximum and load was applied while the displacement and force required to maintain the strain rate was continuously monitored and recorded. Once the pull-through force reached a steady-state value, the test was completed. The deformed length of the strap deforming element was measured along with dimension changes to the strap element. Dissipated energy was calculated from the steady-state pull-through force and deformation distance and energy density values were reported as the dissipation energy divided by the weight and volume of the deformed section. In order to evaluate the effects of work hardening of steel straps during deformation, in some tests multiple dissipater passes were made with the same strap member and hardness and elongation of the straps were measured off-line at the end of each pass.

2. Pull-Through Tube Dissipater Testing

A vertical test configuration was employed for testing example pull-through tube dissipater modules. In order to evaluate energy dissipating capacity, deforming member deformation and recovery behavior and dissipater parameters such as pin pair gap, pin pair or pin set spacing, number of pins per pin set, pin orientation and deforming member shape and dimensions for a variety of impact scenarios having different dynamic loading conditions, conventional drop tower testing as conducted on pull-through tube dissipater modules. With this technique, a range of impacting masses were dropped on dissipater test modules at different velocities and the acceleration-time history and the total dissipater displacement along the deforming member was recorded. A schematic of the drop tower device is provided in FIGS. 18A–18C High-speed video cameras, accelerometers, and displacement transducers were used to record the impact event and data recording was performed via a laboratory computer equipped with an analog/digital converter.

The conventional drop tower employed in these tests comprised four three meter high steel pipe columns mounted on a steel base plate attached to a floor with adjustable rubber vibration mounts. An upper plate was attached to the four columns at each of four corners for stabilizing the entire frame. The four columns support and guide sliding weights, varying between 69.4 kg and 185 kg, which provide an impact mass. To minimize frictional losses with the sliding weights, the support columns were coated with a grease. An electric winch is employed to raise the impact masses to the top of the tower. Weights are stacked on top of the tower and may be dropped from different heights resulting in different impact velocities and energies. Typically, for this device, the maximum height for dropping weights was approximately three meters which corresponds to a theoretical impact velocity of 7.5 m/s. One end of the tube deforming member was attached to either the top plate to avoid bucking where a large impact mass was employed, or the bottom base plate where a small impact mass was employed. Dissipater modules typically comprised single pin pair, or alternatively, two pin pair pin sets. At the beginning of each test run, dissipater modules were generally placed on the deformation member at varying distances below the impacting mass to provide for a range of impact velocities and impact energies.

Figure 18:
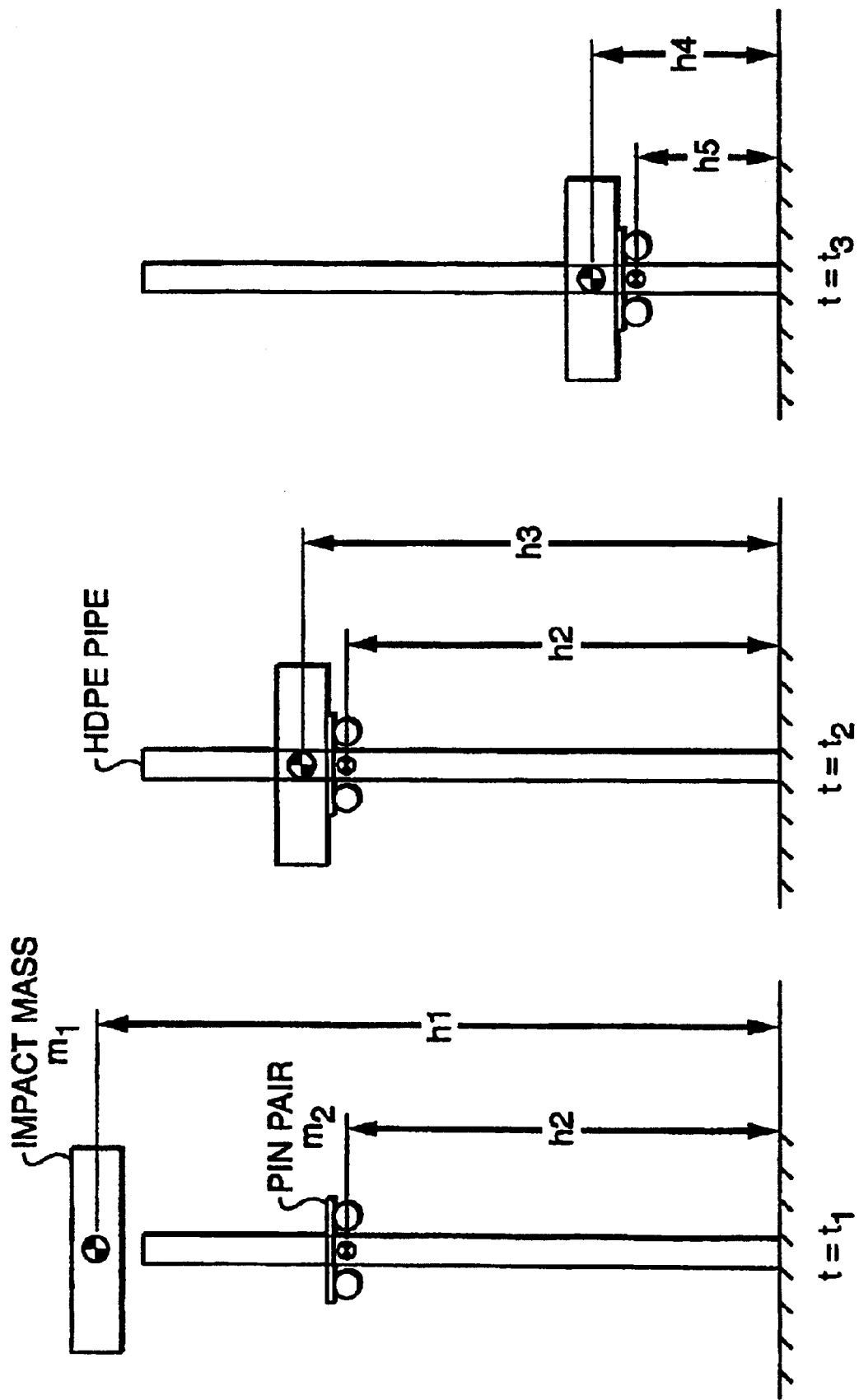
FIGS. 18A–18C show schematic representations of the drop tower test device before (FIG. 18A), during (FIG. 18B) and after (FIG. 18C), impact with a dissipater module.

FIGS. 18A–18C show schematic representations of the drop tower test device before (FIG. 18A), during (FIG. 18B) and after FIG. 18C) impact with a dissipater module. The total energy with respect to the ground datum E possessed by the system formed by deforming member, pin dissipater module and impact mass at three different times is given by:

| Before Impact | $E_1 = m_1 g h_1 + m_2 g h_2$ | $t = t_1$ |
| During Impact | $E_2 = m_1 g h_3 + m_2 g h_2 + \frac{1}{2} m_1 V^2$ | $t = t_2$ |
| After Impact | $E_3 = m_1 g h_4 + m_2 g h_5 + U + U_F$ | $t = t_3$ | where, for each time $t_i$, $E_i$ is the total energy of the system, $m_1$ is the mass of the impacting mass, $m_2$ is the mass of the pin dissipater module, V is the impact mass impact velocity, U is the strain energy adsorbed by deforming the deforming member and $U_F$ is the amount of energy dissipated by friction.

The total energy adsorbed in deformation of the HDPE during the impact can be expressed by the following integration:

$$U = L \int_0^{R_C} \frac{1}{2} E \cdot A_P \cdot \varepsilon_0^2 \left(1 - \frac{x}{R_C}\right)^2 dx$$

where L is the total displacement of the pin dissipater module and $A_P$ is the area of deformation member strain. The energy loses by friction, $U_F$, can be expressed as a product of a friction force F times the total length L covered by pins during impact.

$$U_F = F \cdot L = f_d \cdot P \cdot L$$

where $f_d$ the dynamic coefficient of friction and P the lateral load applied to the pipe. Since the tower support columns were lubricated for minimizing friction with the sliding impact mass, frictional energy losses were minimal and typically ignored for these tests.

For data acquisition, the drop tower was instrumented with two Stone & Webster PCB/Piezotronics accelerometers, one series 302A (500-g) and one series 308B (50-g) mounted directly on the drop weight for measuring impact velocity and acceleration during impact. A Celesco Cable-Extension Position Transducer PT5DC with a thermoplastic cable length of 3.822 m was used as a displacement transducer. The transducer chassis was mounted at the bottom of the tower and the wire head attached to the drop weight to measure displacement. Accelerometer and transducer signals were analyzed with a Hewlett Packard 35665A Dynamic Signal Analyzer (DSA) and LabView software. A Redlake CCD Imaging camera (PCI8000S) equipped with a Cosmicar/Pentax 6 mm F/1.2 lens was used for high speed filming and frames were examined to calculate the velocity of the impact mass when dropped from different heights. Frame analysis of impact mass velocity enabled calibration of impact mass velocities. Typically, a 3% difference was observed between theoretical and actual impact velocity which translates to a 5.9% difference in theoretical and actual kinetic energy of the impact mass. Testing parameters and test results for a number of HDPE pull-through tube dissipaters are provided in Example 2.

F. Vehicle Crash Cushion Design

1. Frontal Impact Crash Cushions

Crash cushions are a particular type of roadside appurtenance intended to stop an errant vehicle before it strikes a more rigid, hazardous object. The criteria for judging the performance of crash cushions and other roadside appurtenances in a full-scale crash tests are included in National Cooperative Highway Research Program (NCHRP) Report 350 [see H. E. Ross et al, "Recommended Procedures for the Safety Performance Evaluation of Highway Features," NCHRP Report 350, National Cooperative Highway Research Board, Transportation Research Board, Washington, D.C., 1993]. In this report, two standard tests for evaluating the frontal impact performance of crash cushions are provided. The first test criteria involve an 820-kg small car striking a crash cushion head-on at 100 km/hr while the second test involves a 2000-kg full-size pickup truck striking a crash cushion head-on at 100 km/hr.

According to Report 350, acceptable highway crash cushion devices must meet three specific design requirements for occupant safety. First, the theoretical occupant impact velocity (OIV) with the vehicle interior should be less than 9 m/s after the occupant head travels 0.6 m with respect to the vehicle interior. For a one-dimensional frontal collision this is the same as a constant deceleration of 6.88 g's for the first 133 msec of the collision as shown in the following expressions:

$$OIV = \int_0^T a \, dt \rightarrow 9 = aT$$

$$\Delta = \int_0^T at \, dt \rightarrow 0.60 = \frac{aT^2}{2} = \frac{9T}{2} \rightarrow T = 0.133 \text{ s}$$

$$OIV = aT \rightarrow 9 = a0.133 \rightarrow a = 67.67 \text{ m/s} = 6.88 \text{ g's}$$

Second, after the occupant has struck the vehicle interior, the 10-msec average occupant ride-down acceleration (ORA) should remain below 15 g's for the remainder of the collision. It is desirable that the OIV be below 9 m/s and the ORA be below 15 g's although the maximum allowable limits are 12 m/s and 20 g's, respectively. The third requirement is that the crash cushion must be long enough to stop a 2000-kg pickup truck traveling 100 km/hr. In general, designing a crash cushion involves balancing the need for longer cushions for more gentle decelerations with the economic need to have shorter cushions.

These three requirements have resulted in most crash cushions being designed in two or three stages. The first stage is controlled by the small car and the OIV criterion so the maximum constant force in the first stage is F=m·a= 820·6.88·9.81/1000=55 kN. This force must be applied over a distance of 3.1-m to allow the occupant to contact the vehicle interior. The second stage is designed by examining the ORA criterion in the 820-kg passenger vehicle test. After the occupant has contacted the interior, the ORA criterion controls so the maximum constant force in the second stage is 820·15·9.81/1000=121 kN. If the second stage is 1.1-m long the 820-kg small car can be safely stopped in a total combined distance of 3.1 m and 1.1 m, or 4.2 m.

The third design requirement is that the crash cushion must absorb all the energy of the large full-size pickup truck before the end of the crash cushion is reached. Using the same two-stage force system designed based on the small car (i.e., an initial stage of 55 kN for 3.1 m and a second stage of 121 kN for 1.1 m) the pickup truck will still have significant kinetic energy when it reaches the end of the second stage at 4.2 m. A third stage can be added with higher force since the small car is unlikely to ever penetrate this far. A 15-g deceleration for the 2000-kg truck is equivalent to 294-kN force in the third stage. Using a 294-kN third stage, the 2000-kg pickup truck can be safely stopped in 5.7 m, a typical length for a crash cushion.

Figure 15A:
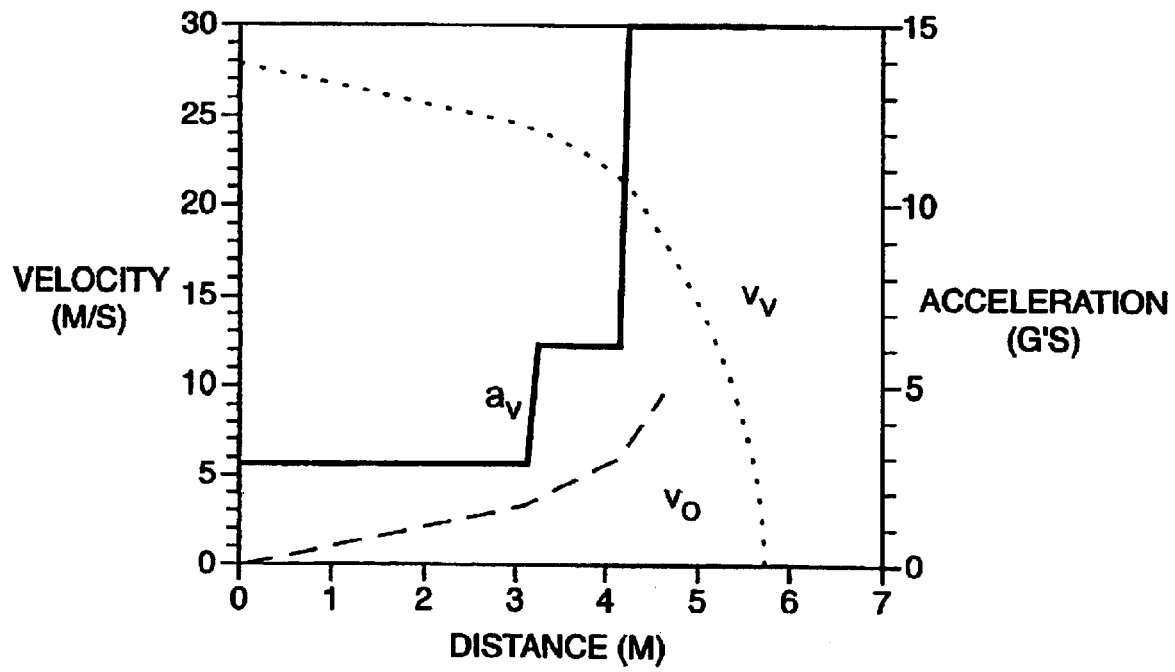
FIGS. 15A–B show plots of vehicle velocity $V_V$, occupant velocity $V_O$ and vehicle acceleration $a_V$ as a function of distance for a 2000 kg pickup truck (FIG. 15A) and a 820 kg passenger car (FIG. 15B) after a 100 km/hr frontal impact with a conventional vehicle crash cushion.
Figure 15B:
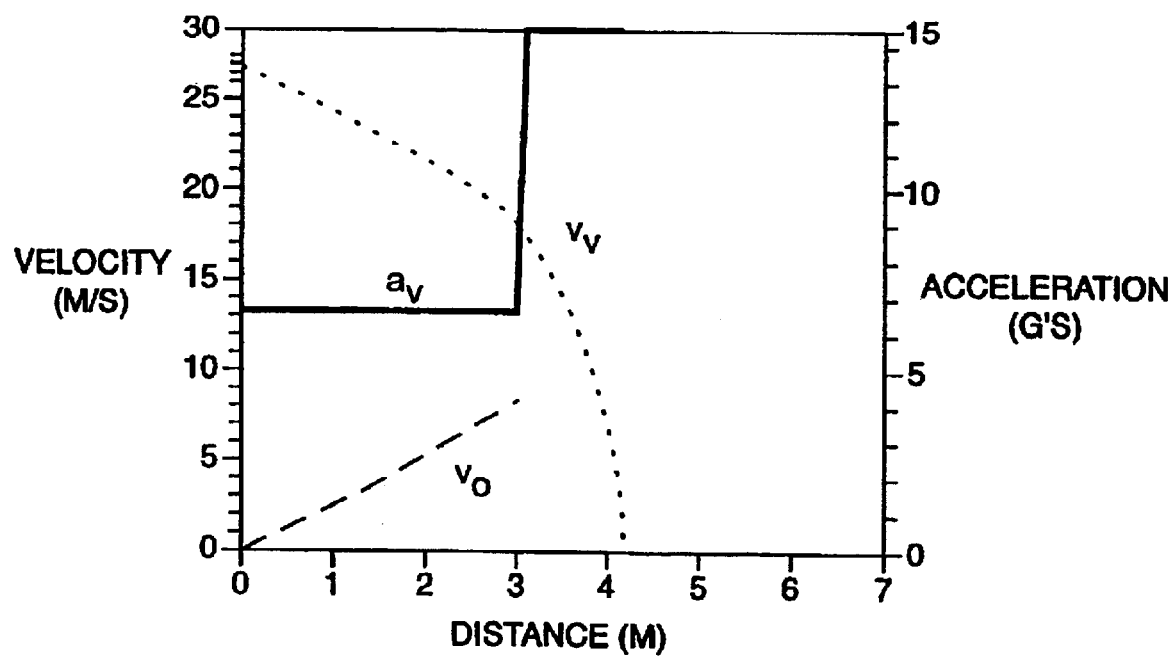

As shown in FIGS. 15A and 15B, a conventionally designed crash cushion results in a three-stage constant acceleration (deceleration) step function. As shown in FIG. 15B, an 820 kg passenger car only interacts with two stages before coming to rest at 4.2 m. However, as shown in FIG. 15A, a heavier 2000 kg pickup truck interacts with all three stages coming to rest at 5.7 m.

One unresolved issue with crash cushions which meet current frontal impact criteria is how such a crash cushion would perform for the majority of vehicles in weight classes between these two extremes of small car and fill-size pickup vehicles. Mid-size passenger sedans generally have masses in the region of 1450 kg. If a 1450-kg mid-size passenger sedan strikes a crash cushion designed according to the criteria used for the device of Example 3 below, the decelerations at the end of the event will exceed 20 g's, the maximum allowable limit, and well above the desired design target of 15 g's. While current highway crash cushion testing and evaluation criteria do not require manufacturers to design roadside hardware for the 1450-kg passenger sedan, a conscientious designer may want to provide for the OIV and ORA responses to be below the allowable limits for all reasonable size passenger vehicles and not just those at the extremes of the vehicle population. One example embodiment of a crash cushion which employs a dissipater of the present invention and overcomes these limitations is provided in Example 4.

2. Side Impact Crash Cushions

Figure 17:
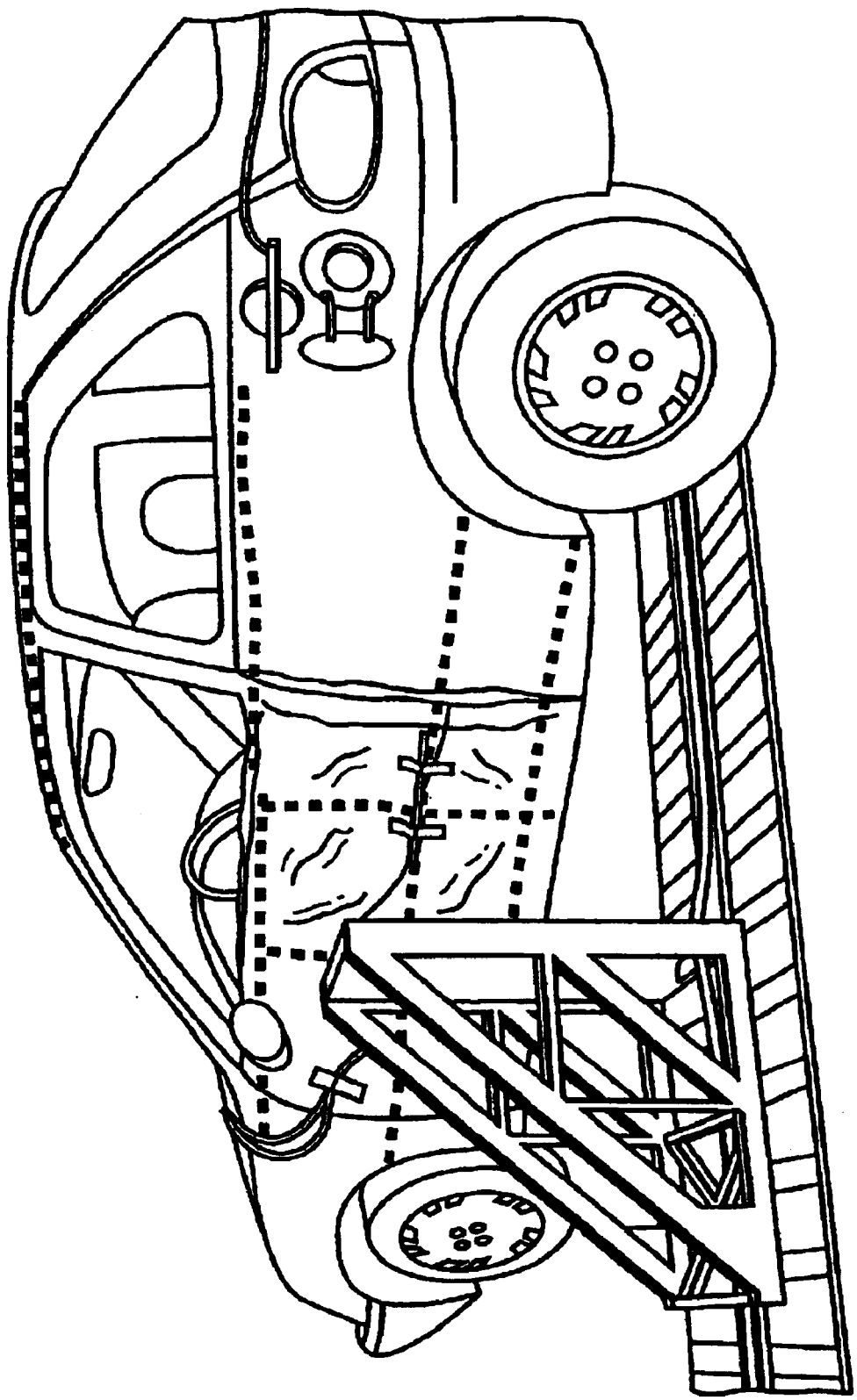
FIG. 17 shows photograph of vehicle damage after a side impact of a 820-kg, 50 km/hr passenger car with an eight pin pull-through strap dissipater of the present invention.

Another emerging concern is the performance of guardrail terminals and crash cushions in side impacts. Side impacts are crashes where the vehicle slides laterally into the crash cushion or guardrail terminal. Ray et al recently developed criteria for evaluating the performance of roadside hardware in a side impact for the Federal Highway Administration [see M. H. Ray, J. C. Weir, C. A. Plaxico and K. Hiranmayee, "Evaluating the Results of Side Impact Crash Tests of Roadside Features," Federal Highway Administration Report No. FHWA-RD-00-XXX, Contract No. DFH61-96-R-00068, Final Report Fall 2001 which is incorporated herein by reference]. Ray et al determined that in a 50 km/hr broadside side impact of an 820-kg passenger car, the occupant would be likely to survive if the difference between the initial impact velocity of the vehicle and the velocity of the face of the struck object was always less than 9 m/s for all times after 20 milliseconds after the initial impact. For a device like a crash cushion where the force exerted by the device increases with displacement, this criteria amounts to a requirement that the velocity of the face of the struck device must be 13.88 m/s (i.e., the impact velocity of 50 km/hr) minus 9 m/s or 4.88 m/s, or approximately 5 m/s, within 20 milliseconds of the initial impact. In their report, Ray et al described the development of a side impact crash cushion using two sets of four-pin steel strap dissipaters This attenuator, shown in the post test photograph in FIG. 17, stopped a 820-kg small car in a 13.88 m/s full broadside impact in a little under 0.75 m. However, this device only addressed side impact collisions and was not suitable for deployment as a highway crash cushion since it did not meet the requirements for frontal impact stipulated in Report 350.

Figure 16A:
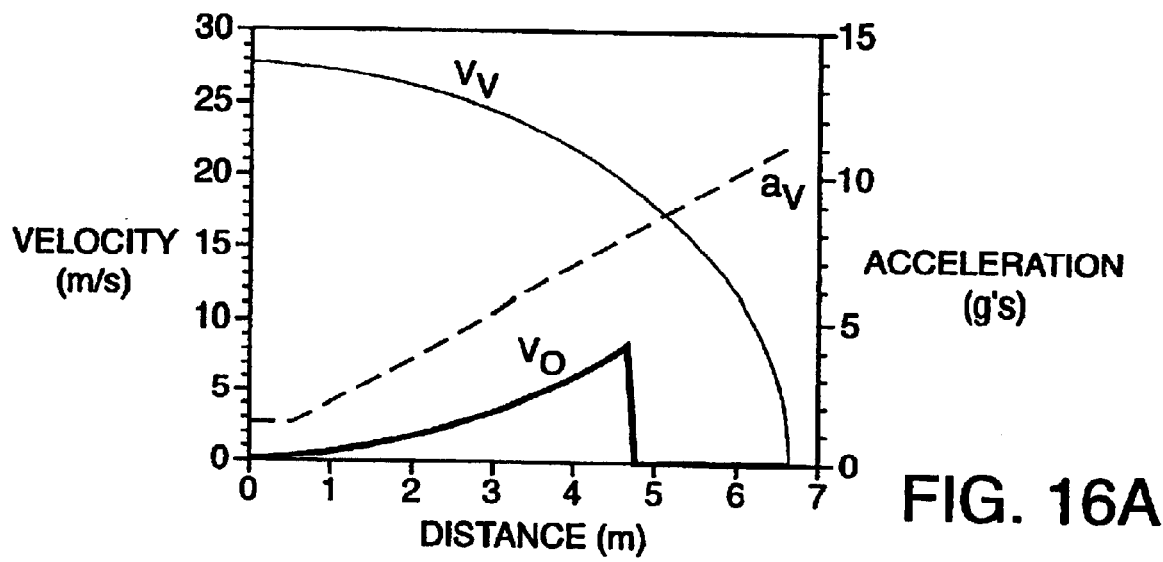
FIGS. 16A–C show plots of vehicle and occupant velocity and vehicle acceleration as a function of distance for a 2000 kg truck (FIG. 15A) and a 820 kg car (FIG. 15B) after 100 km/hr frontal impacts (FIGS. 16A and 16C) and 50 km/hr side impact (FIG. 16B) with the pull-through tube dissipater of the present invention.
Figure 16B:
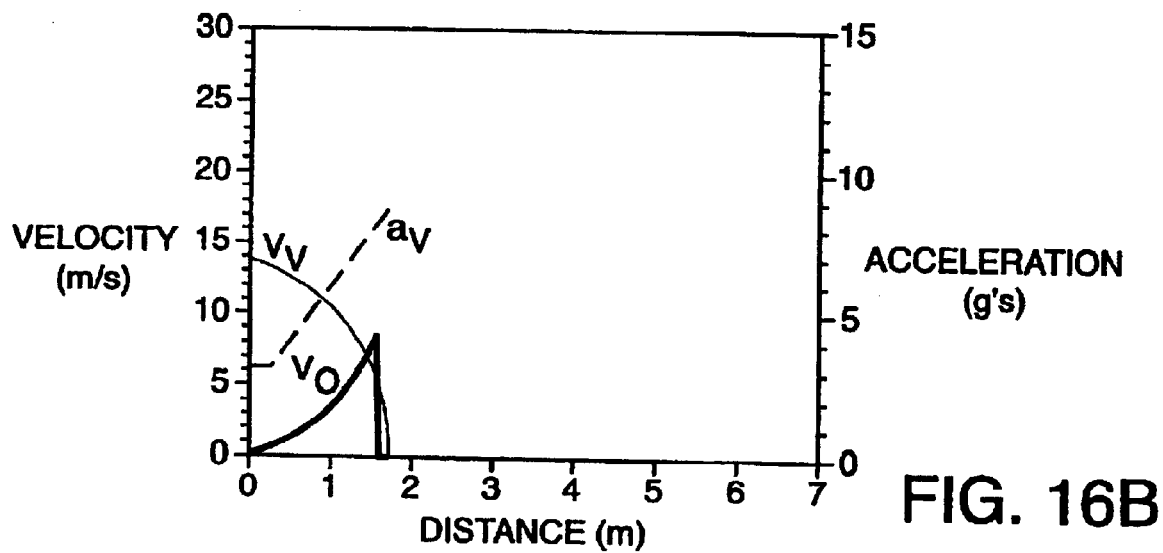
Figure 16C:
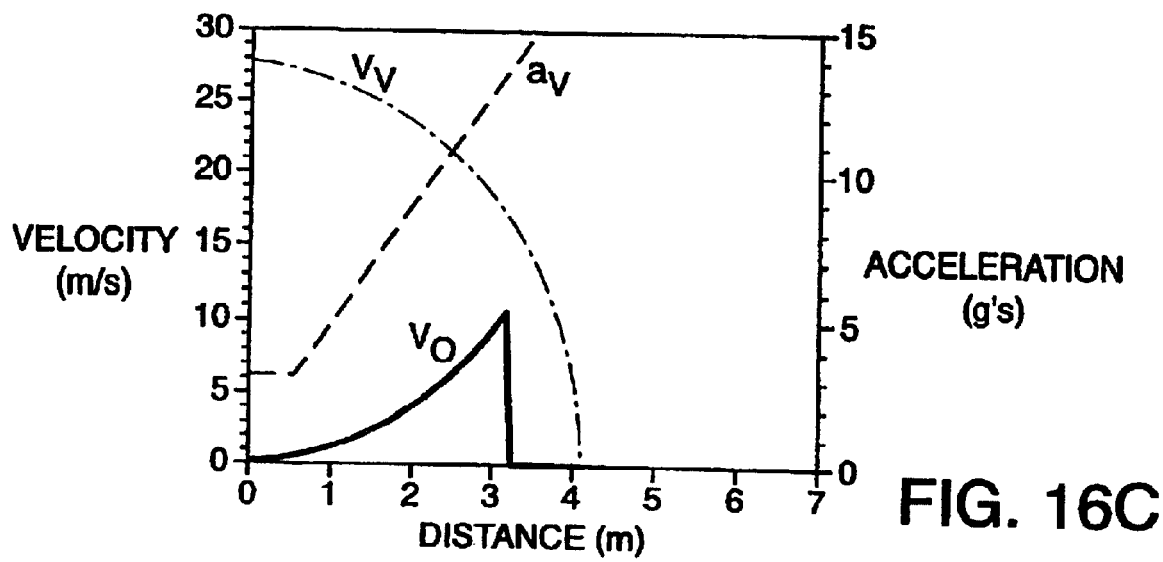

Full-scale crash tests and simulations of small cars have been performed to assess the strength of the side structure of several types of vehicles, notably small passenger cars. For example, Hinch et al found that small passenger cars like the 820-kg vehicle typically used in crash tests, could not produce more than 45 kN of resistance in a side impact crash and this requires that the struck object contact both the door structure and the lower sill [see J. Hinch, G. Manhard, D. Stout, and R. Owings, "Laboratory Procedures to Determine the Breakaway Behavior of Luminaire Supports in Mini-Size Vehicle Collisions," Volume II, Report No. FHWA-RD-86-106, Federal Highway Administration, Washington, D.C., 1987]. Unfortunately, forces of this magnitude are also associated with occupant compartment intrusions on the order of 300 or more mm. According to Hinch, et al., if the intrusions are to be limited to no more than 150 mm, the side structure of the vehicle can only resist the impact with about 25 kN of force. A crash cushion designed for side impacts must, therefore, accelerate the nose of the device up to at least 5 m/s during the first 20 milliseconds while not requiring more than 25 kN of force to do so. Recalling that the first stage of the crash cushion in the first example was 55 kN, the nose of a conventional crash cushion would be too stiff in a side impact In order to develop improved crash cushions which both satisfy frontal impact requirements and address side these impact issues, one must consider a typical side impact scenario and deceleration profile. Referring to FIGS. 16A–16C, the first stage of the improved crash cushion must have a constant force of 25 kN for the first 0.25 m. The remainder of the cushion must linearly increase the force from 25 to 230 kN in 6.75 m (i.e., 7.0 m–0.25 m). The last 6.75 m of the cushion must increase the force by 205 kN, from 25 kN to 230 kN. A crash cushion which is capable of providing this force-time profile would also meet all the Report 350 criteria shown in Table 5. Although

TABLE 5

Example Occupant and Vehicle Response for Pull-Through Tube Energy Dissipater Crash Cushion Tests

| Impact Type | Side | Front | Front | Front |
|---|---|---|---|---|
| Vehicle Mass (kg) | 820 | 820 | 1450 | 2000 |
| Impact Velocity (m/s) | 13.8 | 27.8 | 27.8 | 27.78 |
| Occupant Impact Velocity (m/s) | 8.6 | 10.6 | 8.8 | 8.33 |
| Occupant Ride-down Acceleration (g's) | 8.8 | 17.3 | 13.1 | 11.12 |
| Vehicle Stopping Distance (m) | 1.7 | 4.1 | 5.6 | 6.62 | the occupant responses for the small car test are somewhat above the desirable limit they are still below the maximum allowable limit. In addition it can be shown that vehicles of any mass between 820 and 2000-kg will be safely stopped without exceeding the occupant response limits. Side impact performance is a unique performance advantage enhancement provided by crash cushions which employ the energy dissipaters of the present invention (see Example 4). It is important to note that the energy dissipating crash cushion of this embodiment of the present invention accomplishes two things that no other existing crash cushion can do, it produces acceptable vehicle occupant responses for all vehicles between 820 and 2000 kg and provides acceptable side impact performance.

G. Example Dissipater Embodiments

An example of pull-through strap energy dissipater and its corresponding performance characteristics is provided in Example 1. An example of pull-through tube dissipater embodiment and its performance characteristics are provided in Example 2. An example of a five pin pair, pull-through tube dissipater crash cushion is provided in Example 3. An example of a multi-stage, variable force, pull-through tube dissipater crash cushion is provided in Example 4. An example of a pull-through strap dissipater crash cushion is provided in Example 5.

EXAMPLE 1

Pull-Through Strap Dissipater

Figure 26:
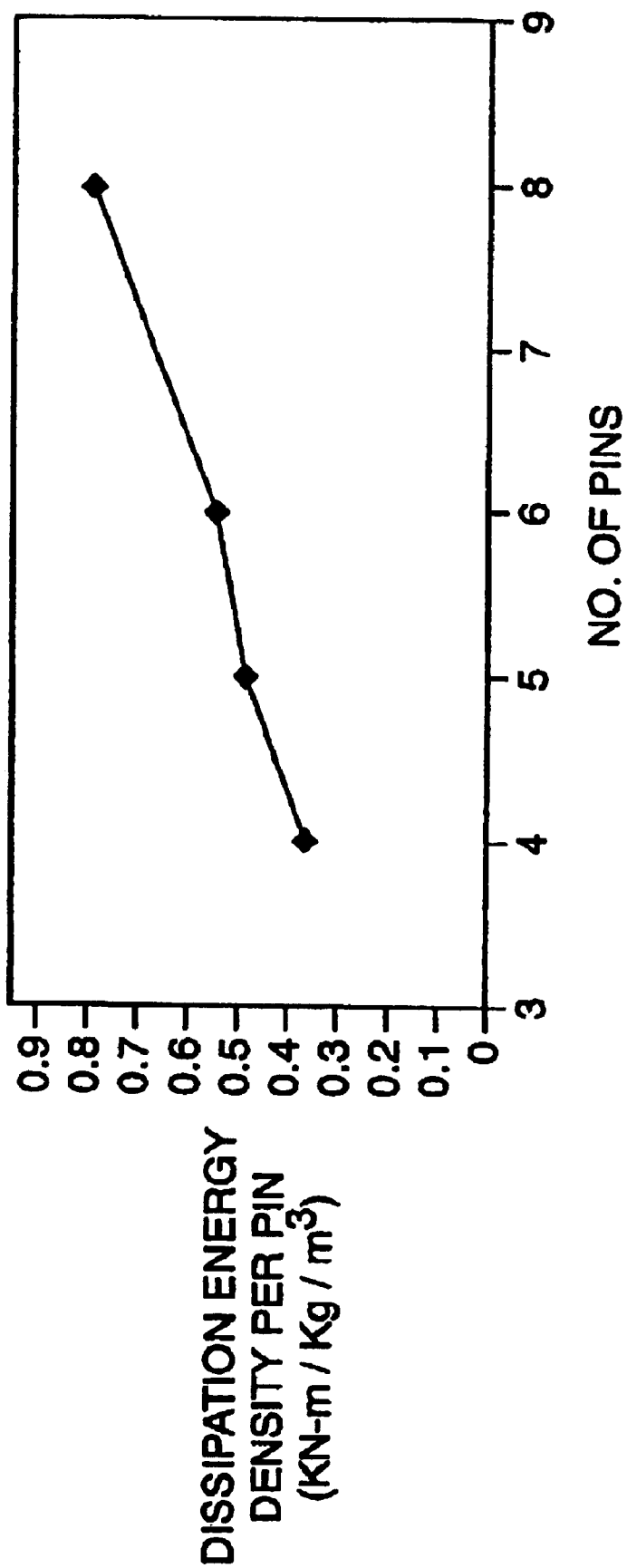
FIG. 26 is a plot of dissipation energy density per pin versus number of pins for pull-through steel strap dissipater embodiments of the present invention.

Quasi-static testing of various pull-through strap energy dissipater configurations was performed with an 1800 kN laboratory load tester. Due to equipment limitations, measurements were made at low strain rates, typically less than 20"/min. For these tests, hot-rolled 50.8 mm wide A36 steel straps were evaluated as deforming elements. Both 3.2 mm and 4.8 mm thick straps were tested. Both 12.7 mm and 19.1 mm pin diameters were evaluated. Four, five, six and eight pin dissipater module performance was compared with constant pin set spacing of 50.8 mm. To avoid unsystematic variation in results due to uncontrolled friction forces, lubricated rolling pins were used for all tests. Both unstrained and strained steel strap samples were tested in order to evaluate work hardening effects. Pull-through force $F_{PT}$, energy dissipation and elongation were measure for all samples. Pull-through force and energy dissipation data for various pull-through strap dissipater module configurations are provided in Table 6. As shown in Table 6, at constant pin spacing the pull-through force and energy dissipation increases with increasing pin number and strap thickness. In FIG. 26, the dissipation energy is plotted versus the number of pins for a pull-through dissipater which utilized a 50.8 mm wide by 3.2 mm thick strap with a pin spacing of 50.8 and a 19.1 mm pin diameter. As shown in FIG. 26, the dissipation energy density increases linearly with the number of pins.

Hardness, elongation and pull-through force measurements were made on unstrained and strained steel straps exposed to multi-pass strap dissipater runs in order to evaluate work hardening effects using an eight pin dissipater employing 19.1 mm pin diameters, 50.8 mm pin spacing and a 3.2 mm thick by 50.8 mm wide A36 steel strap with an initial Rockwell B hardness of 56.7. As expected, repeated passes on the same strap led to decreased strap cross sectional area and thickness, increased strap length, increased hardness and decreasing pull-through force due to decreased cross sectional area. In an initial pass, the hardness increased to 83.4, the cross sectional area decreased to approximately 70% of the initial section and the measured pull-through force was 36.5 N. In a second pass, the hardness increased to 85.1, the area decreased to approximately 60% of the original area and the pull-through force decreased to 25.5 N. In a third pass, the hardness increased to 85.8, the area decreased to approximately 46% of the original area and the pull-through force decreased to 17.2 N.

TABLE 6

Pull-Through Strap Dissipater Test Data

| Number of Pins | Pin Spacing (mm) | Pin Diameter (mm) | Strap Thickness (mm) | Pull-Through Force (kN) | Energy/Density (kN-m/kg/m³) |
|---|---|---|---|---|---|
| 4 | 50.8 | 19.1 | 3.2 | 11.2 | 1.43 |
| 4 | 50.8 | 12.7 | 4.8 | 32.9 | 5.00 |
| 4 | 50.8 | 19.1 | 4.8 | 43.2 | 5.60 |
| 5 | 50.8 | 19.1 | 3.2 | 18.1 | 2.40 |
| 5 | 50.8 | 19.1 | 4.8 | 63.5 | 8.15 |
| 5 | 50.8 | 19.1 | 4.8 | 52.8 | 6.77 |
| 6 | 50.8 | 19.1 | 3.2 | 25.4 | 3.26 |
| 6 | 50.8 | 12.7 | 4.8 | 78.1 | 10.15 |
| 6 | 50.8 | 19.1 | 4.8 | 101.8 | 13.05 |
| 8 | 50.8 | 19.1 | 3.2 | 42.4 | 6.32 |

EXAMPLE 2

Pull-Through Tube Dissipater

Pull-through force and energy dissipation of single pin pair and two pin pair pull-through tube dissipater modules was measured with the drop tower test method described above. The influence of pin gap spacing on dissipater performance was evaluated for both module types and the influence of pin pair spacing was evaluated for two pin pair modules. Pin gap spacing of 30 mm, 35 mm and 40 mm and pin pair spacing of 100, 150 and 200 mm were studied. For both dissipater types, impact masses of 80.5 kg, 107 kg and 128 kg were employed, representing approximate impact velocities of 2.58 m/s, 3.94 m/s and 5.01 m/s. In all cases, 89 mm HDPE tubing was utilized as deforming member elements.

Figure 19:
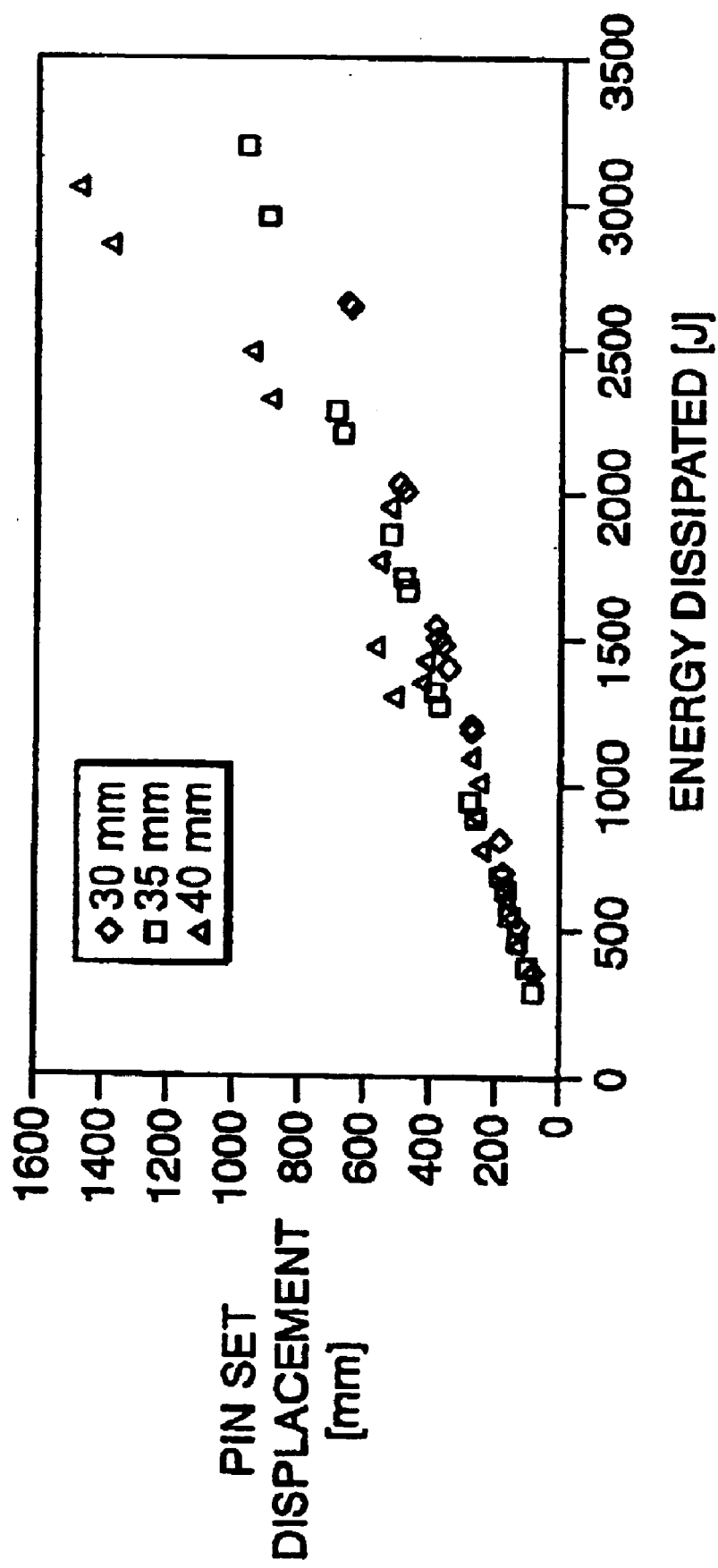
FIG. 19 shows a plot of dissipated energy as a function of pin pair gap spacing and dissipater module displacement.

Test results for single pin pair modules are provided in Table 7 and plotted in FIG. 19 which shows the dissipated energy as a function of pin pair gap spacing and dissipater module displacement. As FIG. 19 demonstrates, dissipation energy increase with increasing dissipater displacement along the deforming tube whereas, for a given impact energy, the

TABLE 7

Energy Dissipated per Unit Length as a Function of Pin Gap Spacing for Single Pin Pair Tube Dissipater Modules

| Pin-to-Pin Gap Distance (mm) | Energy Dissipated (J/m) |
|---|---|
| 30 | 4008 |
| 35 | 3363 |
| 40 | 2642 | distance displaced increases with increasing pin pair gap. For the test results shown in Table 7 and FIG. 19, the observed kinetic energy dissipated per unit length of deforming member was approximately 2.64 KJ/m for a pin pair gap spacing of 40 mm, 3.36 KJ/m for a pin pair gap of 35 mm and 4.09 KJ/m for a pin pair gap of 40 mm. These results demonstrate that by decreasing the pin gap by 12.5%, from 40 mm to 35 mm, increases dissipated energy by approximately 27% and decreasing the pin gap by 26%, from 40 mm to 30 mm, increases dissipated energy by approximately 55%.

Figure 20:
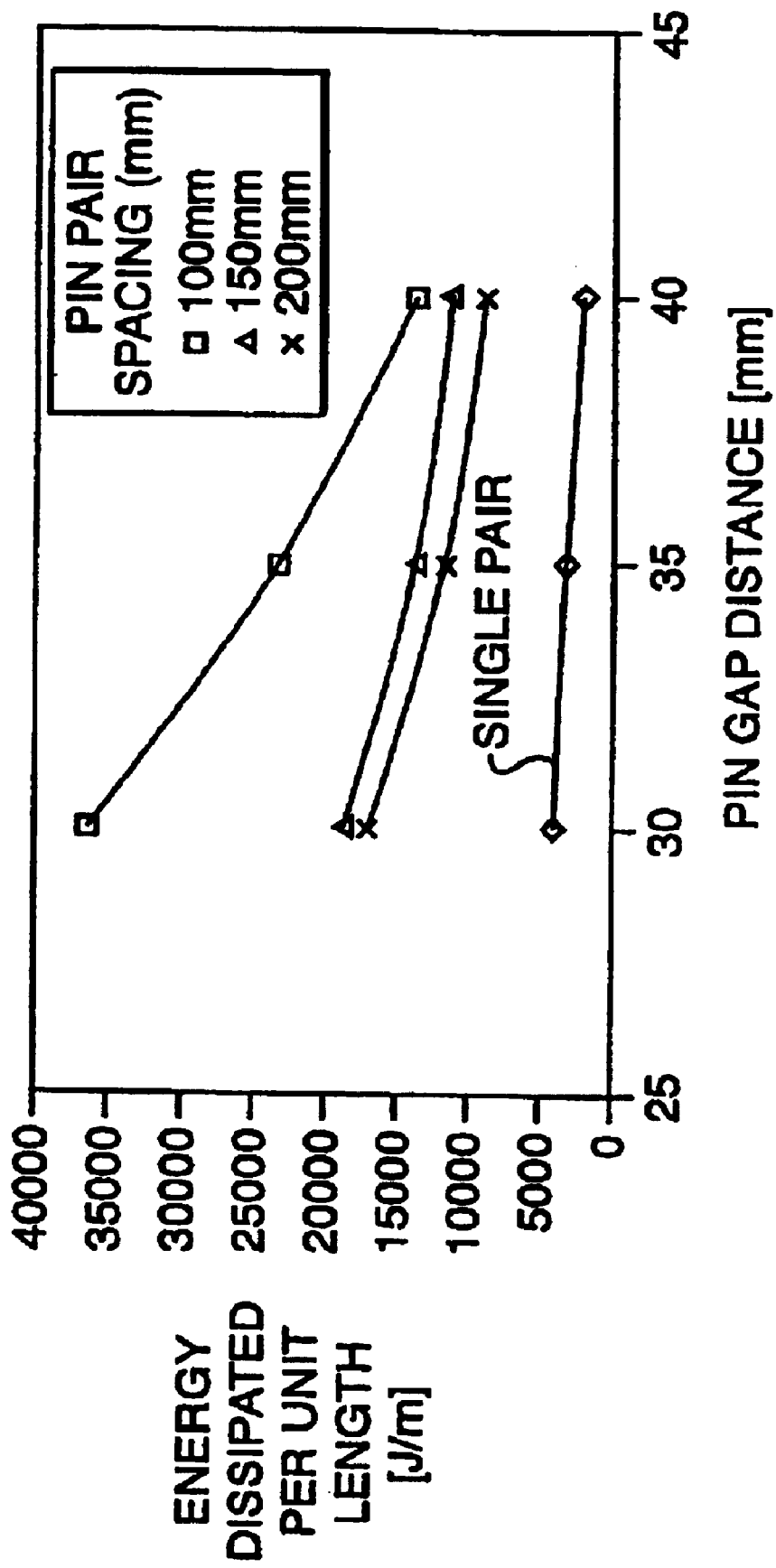
FIG. 20 shows a plot of energy dissipated per unit length as a function of pin pair gap distance and pair-to-pair spacing for two pin pair dissipater modules.

The additional variable of pin pair-to-pin pair spacing distance was evaluated along with pin gap spacing for two pin pair tube dissipater modules with orthogonal pin pair configurations (see FIG. 1; FIG. 5). Energy dissipation results are provided in Table 8. FIG. 20 shows a plot of energy dissipated per unit length as a function of pin pair, pin-to-pin gap distance and pair-to-pair spacing for two pin pair dissipater modules. In comparing As shown in FIG. 20, considerably more energy per unit length is dissipated with multiple pin pairs than with single pin pairs. FIG. 20 shows that energy dissipation increases with decreasing pair to pair spacing and decreasing pin gap or pin-to-pin distance.

TABLE 8

Energy Dissipated per Unit Length as a Function of Pin Gap Spacing for Two Pin Pair Tube Dissipater Modules

| Pin Pair Spacing | Energy Dissipated (J/m) Pin-to-Pin Gap Distance (mm) | | |
|---|---|---|---|
| (mm) | 30 | 35 | 40 |
| 100 | 36418 | 23281 | 13730 |
| 150 | 18772 | 13173 | 11567 |
| 200 | 17032 | 11300 | 8827 |

EXAMPLE 3

Pull-Through Tube Energy Dissipater Crash Cushion

Using the criteria for vehicle crash cushion design performance discussed above, a variable force, pull-through tube energy dissipater was designed to achieve the requisite acceleration (deceleration) profile and thereby satisfy the three design requirements for minimizing occupant injury in a head-on collision: a) a maximum occupant impact velocity (OIV); b) a maximum g-force for occupant ride-down acceleration (ORA); and c) adequate energy dissipation to stop a 2000 kg pickup truck traveling at 100 km/hr.

As noted above, the pull-through force necessary in the first stage to meet the small car OIV requirement was shown to be 55 kN. Thus, the first task for crash cushion design was to select a configuration which will result in a force in the range for the low-force end of the cushion. In FIG. 13 a pull-through force $F_{PT}$ of 10 kN is obtained with a diameter-thickness ratio of approximately six for a clamping ratio of 0.7753. For an 89-mm diameter tube this diameter-thickness ratio would correspond to a wall thickness of about 13-mm. Assuming a rolling pin configuration with negligible friction force (i.e. $\mu_F=0$), the frictionless pull-through coefficient $\mu_{PT}$ required would be 55/10 or 5.5. If a two set two-pin per set, or two pin pair, HDPE pipe dissipater is employed, assuming that λ is independent of wall thickness, Table 2 may be used to set the spacing between pin sets. If we assume n=2 and from Table 1 ζ=1.4 and Pc=4673 N, then solving for λ gives a spacing coefficient of 2.9.

$$\mu_{PT}=\zeta(1+\lambda(n-1))\to 5.5=1.4(1+\lambda(2-1))\to\lambda=2.9$$

By interpolation of the spacing ratio values in Table 2 for a clamping ratio of 0.775 and a spacing coefficient of 2.9, the spacing ratio is approximately 1.45. Thus, the first stage of this example crash cushion should use a two pin set/two pin per set configuration with the pin-sets spaced approximately 130 mm apart.

As shown above, in the second stage of this example crash cushion the occupant ride-down acceleration (OCA) for an 820 kg passenger vehicle requires that the total force must increase to 121 kN, an increase of 66 kN above that of the 55 kN first stage. If the same tubes and overall arrangement are used in the second stage, this would require a pull-through coefficient of (121−55)/10=6.6. Again, solving for the spacing coefficient yields:

$$\mu_{PT}=\zeta(1+\lambda(n-1))$$

$$6.6=1.4(1+\lambda(2-1))\to\lambda=3.7$$

From interpolation of spacing coefficient λ values for a clamping ratio of 0.7753, Table 2 suggests a spacing ratio of 1.34, or a 119 mm spacing, for a two-set two-pin per set dissipater.

As noted above, the third stage of this example crash cushion require that a 2000 kg truck traveling at 100 km/hr will be brought to a stop with a maximum deceleration of 15 G. This requires that a total force of 294 kN through the third stage. Since the combined force of the first and second stages, which are still engaged, provide 121 kN, the third stage must provide and additional force increase of 173 kN above that of the 121 kN second stage. If the same general tube arrangement is retained, the third stage would require a frictionless pull-through coefficient of 173/10=17.3. Since, as shown in Table 1, this is outside the capability of a two set configuration, the number of sets must be increased. Assuming that the smallest available spacing ratio from Table 2 is used, (i.e., 4.91), the number of pin sets n required may be obtained from the expression for the frictionless pull through coefficient as follows:

$$\mu_{PT}=\zeta(1+\lambda(n-1))$$

$$17.3=1.4(1+4.91(n-1))\to n=3.31\to 3$$

Using a value of n=3 for the integer value for the number of pin sets and solving for the spacing ratio give:

$$\mu_{PT}=\zeta(1+\lambda(n-1))$$

$$17.3=1.4(1+\lambda(3-1))\to\lambda=5.6$$

Again, interpolation of the spacing coefficient λ values for a clamping ratio of 0.7753, Table 2 suggests a spacing ratio of about 1.0. Thus, in this third stage a three set two-pin per set dissipater with a spacing ratio of one, or pin sets spaced 89 mm apart, will result in the required force.

Thus, a desired crash response may be achieved with the following configuration when employing an 89-mm diameter, 13-mm thick HDPE pipe section: a) a first stage comprising a two pin pair dissipater with the pin pairs spaced 130 mm apart; b) a second stage comprising a two pin pair dissipater with the spacing reduced to 117 mm; and c) a third stage comprising a three pin pair dissipater with the spacing reduced to 89 mm. This example dissipater is one embodiment of the pull-through tube dissipater of the present invention which meets current highway crash cushion performance requirements for frontal impacts with small car and full-size pickup truck vehicles.

EXAMPLE 4

Eight-Pin Per Set HDPE Pipe Pull-Through Energy Dissipater Crash Cushion

While the dissipater embodiment provided in Example 3 meets current highway crash cushion performance requirements for frontal impacts with small cars and full-size pickup trucks, in this example an improved pull-through tube dissipater design is provided which not only meets existing crash cushion requirements for small car and pickup truck frontal impacts but also extends occupant protection for side impact collisions while providing a broader range of protection for mid-size vehicles (i.e. 1450 kg) and less vehicle-specific response to frontal or side impacts.

Referring to FIGS. 16A–16C, the first stage of the improved crash cushion must have a constant force of 25 kN for the first 0.25 m. After the first 0.25 m, the force should increase linearly until it is 230 kN at 7 m from the end. This can be accomplished with a series of 8-pin/set dissipaters referring back to Table 3. Using a HDPE pipe with diameter of 89 and a thickness of 6 (i.e. a D/t ratio of 14.833), a single eight-pin/set dissipater would result in a force of 12.5 kN at a clamping ratio of 0.186 (e.g., interpolating between a clamping ratio of 0.225 and 0.135). Two such dissipaters would be positioned on the end of the device to provide the 25 kN required force for side impacts.

The remainder of the cushion must linearly increase the force from 25 to 230 kN in 6.75 m (i.e., 7.0 m–0.25 m). The critical spacing for 8-pin/set dissipaters as discussed earlier is approximately one diameter so if the spacing is at least 89 mm the forces are additive. The last 6.75 m of the cushion must increase the force by 205 kN, from 25 kN to 230 kN. Referring again to Table 3, an 8-pin/set dissipaters with a clamping ratio of 0.326 would result in a force of roughly 17 kN. Twelve such dissipaters would result in 204 kN. If an 8-pin/set dissipater were attached to the HDPE pipe every 0.5 m, the affect would approximate a linear increasing force. As the nose of the device is pushed down the HDPE pipe section, dissipaters are continually being added as the moving dissipaters contact ones stationed along the pipe. By the time a 2000-kg pickup truck reaches the end of the crash cushion, it will have accumulated 14 8-pin/set dissipaters (i.e., the two 12.5-kN/set dissipaters at the front plus the 12 17-kN/set positioned along the last 6.75 m of the cushion.

This improved cushion would meet all the Report 350 criteria shown above in Table 5. Although the occupant responses for the small car test are somewhat above the desirable limit they are still below the maximum allowable limit. In addition it can be shown that vehicles of any mass between 820 and 2000-kg will be safely stopped without exceeding the occupant response limits. The side impact performance is yet another unique performance enhancement. It is important to note that the energy dissipating crash cushion of this embodiment of the present invention accomplishes two things that no other existing crash cushion can do, it both produces acceptable vehicle occupant responses for all vehicles between 820 and 2000 kg and provides acceptable side impact performance.

EXAMPLE 5

Eight Pin Steel Strip Pull-Through Energy Dissipater Crash Cushion

In addition to the pull-through HDPE tube dissipater crash cushion embodiment of Example 4, the pull-through strap dissipater crash cushion embodiment of in this example can provide a similar preferred force response so as to minimize occupant injury risk during impact.

The yield strength of an A36 steel strap is the 250 MPa yield stress multiplied by the 50.8 mm width and the 3.2-mm thickness or roughly 410 kN. Since the maximum force required in the improved crash cushion is 230 kN, a single steel strap will have adequate strength. As shown earlier in Table 4, the relationship between the pull-through force and the number of pins is linear for a steel-strap pull-through dissipater. Table 4 indicates that a six-pin dissipater of this type will result in a force of approximately 25 kN, the desired level for the first stage required to obtain good side impact performance. From Table 4, the addition of each pin increases the force by about 8 kN per pin once the number of pins is over four. Achieving a force of 230 kN at the back of the cushion would require another 26 pins be added. A steel strap pull-through dissipater may therefore be designed to produce the deceleration profiles of FIGS. 16A–16C if six pins spaced at 50.8 mm are positioned at the front. At a point 0.5 m from the beginning, a bracket with another pin set should be positioned every 0.25 m. By the time a 2000 kg pickup truck pushes the nose all the way to be back of the crash cushion, all 32 pins on the dissipater will have become involved in dissipating the impact energy of the collision.

The above examples have demonstrated that the pull-through tube and strap energy dissipaters of the present invention can achieve specific force-time design objectives to minimize vehicle occupant injury risks during frontal and side-impact collisions. By using the device and methods disclosed herein for selecting dissipater components, a force-time response can be designed for a variety of specific energy dissipation applications.

Having described the preferred embodiments of the invention, it will now become apparent to one of skill in the art that other embodiments incorporating the disclosed concepts may be used. Therefore, it is not intended to limit the invention to the disclosed embodiments but rather the invention should be limited only by the spirit and scope of the following claims.

What is claimed is:

1. A tunable pull-through energy dissipater comprising:
   an inelastic tubular deforming element having a proximal end anchored to a stationary object, a portion of said element cross section being bent to conform to a pin array shape, said element having a defined cross sectional shape, diameter, wall thickness and length; and
   a dissipater module slidably mounted on said deforming element, said module comprising
      a pin set frame,
      at least one pin set comprising at least two pins, a longitudinal axis of said pins defining a pin set plane which is orthogonal to a longitudinal axis of said deforming element,
      a pin gap adjustment means for adjusting a pin gap spacing between a circumferential surface of opposing pin set pins, said pin gap spacing being less than said deforming element diameter and no less yhan twice the element wall thickness, and
      an impact surface for receiving contact with a moving object and for transferring an impact force from said moving object to said dissipater module.

2. The tunaable pull-through dissipater of claim 1 wherein said dissipater module further comprises at least two pin sets and a pin set spacing adjustment means for adjusting the spacing between the pin set plane of each of said pin sets.

3. The tunable pull-through dissipater of claim 1 further comprising a guide rail for maintaining the dissipater module orientation relative to said deforming element while said module slides along said element length.

4. The tunable pull-through dissipater of claim 1 wherein said deforming element is formed from high density polyethylene.

5. The tunable pull-through dissipater of claim 4 wherein the movement of each pin set along said deforming element repeatedly deforms said element and said element substantially recovers its original cross section shape and diameter upon passage of said module along said element length.

6. A tunable pull-through energy dissipater comprising:
   an inelastic deforming element having a proximal end anchored to a stationary object, a portion of said element cross section being bent to conform to a pin array shape, said element having a defined cross sectional shape, width, thickness and length; and a dissipater module slidably mounted on said deforming element, said module comprising a pin set frame for supporting a pin array, at least four pins, a longitudinal axis of said pins defining a pin set plane which is parallel to a longitudinal axis of said deforming element, the longitudinal axes of each of said pins being aligned parallel to one another and orthogonal to the longitudinal axis of said deforming element, a pin spacing adjustment means for adjusting the spacing between a circumferential surface of each said pins, and an impact surface for receiving contact with a moving object and for transferring an impact force from said moving object to said dissipater module.

7. The tunable pull-through dissipater of claim 6 further comprising a guide rail for maintaining the dissipater module orientation relative to said deforming element while said module slides along said element length.

8. The tunable pull-through dissipater of claim 6 wherein said inelastic deforming element comprises a material selected from the group of structural steel, galvanized steel, stainless steel and high density polyethylene.

9. A multi-stage, variable force pull-through dissipater comprising:

at least one inelastic deform element having a proximal end anchored to a stationary object, a portion of said element cross section being bent to conform to a pin array shape, said element having a defined cross sectional shape, width, thickness and length;

a first dissipater module and least one second dissipater module slidably mounted on said deforming element, said first and at least one second module each comprising a pin set frame for supporting a pin array, at least four pins, a longitudinal axis of said pins defining a pin set plane which is parallel to a longitudinal axis of said deforming element, the longitudinal axes of each of said pins being aligned parallel to one another and orthogonal to the longitudinal axis of said deforming element, a pin spacing adjustment means for adjusting the spacing between a circumferential surface of each said pins, and an imp act surface for receiving contact with a moving object and for transferring an impact force from said moving object to said dissipater module; and a variable pull-through force profile established between said first and at least one second dissipater modules where a difference in at least one of said pin spacings or the number of said pins between said first and at least one second module produces a difference in pull-through force between said modules.

10. The multi-stage, variable force pull-through dissipater of claim 9 further comprising a guide rail for maintaining the dissipater modules' orientation relative to said deforming element while said modules slide along said element length.

11. The tunable pull-through dissipater of claim 9 wherein said inelastic deforming element comprises a material selected from the group of structural steel, galvanized steel, stainless steel and high density polyethylene.

12. The multi-stage, variable force dissipater of claim 9 further comprising a third dissipater module and a variable pull-through force profile established between said first, said second and said third dissipater modules where a difference in at least one of said pin spacings or the number of said pins between said first, said second and said third modules produces a difference in pull-through force between each of said modules.

13. The multi-stage, variable force dissipater of claim 9 further comprising a second inelastic deforming element joined to a distal end of said at least one inelastic deforming element, said second deforming element having a second cross sectional shape, width, thickness and length, at least one of said se and element shape, width, thickness and length being different than at least one of said at least a e deforming element shape, width, thickness and length, the difference in said deforming element shape or dimension providing a variation in pull-through force for said dissipater modules hen sliding between said at least one element and said second element.

14. A multi-stage, variable force pull-through dissipater comprising:

at least one inelastic tubular deforming element having a proximal end anchored to a stationary object, a portion of said element cross section being bent to conform to a pin array shape, said element having a defined cross sectional shape, diameter, wall thickness and length;

a first dissipater module and at least one second dissipater module slidably mounted on said deforming element, said first and t least one second module each comprising a pin set frame for supporting a pin set array, at least two pin sets, each pin set comprising at least two pins, a longitudinal axis of each of said pin set pins defining a pin set plane which is orthogonal to a longitudinal axis of said deforming element, each of said pin set planes aligned parallel to one another, a pin set spacing adjustment means for adjusting the spacing between the pin set plane of each said pin sets, a pin gap adjustment means for adjusting a pin gap spacing between a circumferential surface of opposing pin set pins, said pin gap spacing being less than said deforming element diameter and no less than twice the element wall thickness, and an impact surface for receiving contact with a moving object and for transferring an impact force from said moving object to said dissipater module; and a variable pull-through force profile established between said first and at least one second dissipater modules where a difference at least one of said pin set spacings, said pin gaps, said number of pins in said pin sets, or said number of pin sets between said first and at least one second module produces a difference in pull-through force between said modules.

15. The multi-stage, variable force pull-through dissipater of claim 14 further comprising a guide rail for maintaining the dissipater modules' orientation relative to said deforming element while said modules slide along said element length.

16. The multi-stage, variable force pull-through dissipater of claim 14 wherein said deforming element is formed from high density polyethylene.

17. The tunable pull-though dissipater of claim 14 wherein the movement of each pin set along said deforming element repeatedly deforms said element and said element substantially recovers its original cross sectional shape and diameter upon passage of said module along said element length.

18. The multi-stage, variable force dissipater of claim 14 further comprising a third dissipater module and a variable pull-through force profile established between said first, said second and said third dissipater modules where a difference in at least one of said pin set spacings, said pin gaps, said number of pins in said pin sets, or said number of pin sets between said first, said second and said third module produces a difference in pull-through force between each of said modules.

19. The multi-stage, variable force dissipater of claim 14 further comprising a second inelastic tubular deforming element joined to a distal end of said at least one inelastic tubular deforming element, said second deforming element having a second cross sectional shape, diameter, wall thickness and length, at least one of said second element shape, diameter, wall thickness and length being different than at least one of said at least one deforming element shape, diameter, wall thickness and length, the difference in said deforming element shape or dimension providing a variation in pull-through force for said dissipater modules when sliding between said at least one element and said second element.

20. The tunable pull-through dissipater of claim 1 wherein said dissipater module comprises a plurality of pin sets having a pin gap adjustment means and a pin set spacing adjustment means for adjusting a spacing between the pin set plane of adjacent pin sets.

21. The tunable pull-through dissipater of claim 20 wherein each of said pin sets comprises two pins and the longitudinal axes of the pins in each of said pin sets are orthogonally aligned with the longitudinal axes of the pins in adjacent pin sets.

22. The tunable pull-through dissipater of claim 20 wherein each of said pin sets comprises four co-planar pins with the longitudinal axis of each pin aligned at a 90 degree angle to the axis of each adjacent pin.

23. The tunable pull-through dissipater of claim 20 wherein each of said pin sets comprises eight co-planar pins with the longitudinal axis of each pin aligned at a 45 degree angle to the axis of each adjacent pin.

24. The tunable pull-through dissipater of claim 20 wherein the number of pin pairs in said dissipater pin sets range between 5 and 10 and the number of pins in said pin sets range between 10 and 20 pins.

25. The multi-stage, variable force pull-through dissipater of claim 14 comprising a plurality of dissipater modules, each of said modules having a plurality of pin sets having two pins, a pin gap adjustment means and a pin set spacing adjustment means, and the longitudinal axes of pins in each of said pin sets are orthogonally aligned with the longitudinal axes of pins in each adjacent pin set.

26. The multi-stage, variable force pull-through dissipater of claim 14 wherein each of said dissipater pin sets comprises four co-planar pins with the longitudinal axis of each pin aligned at a 90 degree angle to the axis of each adjacent pin.

27. The multi-stage, variable force pull-through dissipater of claim 14 wherein each of said dissipater pin sets comprises eight co-planar pins with the longitudinal axis of each pin aligned at a 45 degree angle to the axis of each adjacent pin.

28. The multi-stage, variable force pull-through dissipater of claim 14 wherein the number of pin pairs in said dissipater pin sets range between 5 and 10 and the number of pins in said pin sets range between 10 and 20 pins.

\* \* \* \* \*